(12) United States Patent
Kimura et al.

(10) Patent No.: US 7,719,948 B2
(45) Date of Patent: May 18, 2010

(54) LENS UNIT FOR OPTICAL PICK-UP APPARATUS AND OPTICAL PICK-UP APPARATUS

(75) Inventors: Tohru Kimura, Hachioji (JP); Takemi Miyazaki, Hamura (JP); Yuichi Atarashi, Hachioji (JP)

(73) Assignee: Konica Minolta Opto, Inc. (JP)

( * ) Notice: Subject to any disclaimer, the term of this patent is extended or adjusted under 35 U.S.C. 154(b) by 1209 days.

(21) Appl. No.: 11/211,747

(22) Filed: Aug. 26, 2005

(65) Prior Publication Data

US 2006/0062104 A1    Mar. 23, 2006

(30) Foreign Application Priority Data

| Aug. 31, 2004 | (JP) | ............................. 2004-253009 |
| Oct. 29, 2004 | (JP) | ............................. 2004-316767 |
| Nov. 12, 2004 | (JP) | ............................. 2004-329856 |

(51) Int. Cl.
   *G11B 7/135*    (2006.01)
(52) U.S. Cl. .................................................. 369/112.05
(58) Field of Classification Search ........................ None
   See application file for complete search history.

(56) References Cited

U.S. PATENT DOCUMENTS

| 5,130,965 | A | * | 7/1992 | Karaki et al. ............. 369/44.38 |
| 5,283,772 | A | * | 2/1994 | Miyake et al. ............ 369/44.23 |
| 5,446,565 | A | * | 8/1995 | Komma et al. ........... 369/44.23 |
| 5,515,354 | A | * | 5/1996 | Miyake et al. ......... 369/112.07 |
| 6,084,843 | A |   | 7/2000 | Abe et al. |

| 2003/0202451 | A1 | * | 10/2003 | Kimura et al. ......... 369/112.08 |
| 2003/0227858 | A1 | * | 12/2003 | Komma ................. 369/112.08 |

FOREIGN PATENT DOCUMENTS

| EP | 1 422 696 A2 | 5/2004 |
| JP | 2001-6203 | 1/2001 |
| JP | 2001-272516 | 10/2001 |
| JP | 2001-305424 | 10/2001 |
| JP | 2004-71134 | 5/2003 |

OTHER PUBLICATIONS

Machine translation of Oi et al., JP 2001006203 A, published Jan. 12, 2001.*
European search report dated Oct. 31, 2007.
Office Action mailed Sep. 8, 2009, for co-pending Japanese Patent Application No. 2004-316767 and English translation thereof.

* cited by examiner

*Primary Examiner*—Peter Vincent Agustin
(74) *Attorney, Agent, or Firm*—Finnegan, Henderson, Farabow, Garrett & Dunner, L.L.P.

(57) ABSTRACT

The lens unit for the optical pick-up apparatus has: the objective lens by which the projecting light from the light source is condensed on the information recording surface of the optical information recording medium; the phase control element which is arranged on the light source side to the objective lens, and which controls the phase of the projecting light from the light source; and the supporting member holding the objective lens and the phase control element; and the phase control element is held under the condition that its optical axis is inclined by a predetermined angle to the optical axis of the objective lens, and the intersection at which the optical axis of the phase control element crosses the optical surface having the phase structure is arranged on the optical path passing through the central point which passes the optical axis of the objective lens.

23 Claims, 29 Drawing Sheets

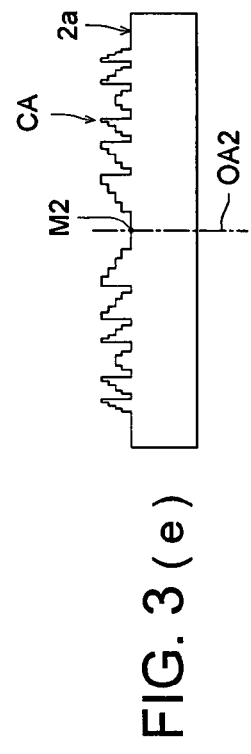
FIG. 3 (a)
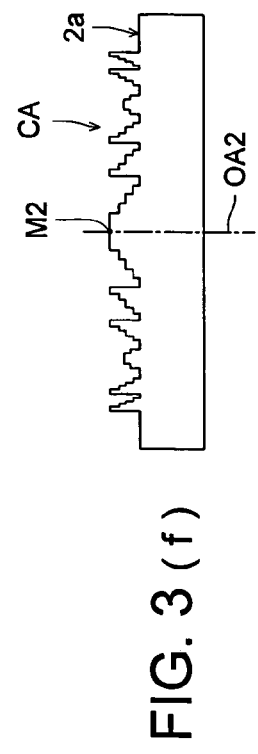
FIG. 3 (b)
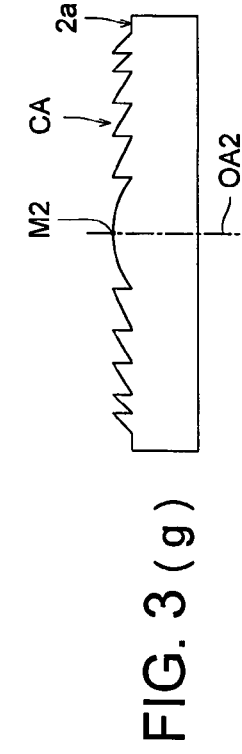
FIG. 3 (c)
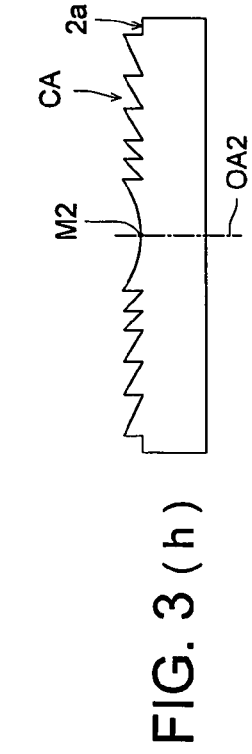
FIG. 3 (d)
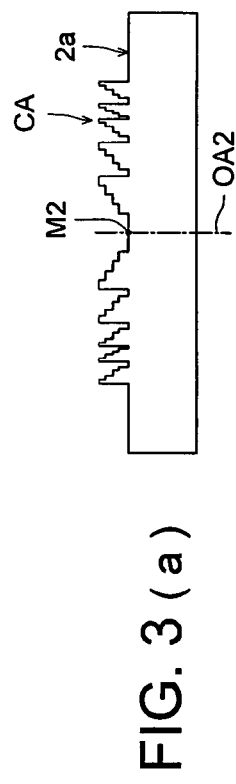
FIG. 3 (e)
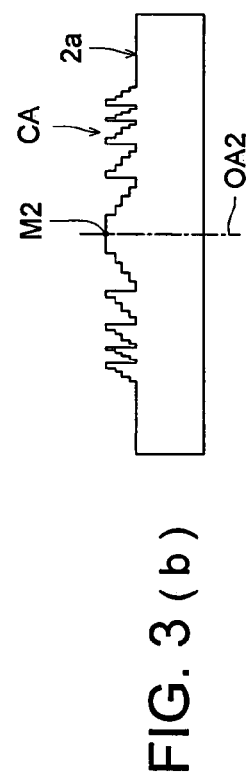
FIG. 3 (f)
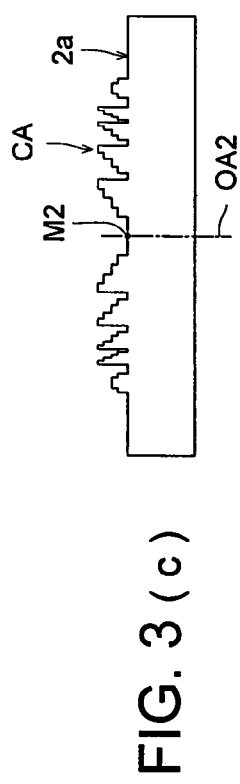
FIG. 3 (g)
FIG. 3 (h)

FIG. 20
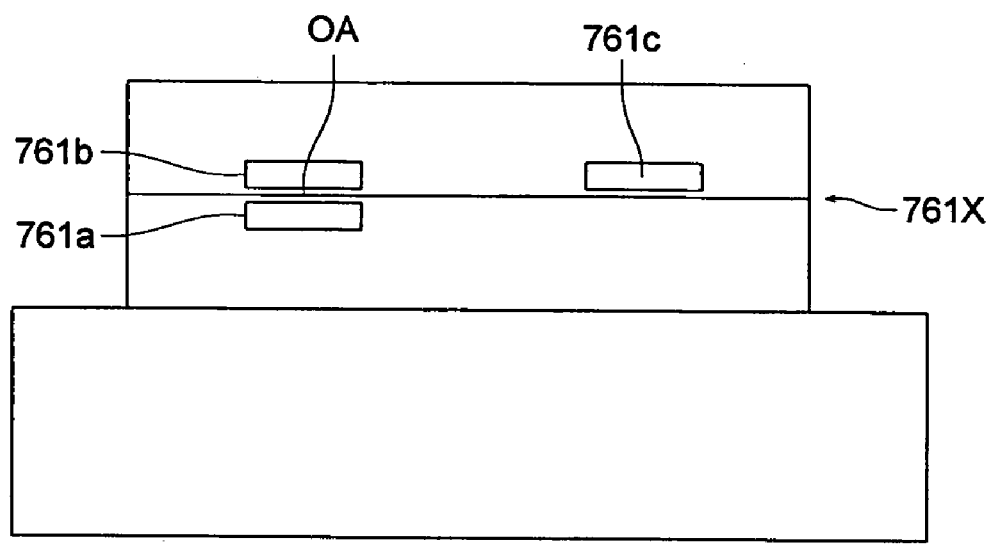
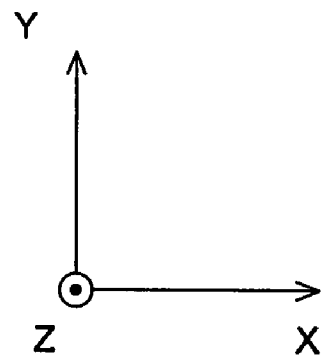

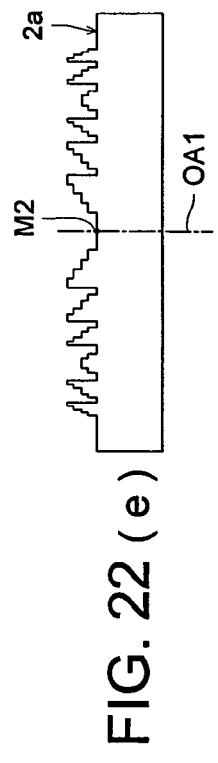
FIG. 22 ( a )
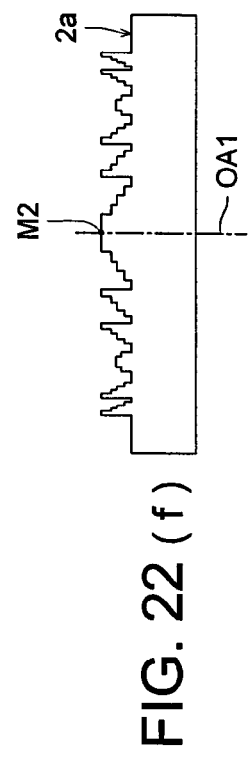
FIG. 22 ( b )
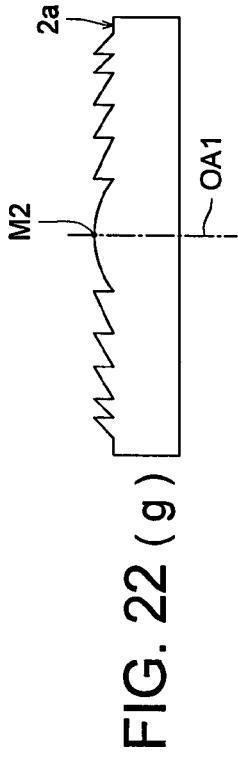
FIG. 22 ( c )
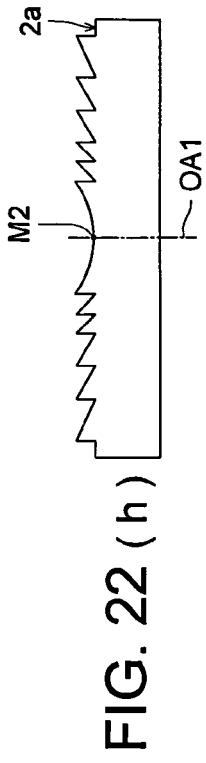
FIG. 22 ( d )
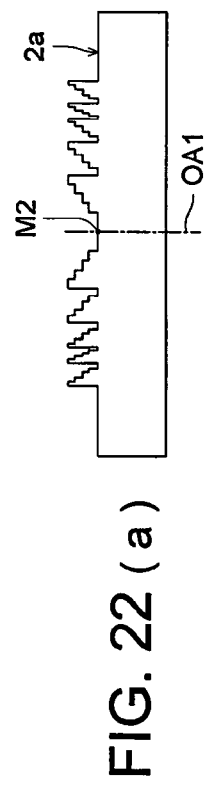
FIG. 22 ( e )
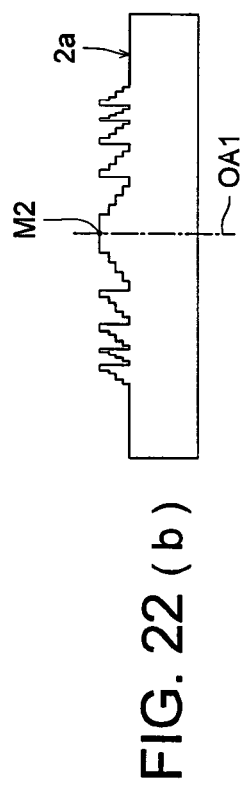
FIG. 22 ( f )
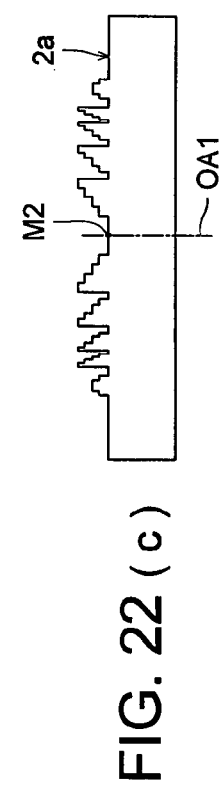
FIG. 22 ( g )
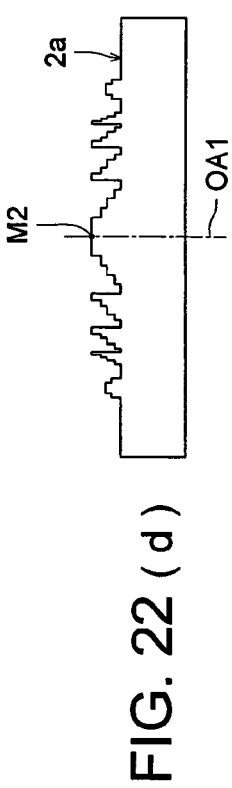
FIG. 22 ( h )

LENS UNIT FOR OPTICAL PICK-UP APPARATUS AND OPTICAL PICK-UP APPARATUS

RELATED APPLICATION is based on patent application No. 2004-253009, 2004-316767, and 2004-329856 filed in Japan, the entire content of which is hereby incorporated by reference.

BACKGROUND

1. Field of the Invention

The present invention relates to an optical element such as an objective lens, which is mounted in an optical head for an optical pick-up apparatus, a concerned objective lens, lens unit composed of a plurality of optical elements, lens frame for the lens unit, positioning method of the lens unit, and an optical pick-up apparatus.

2. Description of the Related Art

Conventionally, each kind of optical pick-up apparatus for reproducing and recording of the information for an optical information recording medium such as CD (Compact Disk), DVD (Digital Video Disk) is developed, manufactured and spread in the market. As an optical head apparatus mounted in such an optical pick-up apparatus, there is an apparatus in which an objective lens main body is fixed to a holder with a phase control element and they are integrated in order to stably record and reproduce both of CD and DVD. In this case, positioning marks for putting the central axis together to the objective lens main body and the phase control element are respectively provided and de-centering is prevented, and the reduction of the wave-front aberration is attained. (Refer to Patent Document 1).

(Patent Document 1) Tokkai No. 2001-6203

However, in the de-centering prevention method of the optical head as described above, a positioning of the objective lens main body and the phase control element is premised on the assumption that both are arranged in very close positions, and as both are separated, the accuracy of the positioning is lowered. Further, in the above-described de-centering prevention method, it is a basic premise that the optical axis of the objective lens main body and the optical axis of the phase control element are held in parallel with each other, and when both are inclined, there is a possibility that the accuracy of the positioning is lowered or the aberration is generated.

Further, recently, there is also a case where the objective lens main body and the phase control element are mounted in an optical head apparatus as a lens unit in which the objective lens main body and the phase control element are integrated by direct or indirect cementation. When the imaging characteristic is measured for such a lens unit, for example, the measurement by using an interferometer is conducted, however, there is a case where, in this kind of measurement, the interference fringe is disturbed by the returning light from the phase control element or its contrast is lowered, and the measurement accuracy is lowered.

Further, also in the case where the optical pick-up apparatus in which such a lens unit is mounted, is used, there is a possibility that the returning light from the phase control element is incident on the photo detector, and the bad influence is affected in the same manner as described above.

Further, recently, BD (Blue-ray) or HD (HD DVD), which are made further high-density, series optical pick-up apparatus is developed, and there is a needs for an objective lens of compatible type corresponding to DVD and BD, or DVD and HD, or 3-wavelength compatible type objective lens corresponding to CD, DVD and BD, or CD, DVD and HD. In this kind of objective lens, generally, in order to have a structure to give a compatibility for CD, DVD, or CD and DVD, by the phase control element, to the objective lens main body whose aberration is corrected for BD or HD, the position or inclination of the phase control element to the objective lens main body, particularly, because the shift de-centering for the objective lens main body of the phase structure which is formed in the phase control element, affects the important influence on the imaging characteristic of DVD series or CD series on the long wavelength side, the accuracy of several micron meter is required for the positioning of the phase control element.

SUMMARY

The problem of the present invention is considered above-described problems, and an object of the present invention is to provide a lens unit by which, irrespective of the distance between the phase control objective lens main body and the phase control element or respective optical axis inclinations, the positioning accuracy of both can be simply increased.

Then, as the result, the lens unit by which the imaging characteristic of the compatible type objective lens can be simply increased, can be provided.

Further, in the lens unit in which the objective lens main body and the phase control unit are integrated, the object of the present invention is that the generation of the returning light from the phase control element is prevented, and the accuracy of measurement of the imaging characteristic can be simply highly increased.

Further, the object of the present invention is to provide a lens unit by which, also when the optical pick-up apparatus is used, the bad influence on the photo detector by the returning light from the phase control element can be prevented.

Further, the object of the present invention is to provide a lens unit by which, without complicating the assembling process, the imaging characteristic of the compatible type objective lens corresponding to BD or HD can be easily increased.

Further, the object of the present invention is to provide an optical element appropriate for obtaining the above-described lens unit, an assembly method of a lens frame and an optical element.

Further, the object of the present invention is to provide a high accurate optical pick-up apparatus in which the lens unit as described above is mounted.

SUMMARY OF THE INVENTION

The above objects of the present invention will be attained by the following structures:

(1) A lens unit for use in an optical pickup apparatus comprising: an objective lens having an inherent first optical axis, arranged on an optical information recording medium, a phase control element having an inherent second optical axis and having two opposed optical surfaces, arranged on a light source side, a supporting member holding the phase control element to the objective lens under the condition that the second optical axis of the phase control element is inclined by a certain angle to the first optical axis of the objective lens and under the condition that a central point in the optical surface formed a phase structure of the two opposed optical surfaces, is on the central prolonged optical path which is extended passing through the first optical axis of the objective lens.

(2) A lens unit for use in an optical pickup apparatus, comprising: an objective lens having an inherent main-optical axis, arranged on an optical information recording medium, an phase control element having a first optical surface formed a first phase structure and a second optical surface formed a second phase structure, and wherein the phase control element is structured in such a manner that a first sub-optical axis of the first optical surface and a second sub-optical axis of the second optical surface are separated by a certain distance in parallel with each other, a supporting member holding the phase control element to the objective lens, wherein the phase control element is held under the condition that the first and the second sub-optical axes are inclined by a certain angle to the main-optical axis.

(3) A lens unit for use in an optical pickup apparatus, comprising: an objective lens condensing a light flux emitted from a light source on an information recording surface of an optical information recording medium, and having an inherent main-optical axis, a phase control element including two opposed first and second optical surfaces, and the first optical surface having a first phase structure, and the second optical surface having a second phase structure, arranged on the light source side to the objective lens, a supporting member holding the phase control element to the objective lens, and wherein the phase control element is held to the objective lens under the condition that each optical axis of the first and the second optical surface of the phase control element is inclined by a certain angle to the main-optical axis of the objective lens, and under the condition that a central point of the first optical surface and a central point of the second optical surface which are on the central prolonged optical path which is extended passing through the main-optical axis of the objective lens.

(4) A lens unit for use in an optical pickup apparatus, comprising: an objective lens condensing a light flux emitted from a light source on an information recording surface of an optical information recording medium, a phase control element having an optical surface formed a phase structure, arranged on the light source side to the objective lens, a supporting member holding the phase control element, and wherein the phase control element is held under the condition that an optical axis of the phase control element is inclined by a certain angle to an optical axis of the objective lens, and under the condition that an intersection at which the optical axis of the phase control element crosses the optical surface formed the phase structure, accords with a central prolonged optical path which is passing through the optical axis of the objective lens.

(5) A lens unit for use in an optical pickup apparatus, comprising: an objective lens condensing a light flux emitted from a light source on an information recording surface of an optical information recording medium, a phase control element having a first optical surface formed a first phase structure on the light source side and a second optical surface formed a second phase structure on the objective lens side in two opposed optical surfaces, arranged on the light source side to the objective lens, a supporting member holding the phase control element, and wherein the phase control element is held under the condition that an optical axis of the phase control element is inclined by a certain angle to an optical axis of the objective lens, and under the condition that an intersection at which an optical axis of the optical surface which has larger influence of a coma aberration caused by de-centering in the first and the second optical surface, crosses the optical surface, accords with a central prolonged optical path which is extended passing through an optical axis of the objective lens.

(6) A lens unit for use in an optical pickup apparatus, comprising: an objective lens condensing a light flux emitted from a light source on an information recording surface of an optical information recording medium, a phase control element having a first optical surface formed a first phase structure on the light source side and a second optical surface formed a second phase structure on the objective lens side in two opposed optical surfaces, arranged on the light source side to the objective lens, a supporting member holding the phase control element, and wherein the phase control element is held under the condition that an optical axis of the phase control element is inclined by a certain angle to the objective lens, and under the condition that a first intersection at which an optical axis of the first optical surface crosses the first optical surface and a second intersection at which an optical axis of the second optical surface crosses the second optical surface which are separated from the central prolonged optical path which is extended passing through an optical axis of the objective lens so that a coma aberration caused by the de-centering is balanced one of the first and the second optical surfaces with the other of the first and the second optical surfaces.

(7) A lens unit for use in an optical pickup apparatus, comprising: an objective lens condensing a light flux emitted from a light source on an information recording surface of an optical information recording medium, a phase control element having a first optical surface formed a first phase structure on the light source side and a second optical surface formed a second phase structure on the objective lens side in two opposed optical surfaces, arranged on the light source side to the objective lens, a supporting member holding the phase control element, and wherein the phase control element is structured in such a manner that optical axes of the first and the second optical surface are separated by a predetermined distance in parallel with each other, and wherein the phase control element is held under the condition that optical axes of the first and the second optical surfaces are inclined by a certain angle to an optical axis of the objective lens.

(8) An optical element for use in an optical pickup apparatus, comprising: a first optical surface having a first phase structure, a second optical surface having a second phase structure, opposed on the first optical surface, and wherein an optical axis of the first optical surface and an optical axis of the second optical surface are separated by a predetermined distance in parallel with each other.

(9) A lens frame holding of a plurality of optical elements in an optical pickup apparatus, comprising:
a first holding portion having a first reference plane which regulates one of the plurality of optical elements from moving in an optical axis direction and having a first engagement portion which regulates the one of the plurality of optical elements from moving in a direction perpendicular to the optical axis, a second holding portion having a second reference plane which regulates another one of the plurality of optical elements from moving in an optical axis direction and having a second engagement portion which regulates the another one of the plurality of the plurality of optical elements from moving in the direction perpendicular to the optical axis, provided on a light source side than the first holding portion, and wherein one of the first and second reference planes is formed to incline by a predetermined angle to a surface perpendicular to the optical axis.

(10) An optical pickup apparatus for conducting recording and/or reproducing information for each information recording surface of a first optical information recording medium equipped with a protective substrate having a thickness t1 and a second optical information recording medium equipped with a protective substrate having a thickness t2 (t1≦t2), with a light flux emitted from a light source, a first light source for emitting a first light flux having a wavelength of λ1, a second light source for emitting a second light flux having a wavelength of λ2 (λ1<λ2), an objective lens condensing each of the first and the second light fluxes on each the information recording surface of the first and the second information recording medium, an phase control element having an optical surface formed a phase structure, arranged on the light source side to the objective lens, and wherein the objective lens and the phase control element are held under the condition that an optical axis of the phase control element is inclined by a certain angle to an optical axis of the objective lens, and under the condition that an intersection at which the optical axis of the phase control element crosses the optical surface formed the phase structure, accords with a central prolonged optical path which is extended passing through the optical axis of the objective lens.

(11) An optical pickup apparatus for conducting recording and/or reproducing information for each information recording surface of a first optical information recording medium equipped with a protective substrate having a thickness t1, a second optical information recording medium equipped with a protective substrate having a thickness t2 (t1≦t2) and a third optical information recording medium equipped with a protective substrate having a thickness t3 (t2≦t3) with a light flux emitted from a light source, comprising: a first light source emitting a first light flux having a wavelength of λ1, a second light source emitting a second light flux having a wavelength of λ2 (λ1<λ2), a third light source emitting a third light flux having a wavelength of λ3 (λ2<λ3), an objective lens condensing each of the first, the second and the third light fluxes on each the information recording surface of the first, the second and the third information recording media, a phase control element having a first optical surface formed a first phase structure on the light source side and a second optical surface formed a second phase structure on the objective lens side in two opposed optical surfaces, arranged on the light source side to the objective lens, and wherein the objective lens and the phase control element are held under the condition that an optical axis of the phase control element is inclined by a certain angle to an optical axis of the objective lens, and under the condition that an intersection at which an optical axis of the optical surface which has larger influence of a coma aberration caused by de-centering in the first and the second optical surface, crosses the optical surface, accords with a central prolonged optical path which is extended passing through an optical axis of the objective lens.

(12) An optical pickup apparatus for conducting recording and/or reproducing information for each information recording surface of a first optical information recording medium equipped with a protective substrate having a thickness t1, a second optical information recording medium equipped with a protective substrate having a thickness t2 (t1≦t2) and a third optical information recording medium equipped with a protective substrate having a thickness t3 (t2≦t3) with a light emitted from a light source, comprising: a first light source emitting a first light flux having a wavelength of λ1, a second light source emitting a second light flux having a wavelength of λ2 (λ1<λ2), a third light source emitting a third light flux having a wavelength of λ3 (λ2<λ3), an objective lens condensing each of the first, the second and the third light fluxes on each the information recording surface of the first, the second and the third information recording media, a phase control element having a first optical surface formed a first phase structure on the light source side and a second optical surface formed a second phase structure on the objective lens side in two opposed optical surfaces, arranged on the light source side to the objective lens, and wherein the objective lens and the phase control element are held under the condition that a an optical axis of the phase control element is inclined by a certain angle to the objective lens and under the condition that a first intersection at which an optical axis of the first optical surface crosses the first optical surface and a second intersection at which an optical axis of the second optical surface crosses the second optical surface which are separated from the central prolonged optical path which is extended passing through an optical axis of the objective lens so that a coma aberration caused by the de-centering is balanced one of the first and the second optical surfaces with the other of the first and the second optical surfaces.

(13) An optical pickup apparatus for conducting recording and/or reproducing information for each information recording surface of a first optical information recording medium equipped with a protective substrate having a thickness t1, a second optical information recording medium equipped with a protective substrate having a thickness t2 (t1≦t2) and a third optical information recording medium equipped with a protective substrate having a thickness t3 (t2≦t3) with a light flux emitted from a light source, comprising: a first light source emitting a first light flux having a wavelength of λ1, a second light source emitting a second light flux having a wavelength of λ2 (λ1<λ2), a third light source emitting a third light flux having a wavelength of λ3 (λ2<λ3), an objective lens condensing each of the first, the second and the third light fluxes on each the information recording surface of the first, the second and the third information recording media, a phase control element having a first optical surface formed a first phase structure on the light source side and a second optical surface formed a second phase structure on the objective lens side in two opposed optical surfaces, arranged on the light source side to the objective lens, and wherein the phase control element is structured in such a manner that the optical axes of the first and the second optical surface are separated by a predetermined distance in parallel with each other, and wherein the phase control element is held under the condition that optical axes of the first and the second optical surfaces are inclined by a certain angle to an optical axis of the objective lens.

(14) An assembly method of a lens unit including a supporting member, an objective lens condensing a light flux emitted from a light source on an information recording surface of an optical information recording medium and a phase control element having an optical surface formed a phase structure, for use in an optical pickup apparatus, comprises the following steps: a first step attaching the objective lens to the supporting member, a second step attaching the phase control element to the supporting member so that an optical axis of the optical surface formed a phase structure is inclined by a certain angle to an optical axis of the objective lens, a third step adjusting a relative position between the attached phase control element and the attached objective lens in such a manner that an intersection at which the optical axis of the optical surface formed the phase structure crosses the optical surface is accorded with a central prolonged optical path which is extended passing through an optical axis of the objective lens, a fourth step fixing the attached phase control element to the supporting member, a fifth step fixing the attached objective lens to the supporting member.

(15) An assembly method of a lens unit including a supporting member, an objective lens condensing a light flux emitted from a light source on an information recording surface of an optical information recording medium and a phase control element having a first optical surface formed a first phase structure and a second optical surface formed a second phase structure, for use in an optical pickup apparatus, comprises the following steps: a first step attaching the objective lens to the supporting member, a second step attaching the phase control element to the supporting member so that an optical axis of the optical surface formed a phase structure is inclined by a certain angle to an optical axis of the objective lens, a third step adjusting a relative position between the attached objective lens and the attached phase control element in such a manner that a an optical axis of the phase control element is inclined by a certain angle to the objective lens and that a first intersection at which an optical axis of the first optical surface crosses the first optical surface and a second intersection at which an optical axis of the second optical surface crosses the second optical surface which are separated from the central prolonged optical path which is extended passing through an optical axis of the objective lens so that a coma aberration caused by the de-centering is balanced one of the first and the second optical surfaces with the other of the first and the second optical surfaces, a fourth step fixing the attached phase control element to the supporting member, a fifth step fixing the attached objective lens to the supporting member.

The invention itself together with further objects and attendant advantages, will best be understood by reference to the following description taken in conjunction with the accompanying drawings.

BRIEF DESCRIPTION OF THE DRAWINGS

FIGS. 3(a) to 3(h) are sectional views for explaining concrete examples of a phase structure formed in the central area of the diffraction lens.

FIG. 20 is a view for explaining the longitudinal sectional structure of the 3 wavelength semiconductor laser which is mounted in the optical pick-up apparatus shown in FIG. 19.

FIGS. 22(a) to 22(h) are sectional views for explaining concrete examples of the phase structure formed on a single surface of the diffraction lens.

Figure 1:
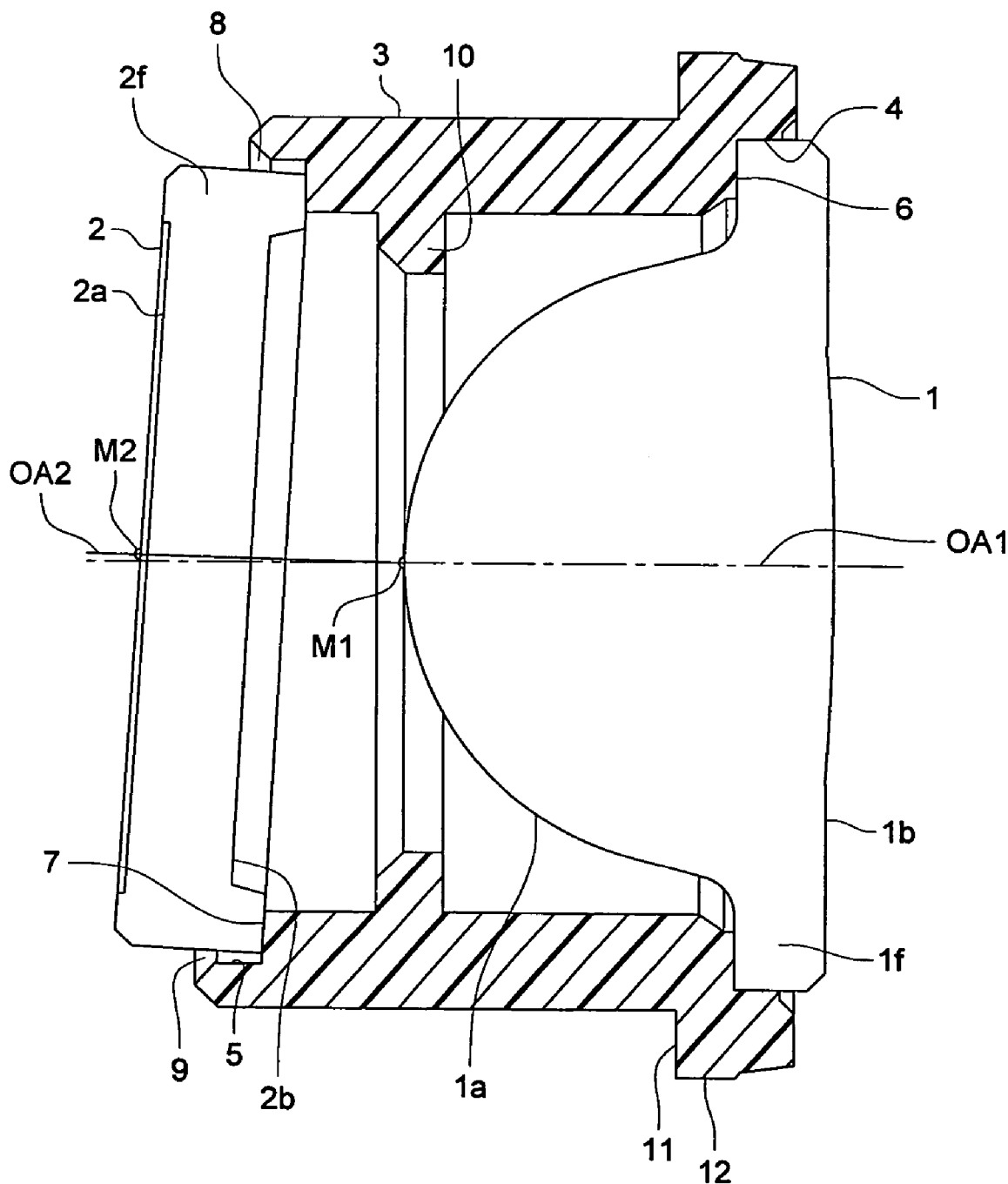
FIG. 1 is a side sectional view of a lens unit of the first embodiment.

DESCRIPTION OF THE REFERENCE NUMERALS AND SIGNS 1, 101: Objective lens main body
2, 102: Diffraction lens
2a: the first surface
2b: the second surface
2d, 3d: Cutout
3: Lens frame
4, 5: Engagement section
6, 7: Reference surface
8: play
50, 150: Objective lens unit
61: 2-wavelength semiconductor laser
63: Polarizing beam splitter
65: Cylindrical lens
67: Photo detector
72: 2-dimensional actuator
CA: Central area
D1: First optical disk
D2: second optical disk
DB, DD, DC: Optical disk
M1, M2: Marker
S1,MB, MC, MD,MS2: Information recording surface
OA0: Optical axis
OA1, OA2: Optical axis
264D, 264C: Polarizing beam splitter
267B, 267D, 267C: Photo detector
271: Holder In the following description, like parts are designed by like reference numbers throughout the several drawings.

DESCRIPTION OF THE PREFERRED EMBODIMENT

Hereupon, "the central prolonged optical path" used herein is an optical path of the ray of light passing according to Snell's law (n1 sin θ1=n2 sin θ2) passing the optical axis of the objective lens.

Further, "the phase control element" used herein, means an optical element having the phase structure, and "the phase structure" is a general name of the structure which has a plurality of step differences in the second optical axis, and adds the optical path difference (phase difference) to the incident light flux. The optical path difference added to the incident light flux by this step differences may also be integer times of the wavelength of the incident light flux, or may also be non-integer times of the wavelength of the incident light flux. As the concrete example of such a phase structure, there is the diffraction structure in which the step differences are arranged with periodic intervals in the direction perpendicular to the optical axis, or the optical path difference addition structure (called also the phase difference addition structure).

Further, "central point (or intersection) is on the central prolonged optical path" or "central point (or intersection) accords with the central prolonged optical path" used herein includes that the central point(or the intersection) exits on the "central prolonged optical path", or includes that a distance t between the central point (or the intersection) and "the central prolonged optical path" is within several micron(0<t≦3).

In order to solve the problems as described above, a lens unit according to item 1 has: (a) an objective lens having an inherent first optical axis, arranged on an optical information recording medium; (b) a phase control element having an inherent second optical axis and having two opposed optical surfaces, arranged on a light source side; and (c) a supporting member holding the phase control element to the objective lens under the condition that the second optical axis of the phase control element is inclined by a certain angle to the first optical axis of the objective lens and under the condition that a central point in the optical surface formed a phase structure of the two opposed optical surfaces, is on the central prolonged optical path which is extended passing through the first optical axis of the objective lens.

In the above-described lens unit, because the supporting member holds at least one of 2 central points under the condition that it is positioned on the optical path passing through the central point, irrespective of the inclination amount of the phase control element, the coma aberration of the lens unit can be reduced. That is, in the imaging using both of the objective lens main body and the phase control element, even when the phase control element is inclined to the objective lens main body, when one of central points of the phase control element is positioned on the optical path passing through the central point and arranged, the generation of the coma aberration can be suppressed. Accordingly, irrespective of the distance or the relative inclination between the objective lens main body and the phase control element, the optical performance of the lens unit can be simply improved.

The invention written in item 2 is characterized in that: in the lens unit written in item 1, the phase control element gives a compatibility for at least two using light fluxes having different wavelength from each other to the objective lens and a numerical aperture of the phase control element is more than 0.6 in use of the using light flux which has longer wavelength in the at least two using light fluxes.

In this case, the high density recording becomes possible by the high NA lens unit, and the accuracy lower than sub-micron meter is required for the positioning of the phase control element, however, the generation of the coma aberration can be suppressed as described above, and the optical performance required for the lens unit can simply be attained.

Further, the invention written in item 3 is characterized in that: in the lens unit written in item 1 and 2, the phase control element give a compatibility for at least two using light fluxes having different wavelength from each other to the objective lens and has a feature to cause coma aberration of more than 5 mλRMS, in which the wavelength is made λ, if the second optical axis of the phase control element shifts 3 μm in parallel with the first optical axis of the objective lens when the light flux having longer wavelength of the at least two using light fluxes is used.

Where RMS expresses "Root Mean Square". In this case, the accuracy less than several micron meter is required for the positioning of the phase control element, however, the generation of the coma aberration can be suppressed as described above, and the optical performance required for the lens unit can simply be attained.

Further, relating to the invention written in item 4, in the lens unit written in items 1 to 3, the phase control element is plane-like member and having a phase structure in a central region of the second optical axis in at least one of the two opposed optical surfaces, and having a flat surface in a peripheral region of the periphery of the central region.

In this case, the condensing using the incident light on the central region of the phase control element, and the condensing of the comparatively high NA using the incident light on the entire surface of the phase control element can be conducted.

Further, relating to the invention written in item 5, in the lens unit written in item 4, when the light flux having a longer wavelength in at least two using light fluxes is used, the light flux is made incident on the central region of the phase control element.

In this case, generally by the using light whose recording density is low and whose wavelength is long, the condensing by using the phase structure of the central region of the phase control element is conducted, and generally, by the using light whose recording density is higher, and whose wavelength is short, the condensing of the high NA by sing the entire surface of the phase control element is conducted. Hereupon, when the using light of the short wavelength is condensed, for example, the phase structure is made so as not to act on the condensing.

Further, relating to the invention written in item 6, in the lens unit written in items 1 to 5, positioning marks are formed on at least one of two central points of the phase control element, and on at least one of two central points of two opposed optical surface included in the objective lens.

In this case, the simple positioning by using the positioning mark provided on both of the phase control element and the objective lens main body becomes possible.

Further, relating to the invention written in item 7, in the lens unit written in item 6, the objective lens has the positioning mark at the central point of the optical surface on the phase control element side.

In this case, the objective lens main body can be easily observed from the phase control element side.

Further, relating to the invention written in item 8, in the lens unit written in items 6 and 7, the phase control element has the positioning mark at the central point of the optical surface formed a phase structure of the two opposed optical surfaces.

In this case, the positioning of the phase control element can be conducted on the basis of the phase structure of the phase control element.

Further, relating to the invention written in item 9, in the lens unit written in items 1 to 8, the phase structure formed in the phase control element has at least one of a diffractive structure and a path difference providing structure.

Further, relating to the invention written in item 10, in the lens unit written in item 9, the phase structure of the phase control element provides a phase difference to the light flux having shorter wavelength in the at least two using light fluxes and does not provide a phase difference to the light flux having longer wavelength in the at least two using light fluxes.

In this case, the condensing by using the objective lens main body becomes possible in the using light flux having the shorter wavelength, and the condensing by using the objective lens main body and the phase control element becomes possible in the using light flux having the longer wavelength.

Further, relating to the invention written in item 11, in the lens unit written in item 1 to 10, is a lens unit used for at least two using light fluxes having different wavelength from each other and one of the two opposed optical surface of the phase control element has the first phase structure which acts on the first wavelength light flux which is one of the at least two using light fluxes, and the other of the two opposed optical surface of the phase control element has a second phase structure which acts on the second wavelength light which is the other one of the at least two using light fluxes.

In this case, the lens unit can be made the unit having the condensing characteristic corresponding to 2 wavelengths or 3 wavelengths, and as the lens unit, the generation of the coma aberration is reduced and the optical performance of the lens unit can be improved.

Further, relating to the invention written in item 12, in the lens unit written in item 11, a phase control element is held by the supporting member under the condition that it is positioned to the objective lens on the basis of the phase structure in which an influence of the coma aberration caused by a de-centering is larger in the first and the second phase structure.

In this case, when the phase structure side which has a larger influence to the coma aberration, is accurately positioned, the optical characteristic of the lens unit can be improved as a whole.

Further, relating to the invention written in item 13, in the lens unit written in item 12, the objective lens has a positioning mark at the central point of an optical surface on the phase control element side, and wherein the phase control element has a positioning mark at the central point of an optical surface on which the structure in which an influence of the coma aberration caused by a de-centering is larger in the first and the second phase structure.

Further, relating to the invention written in item 14 is, in the lens unit written in item 1, a lens unit used for the using light having at least 2 different wavelengths, and one of the opposed surfaces has the first phase structure acting on the light of the first wavelength which is one of using light having at least 2 different wavelengths, and the other one of the opposed surfaces has the second phase structure acting on the light of the second wavelength which is the other one of using light having at least 2 different wavelengths, and the supporting member holds 2 central points on the opposed surfaces of the phase control element under the condition that the points are shifted in the reversal direction perpendicular to the concerned optical path passing through the central points from the optical path passing through the central points.

In this case, the lens unit can be a unit having a condensing characteristic corresponding to 2 wavelengths or 3 wavelengths, and while the coma of each wavelength generated by the first and the second phase structure is appropriately adjusted, the generation of the coma as the lens unit can be reduced.

Further, relating to the invention written in item 15, in the lens unit written in item 14, the phase control element is held by the supporting member under the condition that it is positioned to the objective lens main body so that the influence of the coma aberration respectively generated by the de-centering of the first and the second phase structures are almost balanced.

In this case, the coma of each wavelength generated by the first and the second phase structures can be balanced.

Further, relating to the invention written in item 16, in the lens unit written in item 15, the objective lens main body has the mark for positioning at the central point on the phase control element, and the phase control element has the mark for positioning at each central point on the opposed surfaces.

Further, relating to the invention written in item 17, in the lens unit written in items 1 to 16, at least one of the phase control element, objective lens main body, and supporting member has an inclination mark showing the inclination direction of the second optical axis to the first optical axis.

In this case, the optical pick-up apparatus can be assembled by considering the inclination of the phase control element.

Further, the optical pick-up apparatus written in item 18 has the lens unit for forming a spot on the information recording surface of the optical information recording medium written in item 1 to 17, and can read the information of the optical information recording medium, or can write the information in the optical information recording medium.

In the above-described optical pick-up apparatus, because the optical performance of the lens unit can be simply improved without accompanying the complexity of the assembling process, the recording and/or reproducing of the optical information becomes possible in the high accuracy.

Further, the optical pick-up apparatus written in item 19 has the lens unit for forming a spot on the information recording surface of the optical information recording medium written in item 11, a first light source capable of emitting the first wavelength light flux and arranging on the central prolonged optical path, a second light source capable of emitting the second wavelength light flux and arranging separated from the central prolonged optical path so that the coma aberration of the lens unit for the second wavelength light flux is reduced.

In the above-described optical pick-up apparatus, because the optical performance of the lens unit can be simply improved without accompanying the complexity of the assembling process, the recording and/or reproducing of the optical information becomes possible in the high accuracy.

In this case, the coma aberration of each wavelength generated by the first and the second phase structure, can be attained by the positioning of the first phase structure and by the shifting or the position of the second light source, and the generation of the coma as the lens unit can be very reduced.

Further, relating to the optical pick-up apparatus written in item 20, in the optical pick-up apparatus written in item 19, the first phase structure has the larger influence of the coma aberration by the de-centering than the second phase structure.

In this case, by shifting of the position of the second light source, a cancel of the coma can be reduced, and the burden of the design work or the manufacturing can be reduced.

Further, relating to the optical pick-up apparatus written in item 21, in the optical pick-up apparatus written in item 19 and 20, the objective lens has the positioning mark at the central point of an optical surface on the phase control element side, and wherein the phase control element has a positioning mark at the central point of an optical surface on which the structure in which an influence of the coma aberration caused by a de-centering is larger in the first and the second phase structure.

Further, the invention of the lens unit according to item 22 is provided with an objective lens having an inherent main-optical axis, arranged on an optical information recording medium, an phase control element having a first optical surface formed a first phase structure and a second optical surface formed a second phase structure, and wherein the phase control element is structured in such a manner that a first sub-optical axis of the first optical surface and a second sub-optical axis of the second optical surface are separated by a certain distance in parallel with each other, a supporting member holding the phase control element to the objective lens, wherein the phase control element is held under the condition that the first and the second sub-optical axes are inclined by a certain angle to the main-optical axis.

In the above-described lens unit, because the supporting member fixes the phase control element to the objective lens main body so that the fist and the second sub-optical axes are inclined to the main optical axis by a predetermined angle, the phase control element is in the status that it is inclined to the objective lens main body, and it can be prevented that the returning light from the phase control element is incident on the image sensor of the interferometer. Accordingly, the influence of the returning light when the imaging characteristic is measured for the lens unit is reduced, and the measurement of the imaging characteristic can simply be made high accurate.

Herein, in the phase control element, because the first and the second sub-optical axes are separated by a predetermined distance in parallel with each other, the position for the direction perpendicular to the optical axis of the second phase structure can be relatively adjusted to the position of the first phase structure. This means that, for each of the fist and the second phase structures, the influence on the imaging characteristic can be independently controlled. As this result, the lens unit, for example, whose imaging characteristic is improved as in the following, can be obtained. That is, even when the first and the second sub-optical axes, that is, the phase control element is inclined to the main optical axis, when, in the phase control element, the first and the second sub-optical axes are separated by an appropriate interval in an appropriate direction corresponding to the inclination amount, the influence of the aberration generation which can be generated by the relative position-dislocation of the first and the second phase structures which is generated due to the inclination of the phase control element can be cancelled each other. Specifically, irrespective of the inclination angle of the phase control element, both of the first and the second phase structures can be positioned to the main optical axis of the objective lens main body, and the imaging characteristic of the lens unit can be improved.

Further, relating to the invention written in item 23, in the lens unit written in item 22, the direction in which the first and the second sub-optical axes of the phase control element are in lined to the main-optical axis is parallel with the plane including the first and the second sub-optical axes.

In this case, because the structural position-dislocation direction between the first and the second phase structures and the inclination direction of the phase control element can be made to accord with each other, the generation of the coma due to its inclination can be prevented by the phase control element itself, and the imaging characteristic of the lens unit can be improved.

Further, relating to the invention written in item 24, in the lens unit written in items 22 and 23, the phase control element is held under the condition that a central point of the first optical surface and a central point of the second optical surface are on the central prolonged optical path which is extended passing through the main-optical axis of the objective lens. In this case, corresponding to the inclination amount of the phase control element, the coma aberration of the lens unit can accurately be reduced. Accordingly, irrespective of the distance between the objective lens main body and the phase control element or the mutual relative inclination, the optical performance of the lens unit can simply be improved.

Further, relating to the invention written in item 25, in the lens unit written in item 22 to 24, positioning marks are formed on at least one of central points of the first and the second optical surface, and on at least one of central points of the two opposed optical surfaces of the objective lens.

In this case, the simple positioning by using the marks for positioning provided in the phase control element and the objective lens main body becomes possible.

Further, relating to the invention written in item 26, in the lens unit written in item 25, the objective lens has the positioning mark at the central point of the optical surface on the phase control element side.

In this case, the objective lens main body can be easily observed from the phase control element side.

Further, relating to the invention written in item 27, in the lens unit written in items 22 to 26, the phase control element gives a compatibility for three using light fluxes having different wavelength from each other to the objective lens, and wherein an optical information recording medium side's numerical aperture of entire system of the lens unit is more than 0.6 in use of at least the one using light flue in two light fluxes which are provided a phase in the three using light fluxes.

In this case, the high density recording becomes possible by the high NA lens unit, however, it is necessary that the measurement of the imaging characteristic of the lens unit is made highly accurate, and the positioning of the phase control element is made highly accurate, for example, into not larger than sub-micron meter. According to this lens unit, because it becomes possible that, as described above, the measurement of the imaging characteristic is made highly accurate, and the generation of the coma is suppressed, the lens unit in which the required specification is satisfied can be effectively manufactured.

Further, relating to the invention written in item 28, in the lens unit written in items 22 to 27, the phase control element gives a compatibility for three using light fluxes having different wavelength from each other to the objective lens, and which has a feature to cause a coma aberration of more than 5 m$\lambda$RMS if at least one of the first and the second sub-optical axes shift 3 $\mu$m in parallel with the first optical axis in a use of at least one using light flux in the two light fluxes which are provided a phase in the three using light fluxes.

Herein, RMS expresses "Root Mean Square". Also in this case, it is necessary that the measurement of the imaging characteristic of the lens unit is made highly accurate, and the positioning of the phase control element is made highly accurate, for example, into not larger than sub-micron meter, however, as described above, because it becomes possible that the measurement of the imaging characteristic of the lens unit is made highly accurate, and that the generation of the coma is suppressed, the lens unit in which the required specification is satisfied can be effectively manufactured. Hereupon, the coma which is generated when the sub-optical axes of the phase control element are sifted by 3 μm, is about 5-50 mλ RMS as a preferable range in a practical meaning.

Further, relating to the invention written in item 29, in the lens unit written in items 22 to 28, the first and the second phase structure of the phase control element has at least one of a diffractive structure and a optical path difference providing structure.

Further, relating to the invention written in item 30, in the lens unit written in items 22 to 29, the phase control element gives a compatibility for three using light fluxes having different wavelength from each other to the objective lens, and wherein the phase control element doesn't provide a phase difference to a first using light flux having shortest wavelength in the three using light fluxes and provide a phase difference to the two using light fluxes which have longer wavelength than a wavelength of the first using light flux.

In this case, the lens unit can be a lens unit having the condensing characteristic corresponding to 3 wavelengths, and the optical performance of the lens unit can be improved.

Further, relating to the invention written in item 31, in the lens unit written in item 30, a spherical aberration compensation of the objective lens is optimized for the first using light flux.

Herein, a phrase of "spherical aberration compensation of the objective lens is optimized" means that the wave-front aberration on the information recording surface of the optical information recording medium which is reproduced or recorded by using the using light of the first wavelength, is not larger than 0.07 λRMS. Herein, λ is a wavelength value of the first wavelength.

Further, the invention written in item 32, in the lens unit written in items 22 to 31, has a mark to specify a direction in which the first and the second sub-optical axes are inclined to the main-optical axis.

In this case, the mark is directly formed on any one of the objective lens main body, phase control element, and supporting member, or attached to them as these accessories.

Further, the invention written in item 33 is provided with (a) an objective lens condensing a light flux emitted from a light source on an information recording surface of an optical information recording medium, and having an inherent main-optical axis, and (b) a phase control element including two opposed first and second optical surfaces, and the first optical surface having a first phase structure, and the second optical surface having a second phase structure, arranged on the light source side to the objective lens, and (c) a supporting member holding the phase control element to the objective lens, and wherein the phase control element is held to the objective lens under the condition that each optical axis of the first and the second optical surface of the phase control element is inclined by a certain angle to the main-optical axis of the objective lens, and under the condition that a central point of the first optical surface and a central point of the second optical surface which are on the central prolonged optical path which is extended passing through the main-optical axis of the objective lens.

In the above-described lens unit, because the supporting member fixes the phase control element to the objective lens main body so that the opposed surfaces are inclined to the main optical axis, it can be prevented that the returning light from the phase control element is incident on the image sensor of the interferometer or the photo detecting sensor in the optical pick-up apparatus. Accordingly, the influence of the returning light when the imaging characteristic is measured for the lens unit is reduced, and the measurement of the imaging characteristic can be simply made highly accurate. Further, in the same manner, the optical pick-up apparatus by which the influence of the returning light is reduced, and whose optical performance is improved, can be provided.

Further, in the above-described lens unit, because the central point of the first phase structure and the central point of the second phase structure are positioned on the optical path passing through the central point which is extended passing through the main optical axis, irrespective of the inclination amount of the phase control element, the coma aberration of the lens unit, can be accurately reduced. Accordingly, irrespective of the distance between the objective lens main body and the phase control element or the relative inclination between them, the optical performance of the lens unit can simply be improved.

Further, the optical pick-up apparatus written in item 34 is provided with the lens unit written in items 22 to 33, and can read the information of the optical information recording medium, or can write the information in the optical information recording medium.

In the optical pick-up apparatus described above, because the optical performance of the lens unit can be simply improved without accompanying the complexity of the assembling process, the recording and/or reproducing of the optical information becomes possible in a high accuracy.

Particularly, when the optical performance of the lens unit is measured, because the returning light from the lens unit can be reduced, the measurement of the optical characteristic can simply be made highly accurate, and by the lens unit having higher performance, the optical pick-up apparatus which is highly accurate, and is highly reliable, can be provided.

Further, the lens unit for the optical pick-up apparatus according to the invention written in item 35 has (a) an objective lens condensing a light flux emitted from a light source on an information recording surface of an optical information recording medium, and (b) a phase control element having an optical surface formed a phase structure, arranged on the light source side to the objective lens, and (c) a supporting member holding the phase control element, and wherein the phase control element is held under the condition that an optical axis of the phase control element is inclined by a certain angle to an optical axis of the objective lens, and under the condition that an intersection at which the optical axis of the phase control element crosses the optical surface formed the phase structure, accords with a central prolonged optical path which is passing through the optical axis of the objective lens.

In the above-described lens unit, because the phase control element having the phase structure is held by the supporting member under the condition that it is inclined to the objective lens, it can be prevented that the returning light from the phase control element is incident on the image sensor of the interferometer or on the photo detecting sensor in the optical pick-up apparatus. Accordingly, the influence of the returning light when the imaging characteristic for the lens unit is measured, can be reduced, and the measurement of imaging characteristic can be simply made highly accurate, or the optical pick-up apparatus whose optical performance is improved, can be provided.

Further, because the intersection at which the optical surface having the phase structure crosses its optical axis, is positioned so that it is in accordance with a point on the optical path passing through the central point which is extended passing through the optical axis of the objective lens, irrespective of the inclination amount of the phase control element, the coma aberration of the lens unit can be accurately reduced.

Further, relating to the invention written in item 36, in the lens unit written in item 35, the supporting member is formed by being integrated with any one of the phase control element and the objective lens.

By the lens unit, when any one of the phase control element or the objective lens is structured by being integrated with the supporting member by the integral molding, the holding process by the supporting member of the concerned optical element becomes unnecessary separately.

Further, relating to the invention written in item 37, in the lens unit written in item 35, the lens unit is used for at least two using light fluxes having different wavelength form each other and one of two opposed optical surface of the phase control element has the first phase structure which acts on the first wavelength light flux which is one of the at least two using light fluxes, and the other of the two opposed optical surfaces of the phase control element has a second phase structure which acts on the second wavelength light flux which is the other one of the at least two using light fluxes.

By the above-described lens unit, because, the invention can provide the wavelength light appropriate for the objective lens having the compatibility with at least 2 using light to the objective lens, an appropriate lens unit for the compatible pick-up apparatus using a plurality of wavelength light can be provided.

Further, relating to the invention written in item 38, in the lens unit written in item 35, because the phase control element provides a predetermined optical path difference to at least 3 different wavelength light, the invention has the first phase structure on the optical surface on the light source side and the second phase structure on the optical surface on the objective lens side.

By the above-described lens unit, because the wavelength light appropriate for the objective lens having the compatibility with at least 3 using light, can be provided, the lens unit appropriate for the optical pick-up apparatus having the compatibility with 3 kinds of optical information recording media using 3 wavelength light can be provided.

Further, relating to the invention written in item 39, in the lens unit written in item 37, the phase control element is held under the condition that a first intersection at which an optical axis of the first optical surface crosses the first optical surface and a second intersection at which an optical axis of the second optical surface crosses the second optical surface, accords with the central prolonged optical path which is passing through the optical axis of the objective lens.

By the above-described lens unit, irrespective of the inclination amount of the phase control element, the coma aberration of the lens unit can be accurately reduced. Thereby, irrespective of the distance between the objective lens and the phase control element, or relative inclination between them, the optical performance of the whole lens unit can be simply improved.

Further, relating to the invention written in item 40, in the lens unit written in items 35 to 39, the phase control element give a compatibility for at least two using light fluxes having different wavelength from each other to the objective lens and has a feature to cause coma aberration of more than 5 m$\lambda$RMS if the second optical axis of the phase control element shifts 3 μm in parallel with the first optical axis of the objective lens when the light flux having longer wavelength of the at least two using light fluxes is used.

By the above-described lens unit, even when it is an element for which the accuracy less than several μm is required for such a positioning, the generation of the coma aberration can be suppressed good, and the optical performance required for the lens unit can be simply attained.

Further, relating to the invention written in item 41, in the lens unit written in items 35 to 40, the phase control element is plane-like member and having a phase structure in a central region of the second optical axis in at least one of the two opposed optical surfaces, and having a flat surface in a peripheral region of the periphery of the central region. By the above-described lens unit, the condensing using the incident light on the central region of the phase control element, and the condensing of comparatively high NA using even the incident light on the peripheral region positioned in its periphery, can be conducted, and the lens unit is effective as a unit for the optical pick-up apparatus which is used for the highly densified optical information recording medium.

Further, the invention written in item 42 has, in the lens unit written in items 39 to 41, the mark for positioning at the first intersection of the phase control element, and at an intersection of the optical surface of the objective lens and the optical axis.

By the above-described lens unit, a simple positioning by using the marks for positioning provided on both of the phase control element and the objective lens becomes possible.

Further, relating to the invention written in item 43, in the lens unit written in items 35, is used for at least two using light fluxes having different wavelength from each other, and the phase structure of the phase control element provides a phase difference to the light flux having shorter wavelength in the at least two using light fluxes and does not provide a phase difference to the light flux having longer wavelength in the at least two using light fluxes.

By the above-described lens unit, the condensing by using the objective lens becomes possible in the using light flux whose wavelength is shorter, and a good condensing becomes possible by the phase control element and the objective lens in the using light flux whose wavelength is longer.

Further, relating to the invention written in item 44, in the lens unit written in items 35 to 43, at least one of the phase control element, objective lens and supporting member has a mark to specify an inclination direction to the optical axis of the objective lens.

By the above-described lens unit, in the assembling process of the optical pick-up apparatus, the assembly in which the inclination of the phase control element is previously considered, can be conducted.

Further, relating to the invention written in item 45, in the lens unit written in items 35, is used for at least two using light fluxes having different wavelength from each other and one of two opposed optical surface of the phase control element has the first phase structure which acts on the first wavelength light flux which is one of the at least two using light fluxes, and the other of the two opposed optical surface of the phase control element has a second phase structure which acts on the second wavelength light which is the other one of the at least two using light fluxes.

By the above-described lens unit, the lens unit can be made a unit having a condensing characteristic corresponding to 2 wavelengths or 3 wavelengths, and a lens unit in which the generation of the coma aberration is reduced and the optical characteristic is good, can be provided.

Further, relating to the invention written in item 46, in the lens unit written in item 45, a first light source capable of emitting the first wavelength light flux and arranging on the central prolonged optical path, a second light source capable of emitting the second wavelength light flux and arranging separated from the central prolonged optical path so that the coma aberration of the lens unit for the second wavelength light flux is reduced, and an optical pick-up apparatus by which the information of the optical information recording medium can be read, or the information can be written in the optical information recording medium. By the above-described optical pick-up apparatus, because the optical performance of the lens unit can be simply improved without accompanying the complexity of the assembling process, the recording and/or reproducing of the optical information becomes possible highly accurately.

Further, relating to the invention written in item 47, in the optical pick-up apparatus written in item 46, the first phase structure has the larger influence of the coma aberration by the de-centering than the second phase structure.

By the above-described optical pick-up apparatus, the coma can be reduced by the position shifting of the second light source, and the burden in the design work or manufacturing can be reduced.

Further, relating to the invention written in item 48, in the optical pick-up apparatus written in item 47, the objective lens has a positioning mark at the central point of an optical surface on the phase control element side, and wherein the phase control element has a positioning mark at the central point of an optical surface on which the structure in which an influence of the coma aberration caused by a de-centering is larger in the first and the second phase structure.

By the above-described optical pick-up apparatus, because the coma whose influence is large can be reduced with priority, the optical pick-up apparatus in which the burden in the design work or manufacturing is light and effective and the optical characteristic is good, can be provided.

Further, relating to the invention written in item 49, in the lens unit written in item 35, the phase control element is held under the condition that a first intersection at which an optical axis of the first optical surface crosses the first optical surface and a second intersection at which an optical axis of the second optical surface crosses the second optical surface, accords with the central prolonged optical path which is passing through the optical axis of the objective lens.

By the above-described lens unit, it can be prevented that the returning light from the phase control element is incident on the image sensor of the interferometer, further, it can be prevented that the concerned returning light is incident on the light sensor also when the optical pick-up apparatus is used. Furthermore, irrespective of the inclination amount of the phase control element to the objective lens, because the coma can be accurately reduced, the lens unit for the optical pick-up apparatus whose optical characteristic is improved can be provided.

Further, the lens unit for the optical pick-up apparatus of the invention written in item 50 has: (a) an objective lens condensing a light flux emitted from a light source on an information recording surface of an optical information recording medium, and (b) a phase control element having a first optical surface formed a first phase structure on the light source side and a second optical surface formed a second phase structure on the objective lens side in two opposed optical surfaces, arranged on the light source side to the objective lens, and (c) a supporting member holding the phase control element, and wherein the phase control element is held under the condition that an optical axis of the phase control element is inclined by a certain angle to an optical axis of the objective lens, and under the condition that an intersection at which an optical axis of the optical surface which has larger influence of a coma aberration caused by de-centering in the first and the second optical surface, crosses the optical surface, accords with a central prolonged optical path which is extended passing through an optical axis of the objective lens.

Because the coma aberration whose influence is larger can be reduced with priority, the above-described lens unit can improve the optical performance of the lens unit as a whole.

Further, relating to the invention written in item 51, in the lens unit written in item 50, the supporting member is formed by integrating with any one of the phase control element and the objective lens.

By the above-described lens unit, when any one of the phase control element and the objective lens is structured by being integrated with the supporting member by the integral molding, the holding process of the concerned optical element to the supporting member becomes unnecessary separately.

Further, the invention written in item 52 is a lens unit for the optical pick-up apparatus, and has: (a) an objective lens condensing a light flux emitted from a light source on an information recording surface of an optical information recording medium, and (b) a phase control element having a first optical surface formed a first phase structure on the light source side and a second optical surface formed a second phase structure on the objective lens side in two opposed optical surfaces, arranged on the light source side to the objective lens, and (c) a supporting member holding the phase control element, and wherein the phase control element is held under the condition that an optical axis of the phase control element is inclined by a certain angle to the objective lens, and under the condition that a first intersection at which an optical axis of the first optical surface crosses the first optical surface and a second intersection at which an optical axis of the second optical surface crosses the second optical surface which are separated from the central prolonged optical path which is extended passing through an optical axis of the objective lens so that a coma aberration caused by the de-centering is balanced one of the first and the second optical surfaces with the other of the first and the second optical surfaces.

The above-described lens unit can reduce with good balance for the coma aberration generated by the respective optical surface having the first phase structure and optical surface having the second phase structure, and the lens unit which is good as the optical characteristic, can be provided.

Further, relating to the invention written in item 53, in the lens unit written in item 52, the supporting member is formed by integrating with any one of the phase control element and the objective lens.

By the above-described lens unit, when any one of the phase control element and the objective lens is structured by being integrated with the supporting member by the integral molding, the holding process of the concerned optical element to the supporting member becomes unnecessary separately.

Further, the invention written in item 54 is a lens unit for the optical pick-up apparatus, and has: (a) an objective lens condensing a light flux emitted from a light source on an information recording surface of an optical information recording medium, and (b) a phase control element having a first optical surface formed a first phase structure on the light source side and a second optical surface formed a second phase structure on the objective lens side in two opposed optical surfaces, arranged on the light source side to the objective lens, and (c) a supporting member holding the, phase control element, and wherein the phase control element is structured in such a manner that optical axes of the first and the second optical surface are separated by a predetermined distance in parallel with each other, and wherein the phase control element is held under the condition that optical axes of the first and the second optical surfaces are inclined by a certain angle to an optical axis of the objective lens.

By the above-described lens unit, because it can be prevented that the returning light from the phase control element is incident on the image sensor of the interferometer, the measurement of the imaging characteristic can be simply made highly accurate. Further, because it can also be prevented in the same manner that the returning light from the concerned phase control element when the optical pick-up apparatus is used, is incident on the photo sensor, the optical pick-up apparatus whose optical performance is improved can be provided. Furthermore, because the position of the direction perpendicular to the optical axis of the second phase structure can be relatively adjusted to the position of the first phase structure of the phase control element, that is, each phase structure can be independently controlled, in the phase control element, when each optical axis is separated by an appropriate interval in the appropriate direction corresponding to the inclination amount, it becomes possible that the influence of the aberration generated by a relative positional dislocation of the first and the second phase structures generated due to the inclination of the phase control element, is cancelled each other. Further, not depending on the inclination angle, both of each optical axis of the phase control element can also be in conformity with the extended optical path which extends along the optical axis of the objective lens, and the optical characteristic of the lens unit can be more improved.

Further, relating to the invention written in item 55, in the lens unit written in item 54, the supporting member is integrated with the phase control element or the objective lens.

By the above-described lens unit, when any one of the phase control element and the objective lens is structured by being integrated with the supporting member by the integral molding, the holding process of the concerned optical element to the supporting member becomes unnecessary separately.

Further, the invention written in item 56 is an optical element used for the optical pick-up apparatus, and has (a) a first optical surface having a first phase structure, and (b) a second optical surface having a second phase structure, opposed on the first optical surface, and wherein an optical axis of the first optical surface and an optical axis of the second optical surface are separated by a predetermined distance in parallel with each other.

The above-described optical element can prevent that the returning light of the incident light in the concerned optical element is incident on the photo sensor even when the optical pick-up apparatus is used, and further, also that, when the imaging is measured, the returning light is incident on the image sensor of the interferometer in the same manner. Furthermore, even when such an optical element is inclined, because the good accurate optical axis adjusting becomes possible between other optical element and it, the optical system or optical pick-up apparatus, in which a problem of the coma is few, can be provided.

Further, the invention written in item 57 is relation to a lens frame holding of a plurality of optical element in an optical pickup apparatus, and it has (a) a first holding portion having a first reference plane which regulates one of the plurality of optical elements from moving in an optical axis direction and having a first engagement portion which regulates the one of the plurality of optical elements from moving in a direction perpendicular to the optical axis, and (b) a second holding portion having a second reference plane which regulates another one of the plurality of optical elements from moving in an optical axis direction and having a second engagement portion which regulates the another one of the plurality of optical elements from moving in the direction perpendicular to the optical axis, provided on a light source side than the first holding portion, and wherein one of the first and second reference planes is formed to incline by a predetermined angle to a surface perpendicular to the optical axis.

According to the above-described lens frame, by considering the influence on the sensor by the returning light of the incident light generated by a plurality of optical elements, because the first or second reference surface is structured in such a manner that they are inclined to the surface perpendicular to the optical axis, without considering the inclination of the optical element, the influence can be effectively lightened by a simple fitting.

Further, relating to the invention written in item 58, in the lens frame written in item 57, at least one of the first and the second engagement portions has a clearance for adjusting an optical element attached in the first or the second reference plane in the direction perpendicular to the optical axis.

According to the above-described lens frame, the lens can be held by suppressing the influence of the coma aberration by the held optical element.

Further, relating to the invention written in item 59, in the lens frame written in item 58, a protruding portion which includes a portion protruding on the optical information recording medium side than an outer surface of the optical element attaching opposed on the optical information recording medium, is formed on an outer surface of the lens frame faced on an optical information recording medium.

According to the above-described lens frame, even when WD becomes short, and the frequency of the collision of the objective lens with the optical information recording medium is heightened, the damage of the objective lens or the optical information recording medium, or both of them can be prevented by such a structure.

Further, relating to the invention written in item 60, in the lens frame written in item 58, a coating layer including fluorine series resin as a main component is formed on an outer surface of the lens frame faced on an optical information recording medium.

According to the above-described lens frame, even when WD becomes short, and the frequency of the collision of the objective lens with the optical information recording medium is heightened, the damage of the objective lens or the optical information recording medium, or both of them can be prevented by such a structure.

Further the invention written in item 61, is an optical pickup apparatus for conducting recording and/or reproducing information for each information recording surface of a first optical information recording medium equipped with a protective substrate having a thickness t1 and a second optical information recording medium equipped with a protective substrate having a thickness t2 (t1≦t2), with a light flux emitted from a light source, comprising: (a) a first light source for emitting a first light flux having a wavelength of $\lambda 1$, and (b) a second light source for emitting a second light flux having a wavelength of $\lambda 2$ ($\lambda 1 < \lambda 2$), and (c) an objective lens condensing each of the first and the second light fluxes on each the information recording surface of the first and the second information recording medium, and (d) an phase control element having an optical surface formed a phase structure, arranged on the light source side to the objective lens, and wherein the objective lens and the phase control element are held under the condition that an optical axis of the phase control element is inclined by a certain angle to an optical axis of the objective lens, and under the condition that an intersection at which the optical axis of the phase control element crosses the optical surface formed the phase structure, accords with a central prolonged optical path which is extended passing through the optical axis of the objective lens.

According to the above-described optical pick-up apparatus, in the optical pick-up apparatus which conducts the recording and/or reproducing of the information by using the wavelength light having different wavelengths on at least different 2 kinds of optical information recording media, the optical pick-up apparatus by which the influence on the sensor by the returning light of the incident light by the phase control element can be prevented, and the influence of the coma of the phase control element is lightened and whose optical characteristic is good, can be provided.

Further, the invention written in item 62, in the optical pick-up apparatus written item 61, is a supporting member holds the objective lens and the phase control element, and thereby, the objective lens and the phase control element are utilized.

Further, the invention written in item 63, is an optical pickup apparatus for conducting recording and/or reproducing information for each information recording surface of a first optical information recording medium equipped with a protective substrate having a thickness t1, a second optical information recording medium equipped with a protective substrate having a thickness t2 (t1≦t2) and a third optical information recording medium equipped with a protective substrate having a thickness t3 (t2≦t3) with a light flux emitted from a light source, comprising : (a) a first light source emitting a first light flux having a wavelength of $\lambda 1$, and (b) a second light source emitting a second light flux having a wavelength of $\lambda 2$ ($\lambda 1 < \lambda 2$), and (c) a third light source emitting a third light flux having a wavelength of $\lambda 3$ ($\lambda 2 < \lambda 3$), and (d) an objective lens condensing each of the first, the second and the third light fluxes on each the information recording surface of the first, the second and the third information recording media, and (e) a phase control element having a first optical surface formed a first phase structure on the light source side and a second optical surface formed a second phase structure on the objective lens side in two opposed optical surfaces, arranged on the light source side to the objective lens, and wherein the objective lens and the phase control element are held under the condition that an optical axis of the phase control element is inclined by a certain angle to an optical axis of the objective lens, and under the condition that an intersection at which an optical axis of the optical surface which has larger influence of a coma aberration caused by de-centering in the first and the second optical surface, crosses the optical surface, accords with a central prolonged optical path which is extended passing through an optical axis of the objective lens.

According to the above-described optical pick-up apparatus, in the optical pick-up apparatus using the wavelength light of the different 3 wavelengths for at least different 3 kinds of optical information recording media, the optical pick-up apparatus by which the influence on the sensor by the returning light of the incident light by the phase control element can be prevented, and the influence of the coma of the phase control element is lightened, and whose optical characteristic is good, can be provided.

Further, The invention written in item 64 is characterized in that: in the optical pickup apparatus written in item 63, a supporting member holds the objective lens and the phase control element, and thereby, the objective lens and the phase control element are utilized.

Further, the invention written in item 65 is an optical pick-up apparatus for conducting recording and/or reproducing information for each information recording surface of a first optical information recording medium equipped with a protective substrate having a thickness t1, a second optical information recording medium equipped with a protective substrate having a thickness t2 (t1≦t2) and a third optical information recording medium equipped with a protective substrate having a thickness t3 (t2≦t3) with a light emitted from a light source, comprising: (a) a first light source emitting a first light flux having a wavelength of $\lambda 1$, and (b) a second light source emitting a second light flux having a wavelength of $\lambda 2$ ($\lambda 1 < \lambda 2$), and (c) a third light source emitting a third light flux having a wavelength of $\lambda 3$ ($\lambda 2 < \lambda 3$), and (d) an objective lens condensing each of the first, the second and the third light fluxes on each the information recording surface of the first, the second and the third information recording media, and (e) a phase control element having a first optical surface formed a first phase structure on the light source side and a second optical surface formed a second phase structure on the objective lens side in two opposed optical surfaces, arranged on the light source side to the objective lens, and wherein the objective lens and the phase control element are held under the condition that a an optical axis of the phase control element is inclined by a certain angle to the objective lens and under the condition that a first intersection at which an optical axis of the first optical surface crosses the first optical surface and a second intersection at which an optical axis of the second optical surface crosses the second optical surface which are separated from the central prolonged optical path which is extended passing through an optical axis of the objective lens so that a coma aberration caused by the de-centering is balanced one of the first and the second optical surfaces with the other of the first and the second optical surfaces.

According to the above-described optical pick-up apparatus, in the optical pick-up apparatus using the wavelength light of different 3 wavelengths for at least 3 kinds of optical information recording media, the optical pick-up apparatus by which the influence on the sensor by the returning light of the incident light by the phase control element can be prevented, and the coma respectively generated by the optical surface having the first phase structure and the optical surface having the second phase structure can be reduced with good balance, and whose optical characteristic is excellent, can be provided.

Further, relating to the invention written in item 66, in the optical pick-up apparatus written in item 65, a supporting member holds the objective lens and the phase control element, and thereby, the objective lens and the phase control element are utilized.

Further, the invention written in item 67 is an optical pickup apparatus for conducting recording and/or reproducing information for each information recording surface of a first optical information recording medium equipped with a protective substrate having a thickness t1, a second optical information recording medium equipped with a protective substrate having a thickness t2 (t1≦t2) and a third optical information recording medium equipped with a protective substrate having a thickness t3 (t2≦t3) with a light flux emitted from a light source, comprising: (a) a first light source emitting a first light flux having a wavelength of $\lambda 1$, and (b) a second light source emitting a second light flux having a wavelength of $\lambda 2$ ($\lambda 1 < \lambda 2$), and (c) a third light source emitting a third light flux having a wavelength of $\lambda 3$ ($\lambda 2 < \lambda 3$), and (d) an objective lens condensing each of the first, the second and the third light fluxes on each the information recording surface of the first, the second and the third information recording media, and (e) a phase control element having a first optical surface formed a first phase structure on the light source side and a second optical surface formed a second phase structure on the objective lens side in two opposed optical surfaces, arranged on the light source side to the objective lens, and wherein the phase control element is structured in such a manner that the optical axes of the first and the second optical surface are separated by a predetermined distance in parallel with each other, and wherein the phase control element is held under the condition that optical axes of the first and the second optical surfaces are inclined by a certain angle to an optical axis of the objective lens.

According to the above-described optical pick-up apparatus, in the optical pick-up apparatus using the wavelength light of different 3 wavelengths for at least 3 kinds of optical information recording media, the optical pick-up apparatus by which it can be prevented that the returning light from the phase control element is incident on the photo sensor, further, when, in the phase control element, each optical axis is separated by an appropriate interval in the appropriate direction corresponding to the inclination amount, not depending on the inclination angle, each of optical axes of the phase control element can be accorded to the axis on the extending optical path which is extended along the optical axis of the objective lens, and the optical pick-up apparatus in which the optical characteristic can be improved, can be provided.

Further, relating to the invention written in item 68, in the optical pick-up apparatus written in item 67, a supporting member holds the objective lens and the phase control element, and thereby, the objective lens and the phase control element are utilized.

Further, the invention written in item 69 is an assembly method of a lens unit including a supporting member, an objective lens condensing a light flux emitted from a light source on an information recording surface of an optical information recording medium and a phase control element having an optical surface formed a phase structure, for use in an optical pickup apparatus, comprising the following steps: (a) a first step attaching the objective lens to the supporting member, and (b) a second step attaching the phase control element to the supporting member so that an optical axis of the optical surface formed a phase structure is inclined by a certain angle to an optical axis of the objective lens, and (c) a third step adjusting a relative position between the attached phase control element and the attached objective lens in such a manner that an intersection at which the optical axis of the optical surface formed the phase structure crosses the optical surface is accorded with a central prolonged optical path which is extended passing through an optical axis of the objective lens, and (d) a fourth step fixing the attached phase control element to the supporting member, and (e) a fifth step fixing the attached objective lens to the supporting member.

According to the above-described assembly method, bad influence on the sensor by the returning light of the incident light which is incident on the phase control element, can be prevented, and the lens unit in which the influence of the coma by the phase control element is lightened, and whose optical characteristic is improved, can be provided.

Further, relating to the invention written in item 70, in the assembly method written in item 69, the third step adjusts a relative position between the attached phase control element and the attached objective lens in such a manner that an intersection at which an optical axis of an optical surface has larger influence of a coma aberration caused by de-centering in a first optical surface forming a first phase structure in the phase control element and a second optical surface forming a second phase structure in the phase control element, crosses the optical surface, accords with a central prolonged optical path which is extended passing through an optical axis of the objective lens.

According to the above-described positioning method, as the lens unit having the condensing property corresponding to 2 wavelengths or 3 wavelengths, the lens unit in which the coma whose influence is large is effectively lightened, and whose optical characteristic is improved, can be provided.

Further, the invention written in item 70 is an assembly method of a lens unit including a supporting member, an objective lens condensing a light flux emitted from a light source on an information recording surface of an optical information recording medium and a phase control element having a first optical surface formed a first phase structure and a second optical surface formed a second phase structure, for use in an optical pickup apparatus, comprising the following steps: (a) a first step attaching the objective lens to the supporting member, and (b) a second step attaching the phase control element to the supporting member so that an optical axis of the optical surface formed a phase structure is inclined by a certain angle to an optical axis of the objective lens, and (c) a third step adjusting a relative position between the attached objective lens and the attached phase control element in such a manner that a an optical axis of the phase control element is inclined by a certain angle to the objective lens and that a first intersection at which an optical axis of the first optical surface crosses the first optical surface and a second intersection at which an optical axis of the second optical surface crosses the second optical surface which are separated from the central prolonged optical path which is extended passing through an optical axis of the objective lens so that a coma aberration caused by the de-centering is balanced one of the first and the second optical surfaces with the other of the first and the second optical surfaces, and (d) a fourth step fixing the attached phase control element to the supporting member, and (e) a fifth step fixing the attached objective lens to the supporting member.

According to the above-described positioning method, because bad influence on the image sensor by the returning light of the incident light incident on the phase control element, can be prevented, and the coma respectively generated on the optical surface having the first phase structure and the second phase structure can be reduced with good balance, the lens unit which is good as the optical characteristic can be provided.

PREFERRED EMBODIMENT OF THE INVENTION

The First Embodiment

FIG. 1 is a side sectional view of an objective lens unit 50 for an optical pick-up apparatus according to the first embodiment of the present invention, and this objective lens unit 50 is structured in such a manner that it has the compatibility for 2 kinds of optical disks (for example, DVD and BD) whose standards (recording density) are different from each other, and the information can be recorded/reproduced for these optical disks. Further, this objective lens unit 50 has an objective lens main body 1 which is an objective optical element which condenses the laser light (using light flux) from not shown light source, and forms a condensing spot on not shown disk, a diffraction lens 2 which is a phase control element for forming the diffraction light, and a cylindrical lens frame 3 which is a supporting member for integrating the objective lens main body 1 and the diffraction lens 2 and fixing them. Herein, the objective lens main body 1 is formed of, for example, a material such as glass, and the diffraction lens 2 and the lens frame 3 are molded of, for example, plastic or the material in which the glass fine particles of several tens percent are added to the plastic.

The objective lens main body 1 is an aspheric both convex lens in which the fist surface 1*a* which is an optical surface on the diffraction lens 2 side is largely protruded, and the second surface 1*b* on the optical disk side (right side in the drawing) is formed comparatively flat, and which condenses the diffraction light corresponding to a pair of different wavelengths from the diffraction lens 2 or non-diffraction light on a predetermined place of each optical disk.

The diffraction lens 2 can form the diffraction light when it has the phase structure on the first surface 2*a* which is the optical surface on the reversal side to the objective lens main body 1. Hereupon, the second surface 2*b*, which is the optical surface on the objective lens main body 1 side, is formed in such a manner that it is a flat surface in this case, and does not influence on the imaging.

Figure 2:
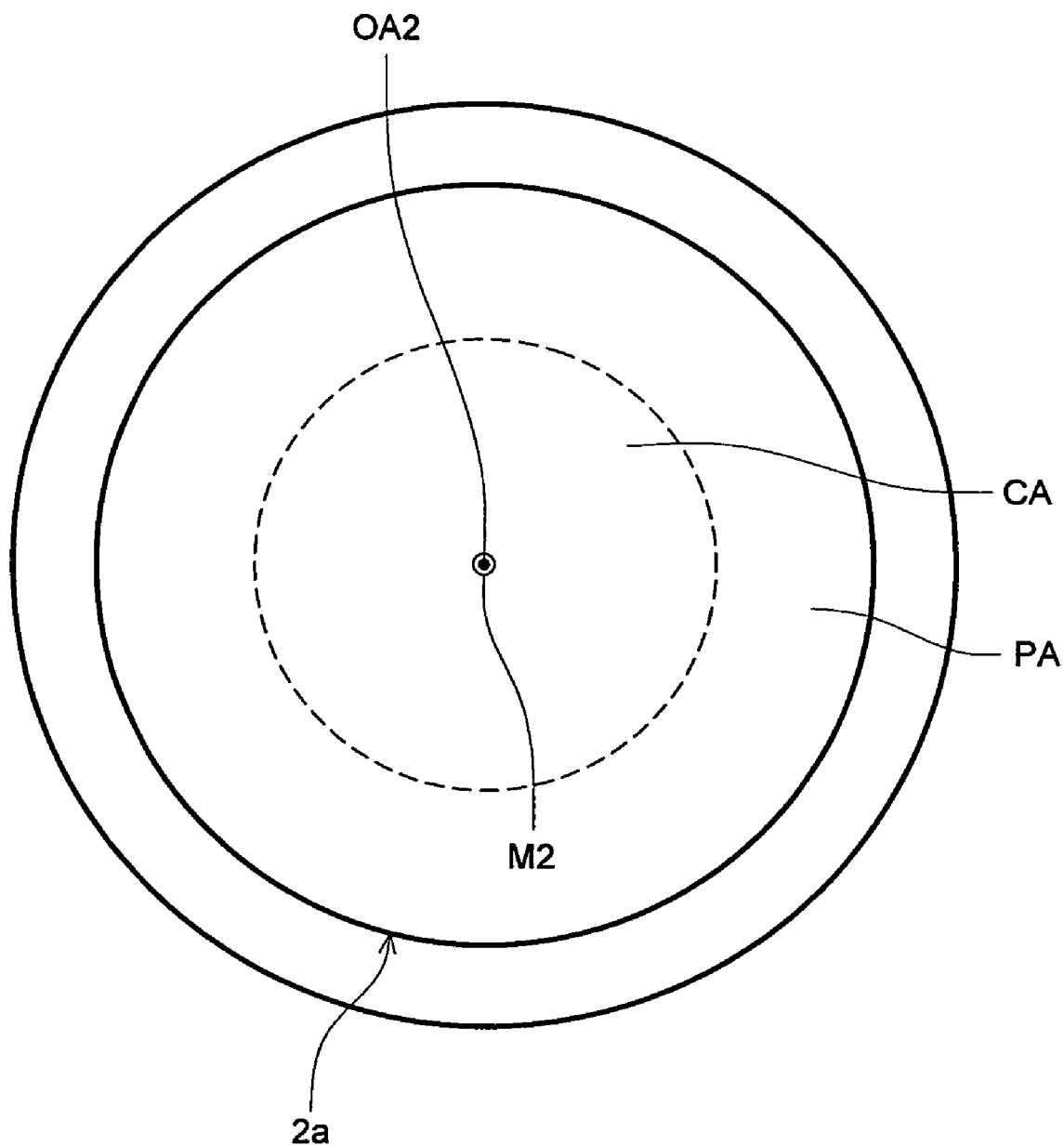
FIG. 2 is a front view of a diffraction lens structuring the lens unit.
Figure 4A:
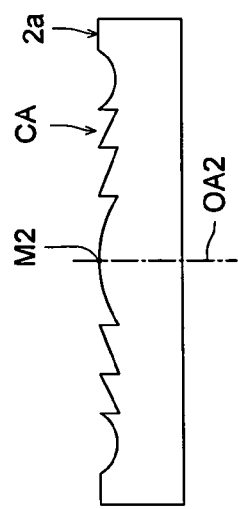
FIGS. 4(a) to 4(h) are sectional views for explaining concrete examples of the phase structure formed in the central area of the diffraction lens.
Figure 4B:
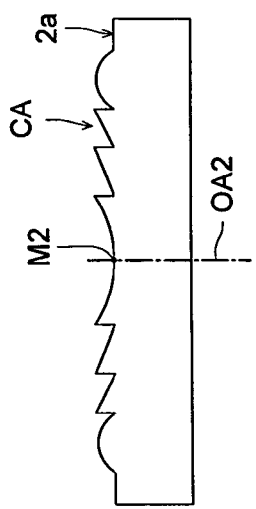
Figure 4C:
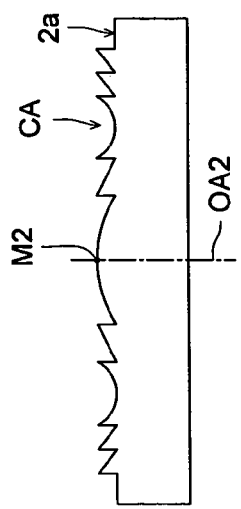
Figure 4D:
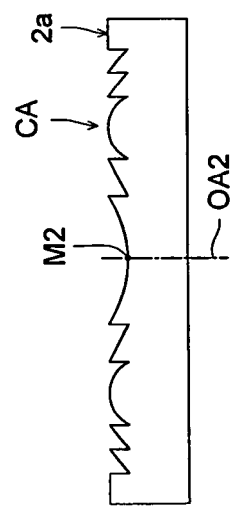
Figure 4E:
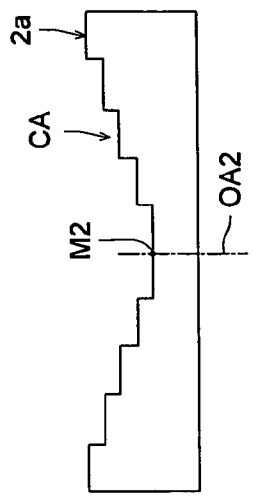
Figure 4F:
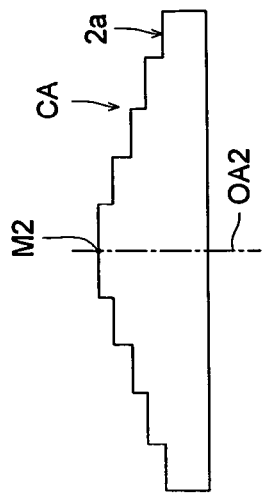
Figure 4G:
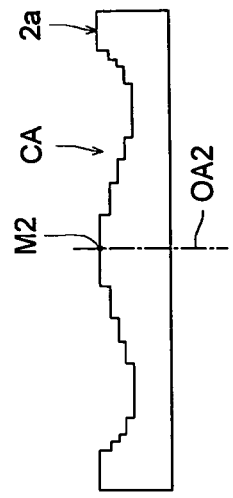
Figure 4H:
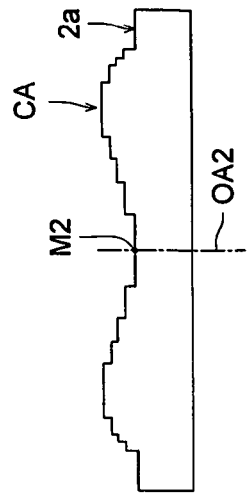

As shown in FIG. 2, the first surface 2*a* of the diffraction lens is divided into a circular central region CA around the optical axis OA2 and a peripheral region PA of the periphery of the central region CA. The central region CA has the phase structure, and the peripheral region PA is a flat surface. The central region CA has a diffraction property for the laser light of wavelength 655 nm for DVD, however, does not have the diffraction property for the laser light of wavelength 405 nm for BD. That is, when the laser light of wavelength 655 nm for DVD is incident on the central region CA, the laser light is diverged by a predetermined power by the diffraction effect, and when the laser light of wavelength 405 nm for BD is incident on the central region and the peripheral region PA, the diffraction effect is not generated and the laser light passes as it is. That is, in the case of the present embodiment, by a combination of the objective lens 1 and the diffraction lens 2, the imaging which is compatible, with a desired accuracy, for both laser light for DVD and BD, becomes possible, and each laser light can be used as the information reading light or information recording light of each optical disk.

Hereupon, the optical axis OA2 of the diffraction lens 2 herein, is, because the second surface 2*b* is a flat surface, an optical axis in accord with the optical axis of the second surface 2*a*.

Hereupon, on the objective lens main body 1 and the diffraction lens 2, as the positioning mark which is a reference for mutually positioning the central position through which respective optical axes OA1, OA2 pass, circular protrusive markers M1, M2 are formed respectively.

FIGS. 3(*a*)-(*f*) are sectional views for explaining the concrete example of the multi-level type diffractive structure as the phase structure formed in the central region CA provided on the first surface 2*a* of the diffraction lens 2. In this multi-level type diffractive structure, the pattern whose sectional shape including the optical axis OA2 is step-like is arranged concentric circularly, and for each number of a predetermined level surface number (5 levels in FIGS. 3(*a*)-(*f*)), it has the structure in which the step is shifted by the height of the number of steps (4 steps in FIGS. 3(*a*)-(*f*)) corresponding to its number of level surfaces, and when the laser light of wavelength 655 nm for DVD is incident, the diffraction light is generated, and when the laser light of wavelength 405 nm is incident, it has the characteristic that the light is transmitted as it is, without generating the diffraction effect. For such a multi-level type diffractive structure, because it is written on page 230-231 of the technical digest of ISOM '03(INTERNATIONAL SYMPOSIUM ON OPTICAL MEMORY 2003, the detailed description will be omitted herein. FIGS. 3(*a*), (*b*) show an example of the multi-level type diffractive structure, in which the inclination of each pattern is in the same direction making the optical axis OA2 the reference, and FIGS. 3(*c*), (*d*) show an example of the multi-level type diffractive structure on whose outer periphery, the phase reversal section is provided, and FIG. 3(*e*), (*f*) show the example of the multi-level type diffractive structure, in which the inclination of each pattern is reversal on the outside from the phase reversal section.

Hereupon, as the phase structure, a saw-toothed diffraction structure whose sectional shape including the optical axis OA2 is saw-tooth shape, as shown in FIGS. 3(*g*), (*h*), and 4(*a*)-(*d*), or as shown in FIGS. 4(*e*), (*f*), a step-shaped diffraction structure whose all step differences are in the same direction on the basis of the optical axis OA2, or as shown in FIGS. 4(*g*), (*h*), the optical path difference providing structure in which a direction of the step is switched in the mid-way may be formed in the central region CA provided on the first surface 2*a* of the diffraction lens 2. FIGS. 3(*g*), (*h*) show an example of the saw-toothed diffraction structure in which the inclination of each saw-tooth is in the same direction on the basis of the optical axis OA2, FIGS. 4(*a*), (*b*) show an example of the saw-toothed diffraction structure in which the phase reversal section is provided in the outer periphery, and FIGS. 4(*c*), (*d*) show an example of the saw-toothed diffraction structure in which the inclination of each saw-tooth is reversed on the outside of the phase reversal section.

Returning to FIG. 1, the lens frame 3 is provided with the first and the second step-like engagement sections 4, 5 which are cylindrical, on both ends, ring-shaped first and second reference surfaces 6,7, ring-shaped stop 10, ring-shaped third reference surface 11, and the third engagement section 12.

The first and the second engagement sections 4, 5 are cylindrical inner surfaces having respectively step difference, and fix flanges 1*f*, 2*f* of the objective lens main body 1 and diffraction lens 2 respectively in the optical axis perpendicular direction. The first and the second reference surfaces 6, 7 are formed being connected to the first and the second engagement sections 4, 5, and when the objective lens main body 1 and the diffraction lens 2 are attached, they are reference for positioning the flanges 1*f*, 2*f* in the optical axes OA1, OA2 directions. A play 8 is provided in the second engagement section 5. This play 8 makes the fine adjustment to adjust the central position to the objective lens main body 1 at the time of positioning of the diffraction lens 2 possible. On end portions of the first and the second engagement sections 4, 5, chamfer-like adhesive agent pool sections 9 are formed. When this adhesive agent pool sections 9 and the outer periphery of flange sections 1*f*, 2*f* of the objective lens main body 1 and the diffraction lens 2 are cooperated, v-grooves are formed, and after adhesion of both lenses 1, 2, or during the adhesion, it is prevented that the adhesive agent is overflowed to the periphery. The stop 10 arranged on the lens frame 3 inner wall which is between the first engagement section 4 and the second engagement section 5, conducts the cut-off of unnecessary light when the objective lens unit 50 is used, or the adjustment of light amount. The third reference surface 11 becomes the reference of the attaching for the optical axis OA1 direction or the inclination, when both lenses are attached to a holder which is a part of the optical pick-up apparatus, and the third engagement section 12 becomes the reference for the direction perpendicular to the optical axis.

Hereupon, the first surface 2*a* of the diffraction lens 2 is slightly inclined to the objective lens main body 1. That is, the optical axis OA2 of the diffraction lens 2 has the minute inclination which is not 0, to the optical axis OA1 of the objective lens main body 1. Such an inclination is generated due to the shape error or the remaining of the burr at the time of manufacture of the lens frame 3, and in FIG. 1, it is expressed exaggeratingly, however, normally, it is further small. When the first surface 2a of the diffraction lens 2 is inclined as described above, accompanied with this, the central region CA is inclined to the optical axis OA1 and shifted in the direction perpendicular to the optical axis OA1. Such an inclination or shift does not particularly influence on the condensing characteristic for the laser light of wavelength 405 nm for BD on which the diffraction action is not received by the multi-level type diffractive structure formed in the central region CA, however, influences on the condensing characteristic for the laser light of wavelength 655 nm for DVD on which the diffraction action is received by the multi-level type diffractive structure, and there is a possibility that the aberration is generated at the time of condensing. In the objective lens unit 50 of the present embodiment, details will be described later, however, when the centering of the objective lens main body 1 and the diffraction lens 2 is devised, even when the diffraction lens 2 is inclined to the optical axis OA of the objective lens main body, it is formed in such a manner that the imaging accuracy more than a predetermined accuracy is attained.

Hereupon, there is a case where the optical axis OA1 is inclined by the manufacturing error of the objective lens main body 1. Also in this case, because the optical axis OA2 of the diffraction lens 2 is relatively inclined to the optical axis OA1 of the objective lens main body 1, as the result, it may be treated as the relative inclination of the first surface 2a of the diffraction lens 2.

The manufacturing process of the objective lens unit 50 in the present embodiment will be described below. Initially, the objective lens main body 1 is attached to the lens frame 3. The flange surface of the objective lens main body 1 is brought into contact with the first reference surface 6, and the adhesive agent is injected into the adhesive agent pool section 9. Hereby, the objective lens main body 1 is fixed at a predetermined position. In this case, because the superfluous adhesive agent is stayed in the adhesive agent pool section 9, it can be prevented that the adhesive agent is spilt out in the periphery.

Next, the diffraction lens 2 is attached to the side opposed to the objective lens main body 1 attached to the lens frame 3. The flange surface of the diffraction lens 2 is brought into contact with the second reference surface 7, and the positioning to the objective lens main body 1 is conducted. In this case, the second engagement section 5 is designed in such a manner that the inner diameter is slightly larger than the outer diameter of the diffraction lens 2, and the difference is a play 8. Hereby, the diffraction lens 2 can be moved for the direction perpendicular to the optical axis direction, and while observing the opposed objective lens main body 1, the relative positioning for the direction perpendicular to the optical axis can be conducted.

After the positioning of the diffraction lens 2 is conducted, the adhesive agent is injected into the adhesive agent pool section 9. Hereby, the diffraction lens 2 is fixed under the condition that it is positioned. In this case, because the superfluous adhesive agent is stayed in the adhesive agent pool section 9, it can be prevented that the adhesive agent is spilt out in the periphery, during the adhering or after the adhering. Further, a stop 10 operates as a sag-proof when the adhesive agent enters into the inside of the lens frame.

From the above-description, the objective lens unit 50 is manufactured. As described above, the objective lens unit 50 is 3-part composition further using, in addition to the objective lens main body 1 and the diffraction lens 2, the lens frame 3. Hereby, the relative positioning for the direction perpendicular to the optical axis of the objective lens main body 1 and the diffraction lens 2 can be previously conducted with high accuracy.

Hereupon, in the present description, it is made that the objective lens main body 1 is before, the diffraction lens 2 is after, for the order of the attaching. This is for the convenience of the design work that, when positioning, the positioning is more easily observed from the diffraction lens 2 side whose diffraction power is smaller. However, when the positioning is conducted, for example, by making the objective lens main body 1 back side, it is of course that the attaching order is changed. Further, as the other fixing means, for example, also by the laser deposition, both lenses 1, 2 can be fixed to the lens frame 3. Further, the play may exist not only on the diffraction lens 2 side, but also on both of the diffraction lens 2 and the objective lens main body 1.

Figure 5:
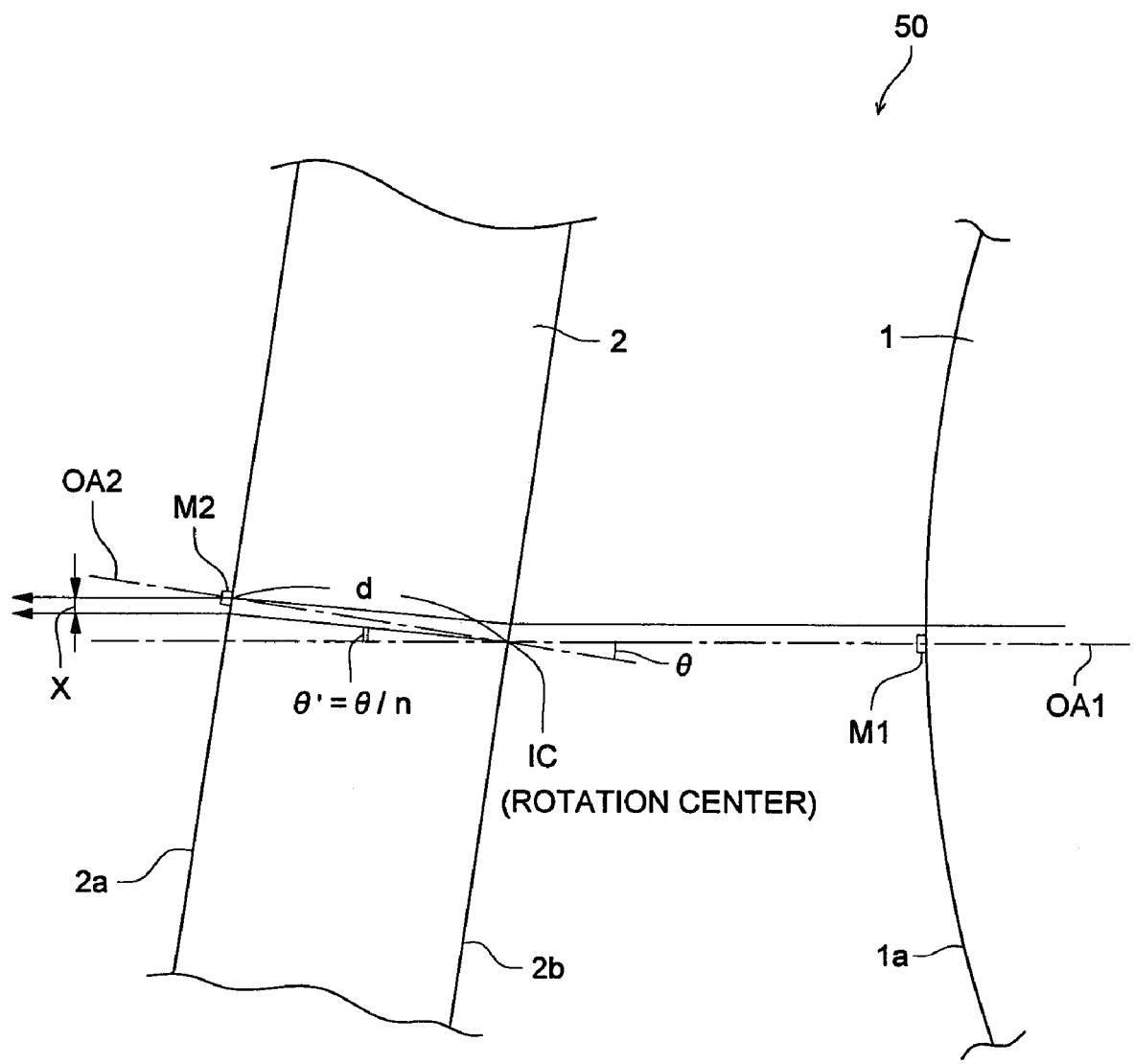
FIG. 5 is an enlarged view for explaining the positioning of an objective lens unit of FIG. 1.
Figure 6:
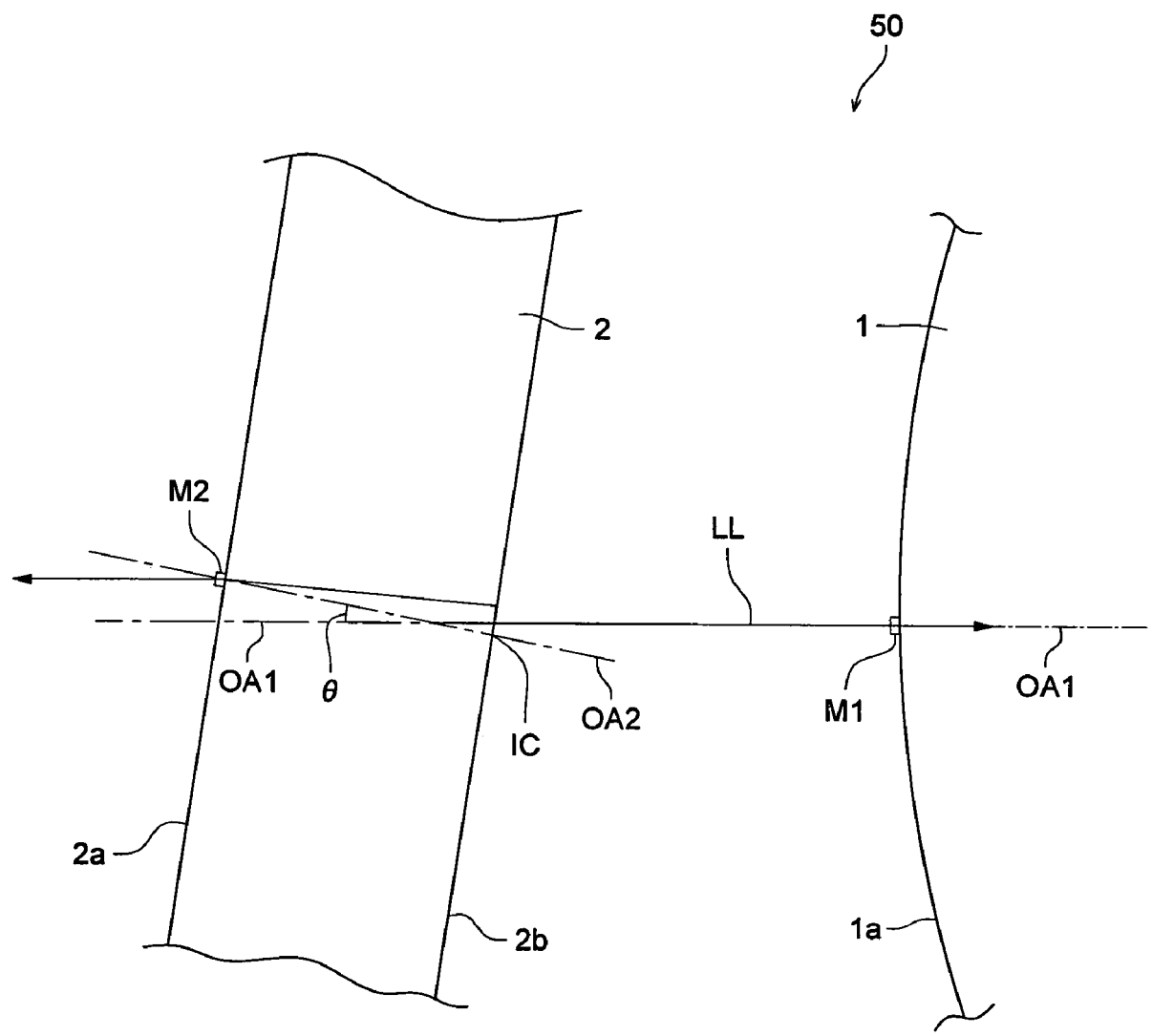
FIG. 6 is an enlarged view for explaining the positioning of the objective lens unit of FIG. 1.

FIGS. 5 and 6 are enlarged views for conceptually explaining the condition before and after the positioning of the diffraction lens 2 to the objective lens main body 1. As shown in FIG. 5, in the condition before the positioning, the inclination of the diffraction lens 2 is allowed, and it is assumed that the optical axis OA2 of the diffraction lens 2 is inclined by angle $\theta$ to the optical axis OA1 of the objective lens main body 1, around the inner side center IC which is an intersection of the second surface 2b and the optical axis OA2. In such a manner, even when the diffraction lens 2 is inclined, in order not to deteriorate the imaging characteristic of the objective lens unit 50, as shown in FIG. 6, it is desirable that the positioning is conducted so that the laser light LL which is incident in parallel on the optical axis OA1 of the objective lens main body 1 from, for example, the light source side, passes the marker M2 which is a center of the diffraction lens 2, further, passes the marker M1 which is a center of the objective lens min body 1, and advances along the optical axis OA1. In this manner, when, by using the markers M1, M2, the centers of the objective lens main body 1 and the diffraction lens 2 are made in accord with each other in the direction of optical axis OA1, irrespective of a value of inclination angle $\theta$ of the diffraction lens 2, the coma generated at least as the objective lens unit 50 can be reduced. As shown in FIG. 5, in the condition before the positioning, positions of both markers M1, M2 are shifted by a distance X in the direction perpendicular to the optical axis. This distance X is given by the following equation $X = d \cdot (\sin\theta - \sin(\theta/n))$, from the inclination angle $\theta$ and the refractive index n of the diffraction lens 2. Before the positioning, because the coma for the wavelength 655 nm for DVD is generated due to this shift amount X, it is necessary that the generation of the coma is practically suppressed, by shifting the marker M1 of the objective lens main body 1 by the distance X to the marker M2 of the diffraction lens 2 in the direction perpendicular to the optical axis by the positioning. Such a positioning can be comparatively easily attained, specifically, while the objective lens main body 1 attached to the lens frame 3 is observed on the optical axis OA1 from the left side of the drawing, the diffraction lens 2 is arranged on this side of the objective lens main body 1, the diffraction lens 2 is moved in the second engagement section 5 of the lens frame 3 so that both markers M1, M2 are in accord with each other. Hereby, the condition as shown in FIG. 6 is attained, and the imaging characteristic of the objective lens unit 50 can, be secured. Hereupon, because the direction of the optical axis OA1 of the objective lens main body 1 can be comparatively easily determined by each kind of measuring apparatus, the objective lens main body 1 and the diffraction lens 2 are observed by the microscope from the direction of the optical axis OA1 determined in such a manner. When observed, the positioning may be conducted so that both markers M1, M2 are in accord with each other in the image plane.

Referring to FIGS. 5 and 6, concrete generation of the aberration or its correction will be described below. Hereupon, it is assumed for the convenience of the description that the diffraction lens 2 is inclined by θ=3° to the objective lens main body 1 around the inside center IC which is an intersection of the second surface 2b and the optical axis OA2. The decentering errors generated in this condition are 3 of the inclination of the first surface 2a, the shift of the first surface 2a, and the inclination of the second surface 2b. Both of the inclination angle of the first surface 2a and the inclination angle of the second surface 2b are 3°, and the coma for the wavelength 655 nm for DVD generated by this, are respectively +105 mλPMS, −105 mλRMS, and they are cancelled each other. However, because the coma for the wavelength 655 nm for DVD due to the shift of the first surface 2a is −71 mλRMS, the coma as the whole of the objective lens unit 50 is −71 mλRMS. Hereupon, when the thickness d of the diffraction lens 2 is 0.9 mm, and the refractive index n of the diffraction lens 2 for the wavelength 655 nm for DVD is 1.505, the shift amount X of the first surface 2a is 16 μm.

Hereupon, as the inclination angle, when the effect of the influence prevention of the returning light, and the optical action (for example, the divergence, convergence action to the using wavelength light) to the incident light of the concerned phase control element are considered, an angle more than 1° and less than 5° is preferable.

As it is, the aberration as the objective lens unit 50 for DVD, exceeds the Marechal limit, and exceeds a practical allowable range. The positioning by which the coma of the objective lens unit 50 is made almost zero will be described below. As shown in FIG. 6, by using the makers M1, M2, the center (the intersection of the optical axis of the objective lens main body 1 and the optical surface) of the objective lens main body 1 and the center of the diffraction lens 2 (the intersection of the first, second surfaces 2a, 2b and the optical axis OA2 of the diffraction lens 2) are made in accord with each other. Hereby, the coma as the whole of the objective lens unit 50 is 0 mλ. Accordingly, irrespective of the inclination angle θ of the diffraction lens 2, the thickness d of the diffraction lens 2, and a value of the refractive index n of the diffraction lens 2, the coma generated as the objective lens unit 50 can be made about zero.

The Second Embodiment

The objective lens unit of the second embodiment will be described below. The lens unit of the second embodiment is a modified lens unit of the objective lens unit 50 of the first embodiment shown in FIG. 1, and the part which is not particularly described, is a common one of the first embodiment.

Figure 7:
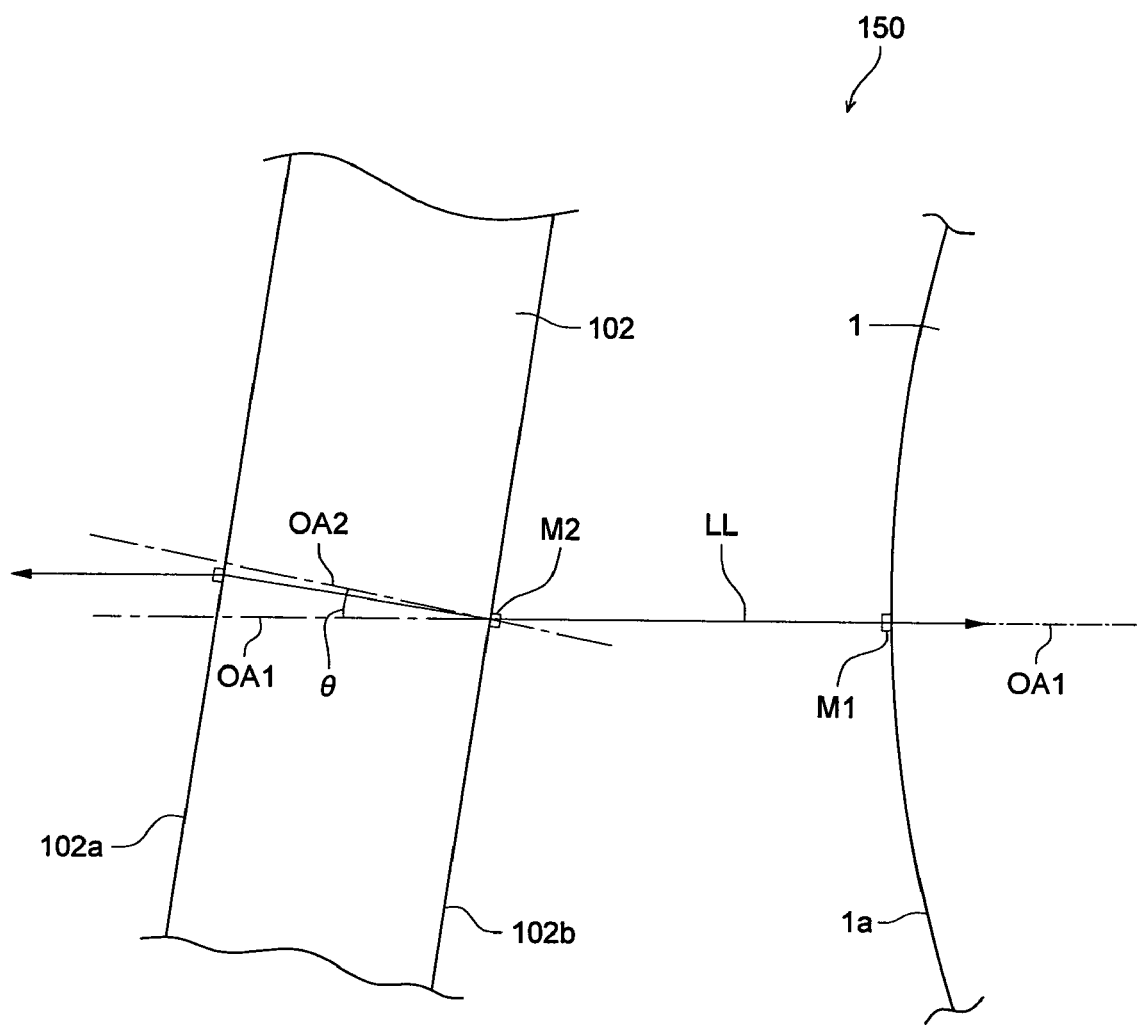
FIG. 7 is an enlarged view for explaining the positioning of an objective lens unit of the second embodiment.

FIG. 7 is an enlarged view for explaining the objective lens unit of the second embodiment. In the case of a objective lens unit 150 of the present embodiment, in a diffraction lens 102, the second surface 102b of the objective lens main body side has the phase structure, and the first surface 102a of the other side is a flat surface.

Hereupon, in the same manner as in the first embodiment, because, also in the diffraction lens 102, the first surface 102a is formed of a flat surface, the optical axis OA2 of the diffraction lens 102 is in accord with the optical axis of the second surface 102b.

In the same manner as in the first embodiment, it is assumed that the optical axis OA2 of the diffraction lens 102 is inclined by an angle θ to the optical axis OA1 of the objective lens main body 1. Even when the diffraction lens 102 is inclined in this manner, in order not to deteriorate the imaging characteristic of the objective lens unit 150, it is desirable that, for example, the laser light LL incident in parallel to the optical axis OA1 of the objective lens main body 1 from the light source side, passes the marker M2 which the center of the diffraction lens 102, further passes the marker M1 which is the center of the objective lens main body 1, and advances along the optical axis OA1. In this manner, when the centers of the objective lens main body 1 and the diffraction lens 102 are made in accord with each other in the optical axis OA1 direction by using the markers M1, M2, irrespective of a value the inclination angle θ of the diffraction lens 102, the coma generated at least as the objective lens 150 can be reduced.

As a method by which the marker M2 of the diffraction lens 102 is arranged on the optical axis OA1 of the objective lens main body 1, while the objective lens main body 1 attached to the lens frame, not shown, is observed on the optical axis OA1 from the left side of the drawing, the diffraction lens 2 is arranged on this side of the objective lens main body 1, and the diffraction lens 102 is moved in the lens frame, so that both markers M1, M2 are in accord with each other. Hereby, the condition as shown in FIG. 7 is attained, and the imaging characteristic of the objective lens unit 150 can be secured.

A concrete example of the positioning by which the coma of the objective lens unit 150 is made almost zero will be described below. As shown in FIG. 7, by using the makers M1, M2, on the extension of the optical axis OA1 of the objective lens main body 1, the center of the diffraction lens 2 is made in accord with it.

In this case also, it is assumed that the inclination angles of the first and the second surfaces 102a and 102b are 3°. In this condition, because the coma for the wavelength 655 for DVD due to the shift of the first surface 102a is 0 mλ, the coma due to the inclination of the first surface 102a is +105 mλ, and the coma due to the inclination of the second surface 102b is −105 mλ, the coma as the whole of the objective lens unit 150 is 0 mλ. Accordingly, irrespective of the inclination angle θ of the diffraction lens 102, the coma generated as the objective lens unit 150 can be made about zero.

The Third Embodiment

The objective lens unit of the third embodiment will be described below. The lens unit of the third embodiment is a modified lens unit of the objective lens unit 50 of the first embodiment shown in FIG. 1, and the part which is not particularly described, is a common one with the first embodiment or the second embodiment.

Figure 8:
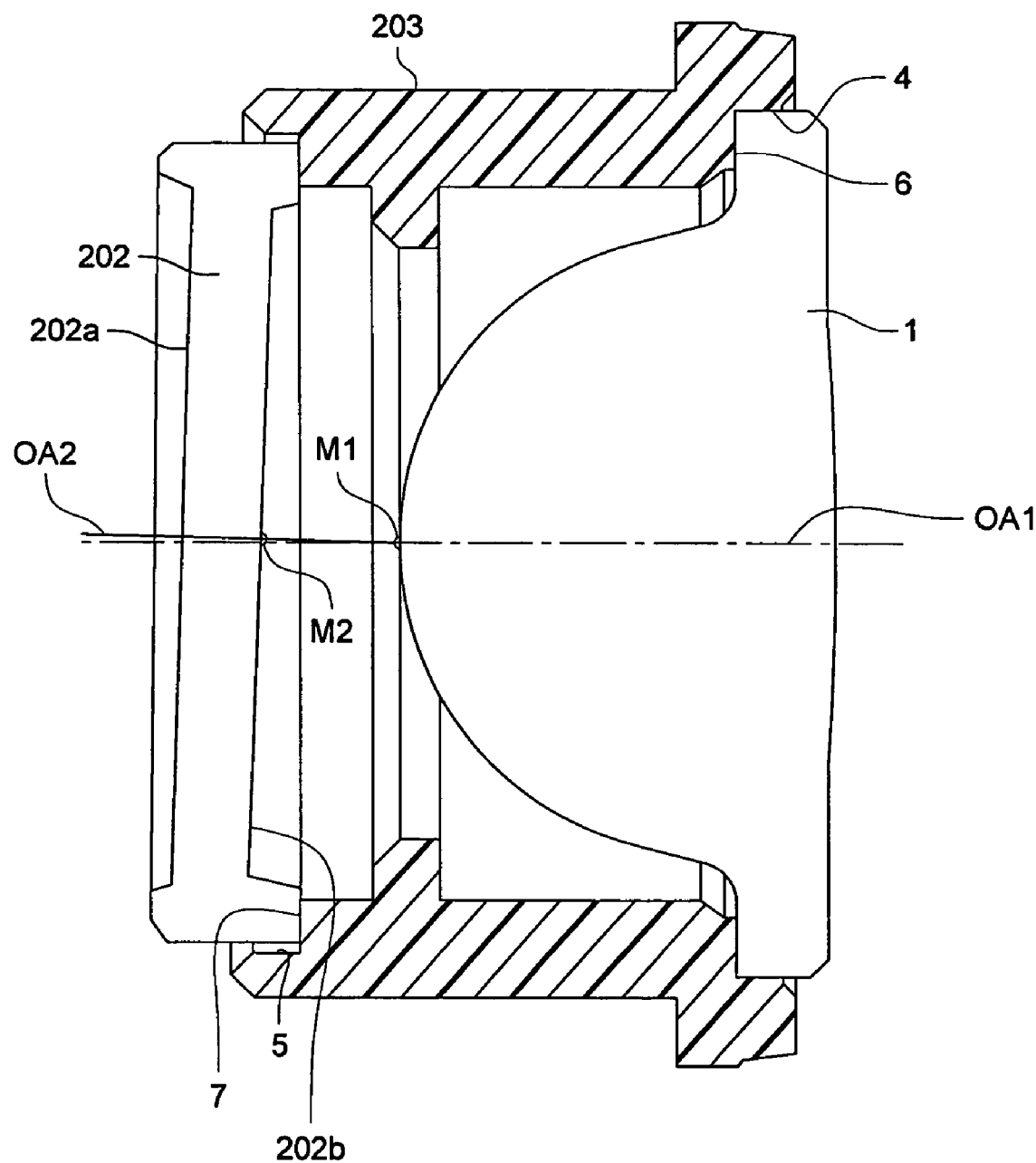
FIG. 8 is a side sectional view of the lens unit of the third embodiment.

FIG. 8 is a side sectional view of the objective lens unit 250 according to the third embodiment. Also in the case of this objective lens unit 250, the optical axis OA2 of the diffraction lens 202 has a minute inclination of not 0 to the optical axis OA1 of the objective lens main body 1. However, such an inclination is not an inclination generated due to the manufacturing error of the lens frame 203, but the inclination generated due to the manufacturing error of the diffraction lens 202 itself. In this manner, when the first surface 202a and the second surface 202b of the diffraction lens 202 are inclined, particularly, the influence is not given to the condensing of the laser light of the wavelength 405 nm for BD, but given to the condensing of the laser light of the wavelength 655 nm for DVD, and the aberration is generated at the time of the condensing. Such an aberration is cancelled by the centering by using the markers M1, M2, and even when the diffraction lens 202 is inclined to the optical axis OA1 of the objective lens main body 1, the imaging accuracy more than a predetermined one is attained.

The Fourth Embodiment

The objective lens unit of the fourth embodiment will be described below. The objective lens unit of the fourth embodiment is a modified lens unit of the objective lens unit 50 of the first embodiment shown in FIG. 1, and the part which is not particularly described, is a common one of the first embodiment.

Figure 9:
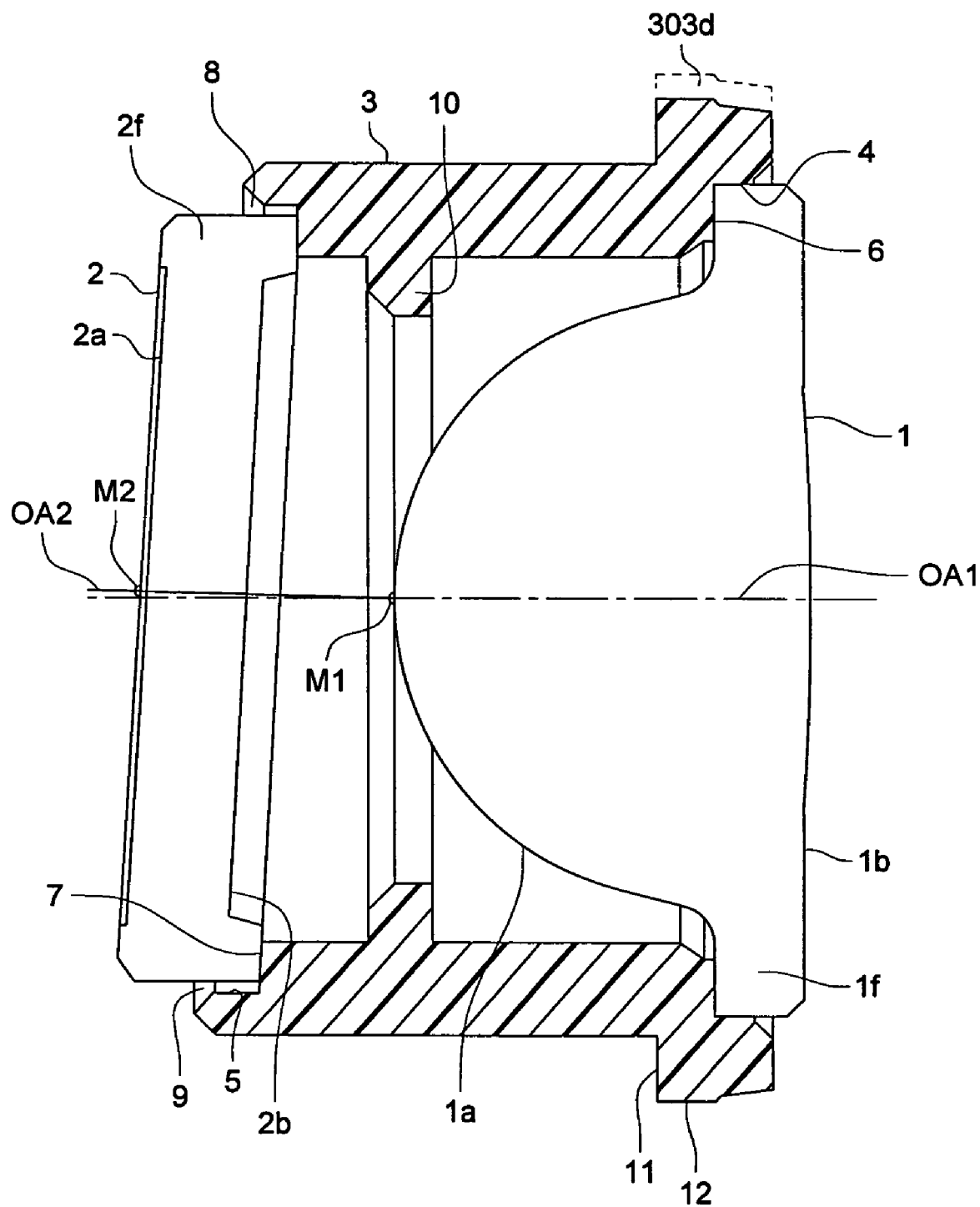
FIG. 9 is a side sectional view of the lens unit of the fourth embodiment.

FIG. 9 is a side sectional view of the objective lens unit 350 according to the fourth embodiment. In the case of this objective lens unit 350, a cut-out 303d which is an inclination mark for showing the direction of the inclination of the optical axis OA2 of the diffraction lens 2 is formed in the lens frame 3. By using this cut-out 303d, the inclination direction of the diffraction lens 2 can be controlled, and the optical characteristic of the diffraction lens 2 and the influence of the inclination on the other transmission light or the reflection light can be controlled. Hereupon, the formal asymmetry of the lens frame 3 includes a case of the first embodiment, and not limiting to the unintended one such as the manufacturing error, includes the intentionally provided one. In the case where the asymmetry of the shape of the lens frame 3 is the unintended one, the inclination direction of the optical axis OA2 is specified by the measurement after the manufacturing and the cut-out 303d is formed, and on the one hand, in the case where the asymmetry of the shape of the lens frame is the intended one, according to its design, the inclination direction of the optical axis OA2 is specified, and the cut-out 303d is formed.

Hereupon, as a method of the display of the inclination direction of the optical axis OA2, not limited to the cut-out 303d, each kind of mark including the three dimensional shape, coloring may be applicable The Fifth Embodiment The objective lens unit of the fifth embodiment will be described below. The objective lens unit of the fourth embodiment is a modified lens unit of the objective lens unit 250 of the third embodiment shown in FIG. 8, and the part which is not particularly described, is a common one to the third embodiment.

Figure 10:
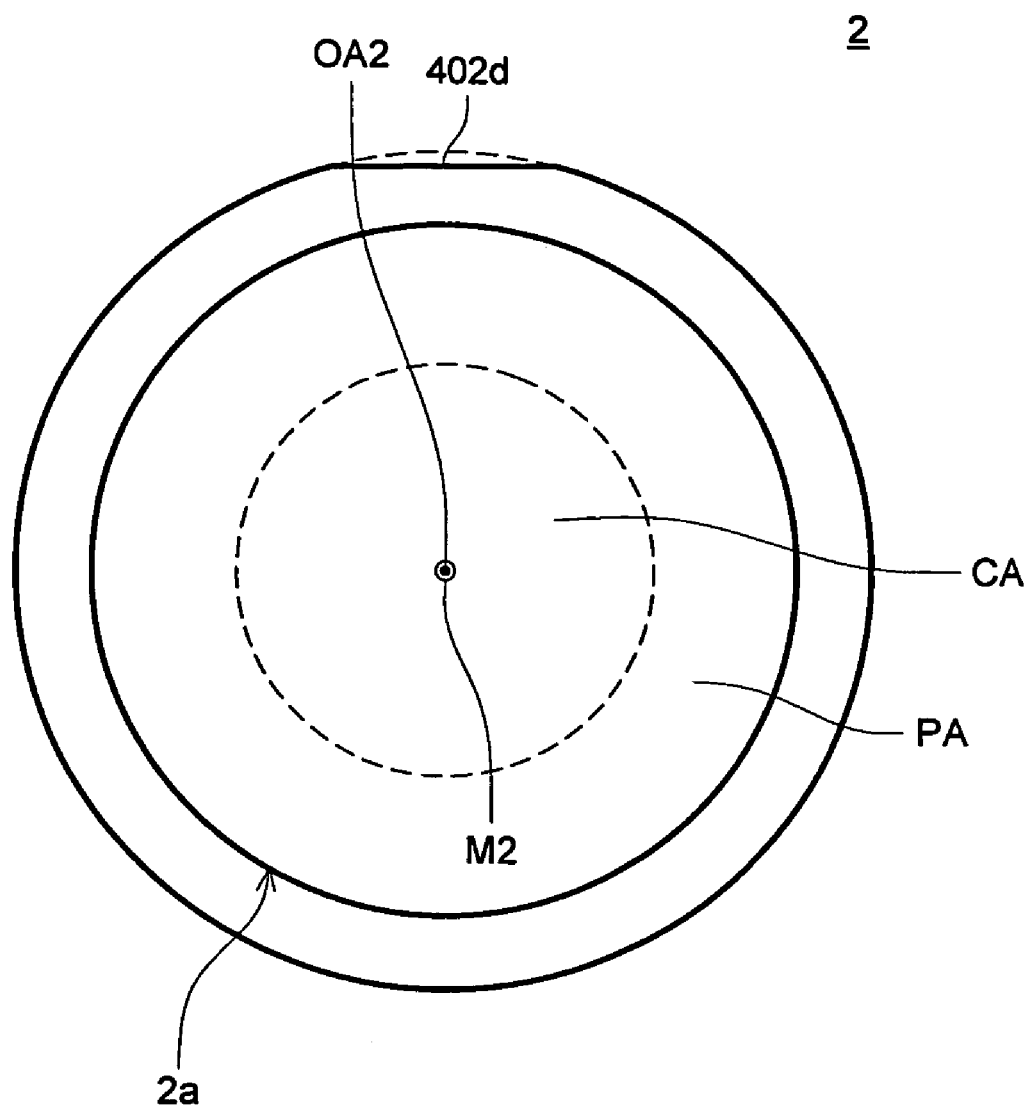
FIG. 10 is a front view of the diffraction lens structuring the lens unit of the fifth embodiment.

FIG. 10 is a front view of the diffraction lens in the objective lens unit according to the fifth embodiment. In the case of this objective lens unit, a cut-out 402d which is an inclination mark for showing the direction of the inclination of the optical axis OA2 is formed in the diffraction lens 2 itself. By using this cut-out 402d, the inclination direction of the first surface 2a of the diffraction lens 2 can be controlled, and the optical characteristic of the diffraction lens 2 and the influence of the inclination on the other transmission light or the reflection light can be controlled. Hereupon, the formal asymmetry of the diffraction lens 2 includes a case of the third embodiment, and not limiting to the unintended one such as the manufacturing error, includes the intentionally provided one. In the case where the asymmetry of the shape of the diffraction lens 2 is the unintended one, the inclination direction of the optical axis OA2 is specified by the measurement after the manufacturing and the cut-out 402d is formed, and on the one hand, in the case where the asymmetry of the shape of the diffraction lens 2 is the intended one, according to its design, the inclination direction of the optical axis OA2 is specified, and the cut-out 402d is formed.

Hereupon, as a method of the display of the inclination direction of the optical axis OA2, not limited to the cut-out 402d, each kind of mark including the three dimensional shape, coloring may be applicable.

The Sixth Embodiment

Figure 11:
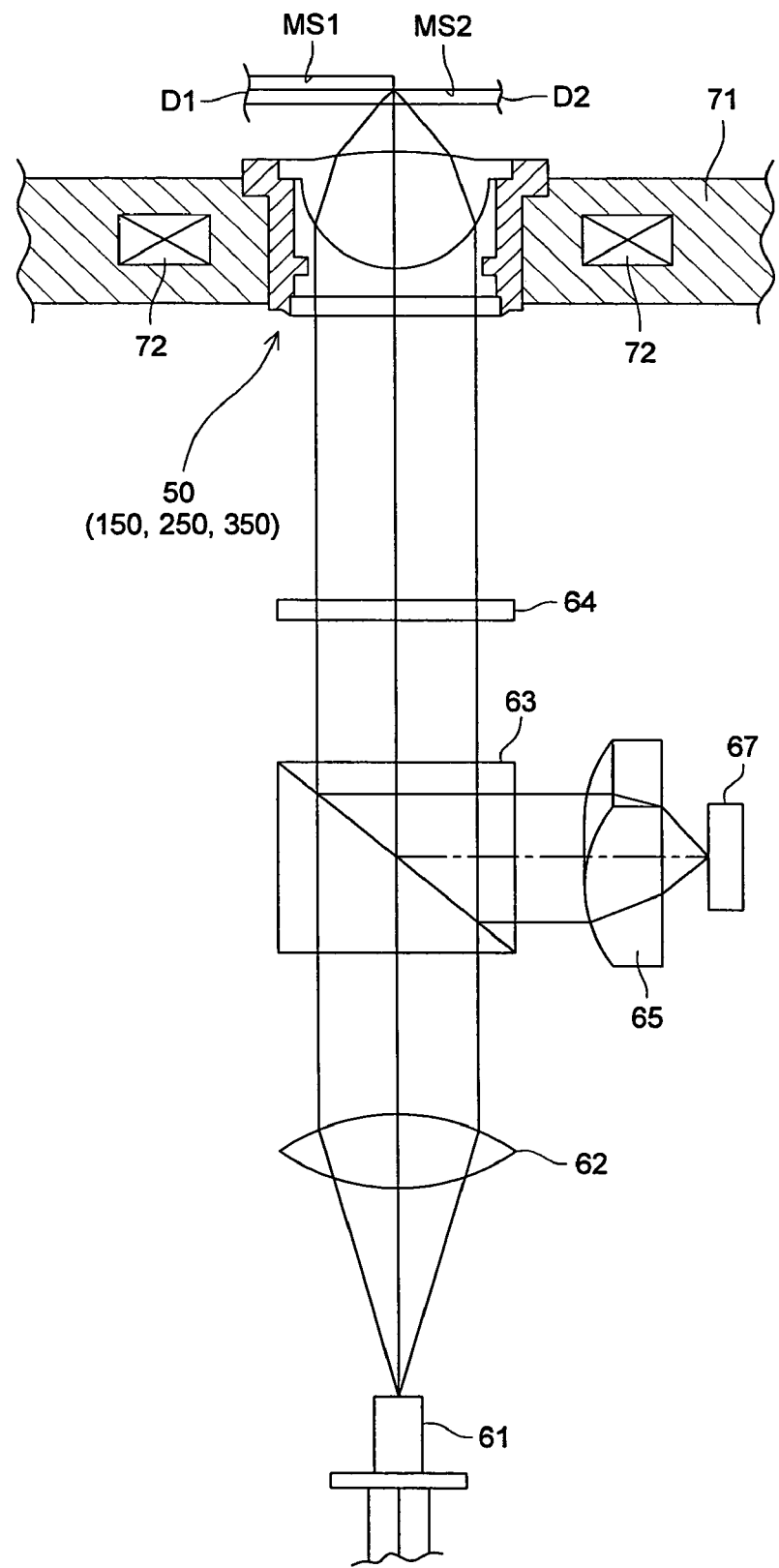
FIG. 11 is a block diagram for explaining the structure of an optical pick-up apparatus of the sixth embodiment.

FIG. 11 is a view generally showing the structure of the optical pick-up apparatus in which the objective lens units 50, 150, 250, 350 according to the first-fifth embodiments are assembled.

This optical pick-up apparatus has the 2-wavelength semiconductor laser 61 generating the laser light for information reproduction of the first optical disk D1 (for example, the wavelength 655 nm for DVD, NA 0.60), and the laser light for information reproduction of the second optical disk D2 (for example, the wavelength 405 nm for BD, NA 0.85), that is, it can project the laser light having wavelengths different from each other. The laser light from the semiconductor laser 61 is irradiated on optical disks D1, D2 which are optical information recording media, by using the objective lens units 50, 150, 250, 350, and the reflection light from the optical disks D1, D2, are condensed by using the objective lens units 50-350.

Initially, when the first optical disk D1 is reproduced, the laser light of wavelength 655 nm is emitted from the semiconductor laser 61, and the emitted light flux transmits a collimator lens 62, polarizing beam splitter 63, and ¼ wavelength plate 64, and becomes a parallel light flux of the circularly polarized light. This light flux is condensed on the information recording surface MS1 of the first optical disk D1 by the objective lens units 50-350.

The light flux which is modulated by the information pit on the information recording surface MS1 and reflected, transmits again the objective lens units 50-350, ¼ wavelength plate 64, and is incident on the polarizing beam splitter 63, reflected herein, and the astigmatism is given by the cylindrical lens 65, is incident on the photo detector 67, and by using its output signal, the reading signal of the information recorded in the first optical disk D1 is obtained.

Further, the light amount change by the shape change of the spot, the position change on the photo detector 67 is detected, and the focus detection or track detection is conducted. According to this detection, the objective lens units 50-350 are moved in the optical axis direction so that a second dimensional actuator 72 which is assembled in the holder 71 holding the objective lens units 50-350 images the light flux from the semiconductor laser 61 onto the information recording surface MS1 of the first optical disk D1, and the objective lens units 50-350 are moved in the direction perpendicular to the optical axis so that the light flux from this semiconductor laser 61 is imaged on a predetermined track.

On the one hand, when the second optical disk D2 is reproduced, the laser light flux of the wavelength 405 nm is emitted from the semiconductor laser 61, and the emitted light flux transmits the collimator lens 62, polarizing beam splitter 63, ¼ wavelength plate 64, and becomes the circularly polarized parallel light flux. This light flux is condensed on the information recording surface MS2 of the second optical disk D2 by the objective lens units 50-350.

The light flux which is modulated by the information pit on the information recording surface MS1 and reflected, transmits again the objective lens units 50-350, ¼ wavelength plate 64, and is incident on the polarizing beam splitter 63, reflected herein, and the astigmatism is given by the cylindrical lens 65, is incident on the photo detector 67, and by using its output signal, the reading signal of the information recorded in the second optical disk D2 is obtained.

Further, in the same manner as in the case of the first optical disk D1, the light amount change by the shape change of the spot, the position change on the photo detector 67 is detected, and by the second dimensional actuator 72 which is assembled in the holder holding the objective lens units 50-350, the objective lens units 50-350 are moved for the focusing and tracking.

In the sixth embodiment described above, an integrated element in which the semiconductor laser 61 and the photo detector 67 are integrated, can be used, and in this case, the polarizing beam splitter 63 becomes unnecessary. Inversely, the semiconductor laser 61 is divided into the laser light source of wavelength 655 nm and the laser light source of wavelength 405 nm, and the laser light fluxes from both laser light sources can also be composed by the polarizing beam splitter.

The Seventh Embodiment

The objective lens unit of the seventh embodiment will be described below. The objective lens unit of the seventh embodiment is a modified lens unit of the objective lens unit 50 of the first embodiment shown in FIG. 1, and the part which is not particularly described, is a common one to the first embodiment.

Figure 12:
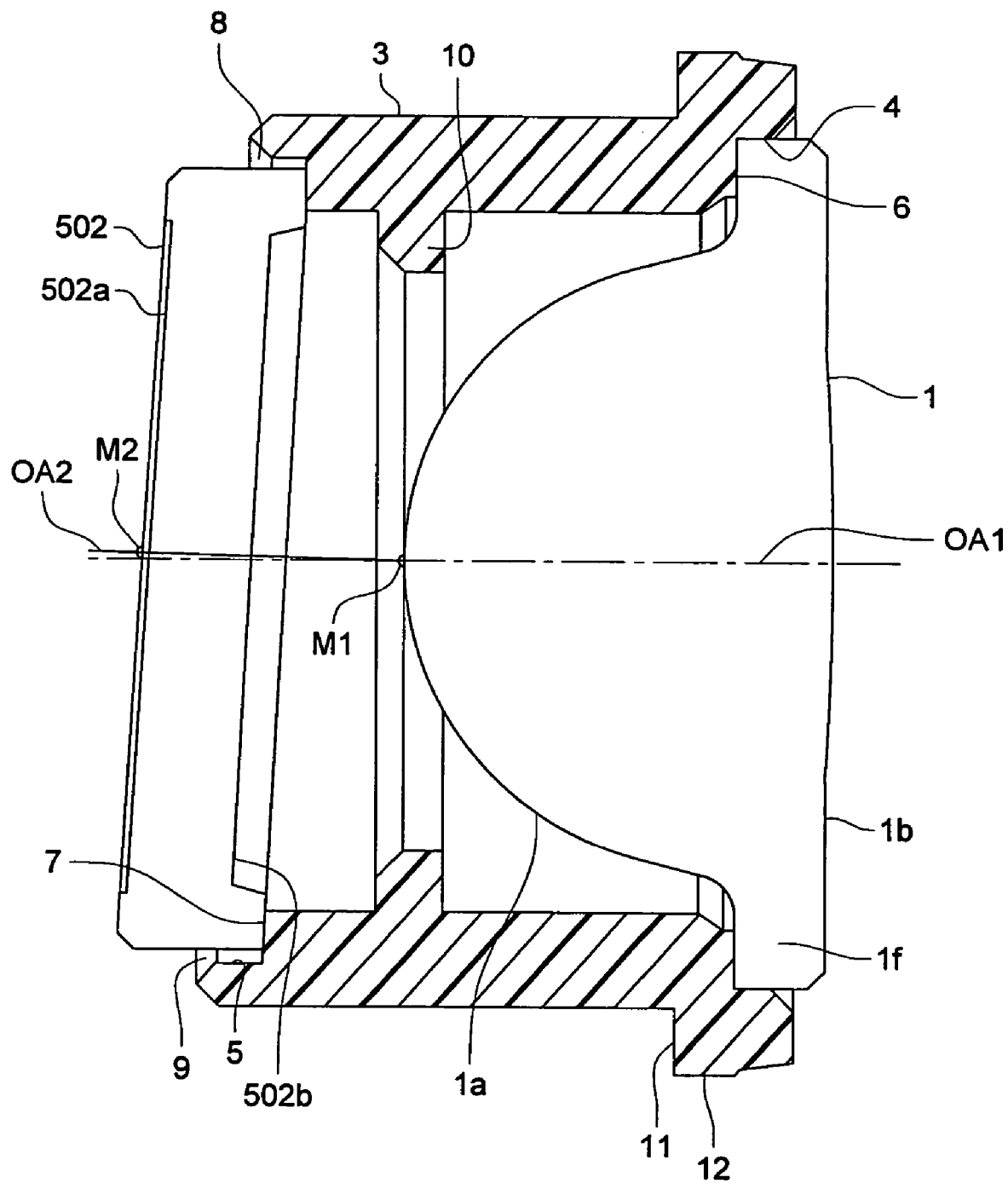
FIG. 12 is a side sectional view of the lens unit of the seventh embodiment.

FIG. 12 is a side sectional view of the objective lens unit 550 according to the seventh embodiment. In the case of this objective lens unit 550, the diffraction lens 502 not only has the phase structure on the first surface 502a of the rear side to the objective lens main body 1, but has the phase structure also on the second surface 502b of the front side to the objective lens main body 1.

The first surface 502a of the diffraction lens 502 has the diffraction property to the laser light of wavelength 655 nm for DVD, however, does not have the diffraction property to the laser light of wavelength 405 nm for BD or the laser light of wavelength 780 nm for CD. On the one hand, the second surface 502b has the diffraction property to the laser light of wavelength 780 nm for CD, but does not have the diffraction property to the laser light of wavelength 405 nm for BD or the laser light of wavelength 655 nm for DVD. Hereupon, the objective lens main body 1 is designed as the object of the laser light of the wavelength 405 nm for DVD, and is the aspheric glass lens or plastic lens.

When the laser light of the wavelength 655 nm for DVD, is incident on this lens unit 550 from the light source side (left side in the view), the laser light is appropriately condensed or diverged by a predetermined power by the diffraction effect by the first surface 502a of the diffraction lens 502, and through the objective lens main body 1, is condensed on the information recording surface for DVD (not shown) on the right side in the view. Further, when the laser light of the wavelength 780 nm for CD, is incident on this lens unit 550 from the light source side, the laser light is appropriately condensed or diverged by a predetermined power by the diffraction effect by the second surface 502b of the diffraction lens 502, and through the objective lens main body 1, is condensed on the information recording surface for CD (not shown) on the right side in the view. Hereupon, when the laser light of the wavelength 405 nm for BD, is incident on this lens unit 550 from the light source side, the laser light passes as it is, without receiving the diffraction action by the diffraction lens 502, and through the objective lens main body 1, is condensed on the information recording surface for BD (not shown) on the right side in the view. That is, in the case of the present embodiment, by the combination of the objective lens main body 1 and the diffraction lens 502, for each of laser light for DVD, CD, and BD, the imaging which is comparative in the desirable accuracy, becomes possible, and each laser light can be used as the information reading light or the information recording light of each optical disk.

Figure 13:
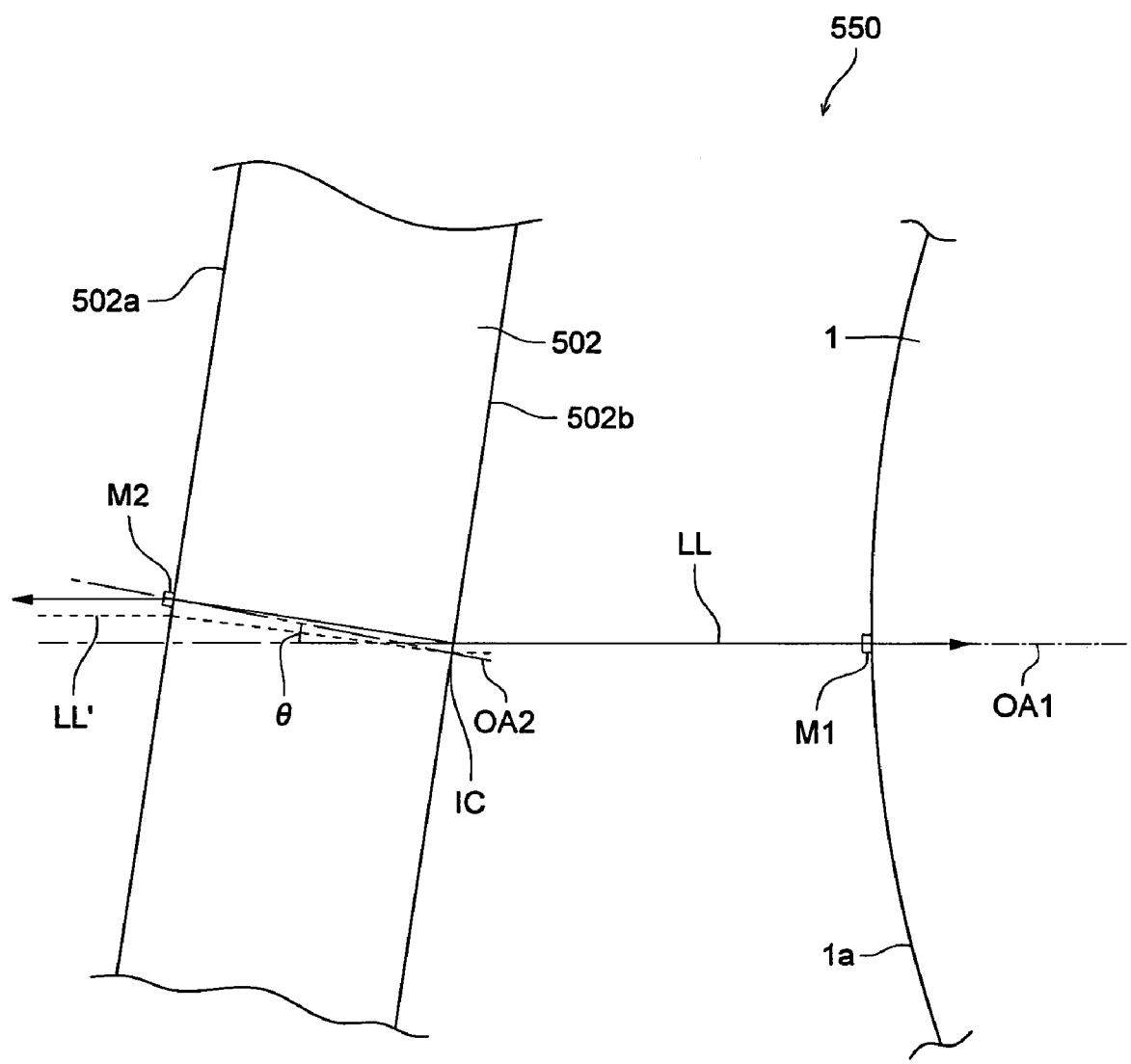
FIG. 13 is an enlarged view for explaining the positioning of the objective lens unit of the seventh embodiment.

FIG. 13 is an enlarged view for conceptually explaining the positioning of the diffraction lens 502 to the objective lens main body 1. As clearly be seen from the view, the inclination of the diffraction lens 502 is allowed, and the optical axis OA2 of the diffraction lens 502 is inclined by angle θ to the optical axis OA1 of the objective lens main body 1. In such a manner, when the diffraction lens 502 is inclined, at least one of the marker M2 which is a center of the first surface 502a (the intersection of the first surface 502a and the optical axis of the concerned first surface 502a), and the inside center (the intersection of the second surface 502b and the optical axis of the concerned second surface 502b) IC is positively position-dislocated to the optical axis OA1 of the objective lens main body 1. That is, when the first surface 502a is positioned to the optical axis OA1, the center of the second surface 502b, is position-dislocated by the distance XX=d·(sin θ−sin(θ/n)), from the optical axis OA1 as also described in FIG. 5, inversely, when the second surface 502b is positioned to the optical axis OA1, (refer to the ray of light LL' in FIG. 13), the center of the first surface 502a is position-dislocated from the optical axis OA1 by the distance X, described in FIG. 5, in the reversal direction. Hereupon, as clearly be seen from FIG. 13, in the present embodiment, the phase structure is formed respectively on the first surface 502a, the second surface 502b, and the optical axis of each surface is in accord with the optical axis OA2 of the diffraction lens 502.

Generally, the coma generated when the center of the first surface 502a or the second surface 502b is dislocated from the optical path LL whose optical axis OA1 is extended, is proportional to third-power of the NA value of the optical lens unit 550, the substrate thickness of the optical disc, and the inverse number of the wavelength of the laser light. Herein, the first surface 502a is, for example, for DVD, and NA 0.60, the substrate thickness 0.6 mm, the wavelength 655 nm, and the second surface 502b is, for example, for CD, NA 0.45, the substrate thickness 1.2 mm, the wavelength 780 nm. Accordingly, when the coma generated by the position dislocation of the second surface 502b for CD is 1, the coma generated by the position dislocation of the first surface 502a for DVD becomes about 2-6 times. This means that, when the decentering amount of the first surface 502a and the decentering amount of the second surface 502b are equal, the contribution degree of the decentering of the first surface 502a to the coma is about 2-6 times of the contribution degree of the decentering of the second surface 502b to the coma, and it can be seen that it is meaningful for the purpose of the improvement of the performance of the whole, that the decentering amount of the first surface 502a is reduced, rather than that the decentering amount of the second surface 502b is reduced.

On the one hand, when the diffraction lens 502 is inclined, either one of decentering of the first surface 502a or the decentering of the second surface 502b can not be avoided. That is, when the center of the first surface 502a is arranged on the optical path LL advancing along the optical axis OA1 (that is, the optical path passing through the central point), the center of the second surface 502b can not be arranged on the optical path LL. Inversely, when the center of the second surface 502b is arranged on the optical path LL, the center of the first surface 502a can not be arranged on the optical path LL. Therefore, in the present embodiment, the marker M2 is formed at the center of the first surface 502a, and when this marker M2 is arranged on the optical path LL, the coma generated by the first surface 502a for DVD is made minimum, and the coma generated by the second surface 502b for CD is allowed. That is, as shown in FIG. 13, by using the markers M1, M2, when the center of the objective lens main body 1 and the center of the diffraction lens 502 are made in accord with each other, the reduction of the aberration as the whole is intended.

Figure 14:
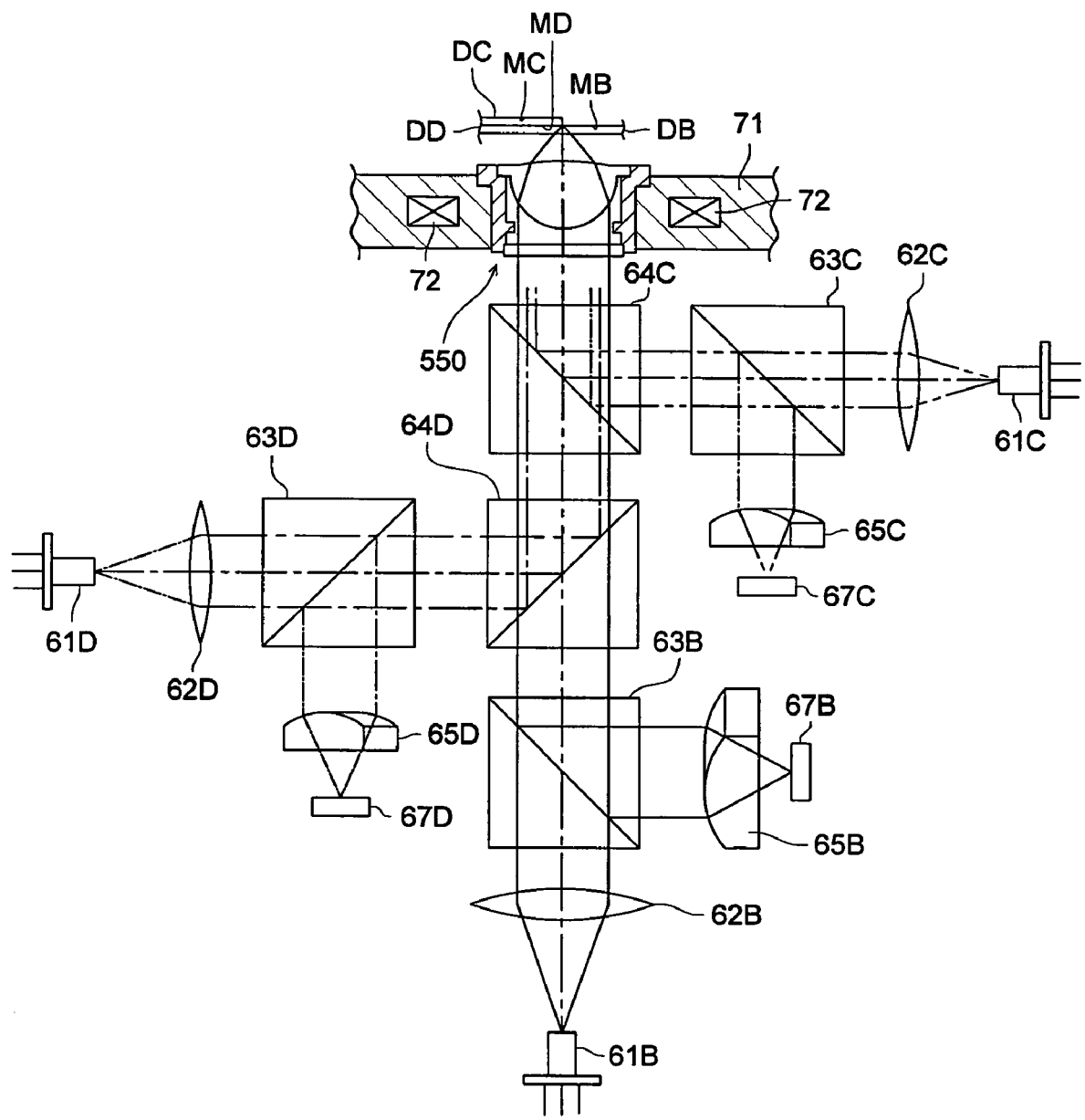
FIG. 14 is a view showing the optical pick-up apparatus in which the lens unit shown in FIG. 13 is mounted.

FIG. 14 is a view schematically showing the structure of the optical pick-up apparatus in which the objective lens unit 550 shown in FIG. 13 is assembled.

In this optical pick-up apparatus, the laser light from each of semiconductor lasers 61B, 61D, 61C is irradiated on the optical disks DB, DD, DC which are optical information recording media by using the objective lens unit 550, and the reflected light from each of optical disks DB, DD, CD, is collected by using the common objective lens unit 550, and finally, guided to each of photo detectors 67B, 67D, 67C.

Herein, the first semiconductor laser 61B generates the laser light (for example, the wavelength 405 nm, NA 0.85 for BD) for the information reproducing of the first optical disk DB, the second semiconductor laser 61D generates the laser light (for example, the wavelength 655 nm, NA 0.60 for DVD) for the information reproducing of the second optical disk DD, and the third semiconductor laser 61C generates the laser light (for example, the wavelength 780 nm, NA 0.54 for CD) for the information reproducing of the third optical disk DC. Further, the first photo detector 67B detects the information recorded in the first optical disk DB as the light signal (for example, wavelength 405 nm for BD), the second photo detector 67D detects the information recorded in the second optical disk DD as the light signal (for example, wavelength 655 nm for DVD), and the third photo detector 67C detects the information recorded in the third optical disk DC as the light signal (for example, wavelength 780 nm for CD).

Initially, when the first optical disk DB is reproduced, for example, the laser light of wavelength 405 nm is emitted from the first semiconductor laser 61B, the emitted light flux transmits the collimator lens 62B, polarizing beam splitter 63B and becomes the parallel light flux. This light flux is, after transmits the other polarizing beam splitters 64D, 64C, condensed on the information recording surface MB of the first optical disk DB by the objective lens unit 550.

The light flux which is modulated by the information pit on the information recording surface MB and reflected, transmits again the objective lens units 550, and is incident on the polarizing beam splitter 63B, reflected herein, and the astigmatism is given by the cylindrical lens 65B, is incident on the photo detector 67B, and by using its output signal, the reading signal of the information recorded in the first optical disk DB is obtained.

Further, the light amount change by the shape change of the spot, the position change on the photo detector 67B is detected, and the focus detection or track detection is conducted. According to this detection, the objective lens unit 550 is moved in the optical axis direction so that a second dimensional actuator 72 which is assembled in the holder 71 holding the objective lens unit 550 images the light flux from the first semiconductor laser 61B onto the information recording surface MB of the first optical disk DB, and the objective lens unit 550 is moved in the direction perpendicular to the optical axis so that the light flux from this first semiconductor laser 61B is imaged on a predetermined track.

Next, when the second optical disk DD is reproduced, for example, the laser light of the wavelength 655 nm is emitted from the second semiconductor laser 61D, and the emitted light flux transmits the collimator lens 62D, polarizing beam splitter 63D, and becomes the parallel light flux. This light flux is, after transmits the other polarizing beam splitters 64D, 64C, condensed on the information recording surface MD of the first optical disk DD by the objective lens unit 550.

The light flux which is modulated by the information pit on the information recording surface MD and reflected, transmits again the objective lens units 550, reflected by the polarizing beam splitter 64D, and is incident on the polarizing beam splitter 63D, reflected herein, and the astigmatism is given by the cylindrical lens 65D, is incident on the second photo detector 67D, and by using its output signal, the reading signal of the information recorded in the second optical disk DD is obtained.

Further, the light amount change by the shape change of the spot, the position change on the photo detector 67D is detected in the same manner as the first optical disk DB, and the focus detection or track detection is conducted, and by the second dimensional actuator 72 which is assembled in the holder holding the objective lens unit 550, the objective lens unit 550 is moved for the focusing and tracking.

Next, when the third optical disk DC is reproduced, for example, the laser light of the wavelength 780 nm is emitted from the third semiconductor laser 61C, and the emitted light flux transmits the collimator lens 62C, polarizing beam splitter 63C, reflected by the polarizing beam splitter 64C, and becomes the parallel light flux. This light flux is condensed on the information recording surface MC of the first optical disk DC by the objective lens unit 550.

The light flux which is modulated by the information pit on the information recording surface MC and reflected, transmits again the objective lens units 550, reflected by the polarizing beam splitter 64C, and is incident on the polarizing beam splitter 63C, reflected herein, and the astigmatism is given by the cylindrical lens 65C, and is incident on the third photo detector 67C, and by using its output signal, the reading signal of the information recorded in the third optical disk DC is obtained.

Further, in the same manner as the first and second optical disks DB, DD, the light amount change by the shape change of the spot, the position change on the third photo detector 67C is detected, and the focus detection or track detection is conducted, by the second dimensional actuator 72 which is assembled in the holder 71 holding the objective lens unit 550, the objective lens unit 550 is moved for the focusing and tracking.

Hereupon, in the embodiments described above, the first surface 502a of the diffraction lens 502 is for DVD, and second surface 502b is for CD, however, it may also be allowed that the first surface 502a is for CD, and second surface 502b is for DVD. In this case, the center of the second surface 502b is arranged on the optical path LL which advances along the optical axis OA1.

The Eighth Embodiment

The objective lens unit of the eighth embodiment will be described below. The objective lens unit of the eighth embodiment is a modified lens unit of the objective lens unit 50 of the seventh embodiment shown in FIG. 12, and the part which is not particularly described, is a common one to the seventh embodiment.

Figure 15:
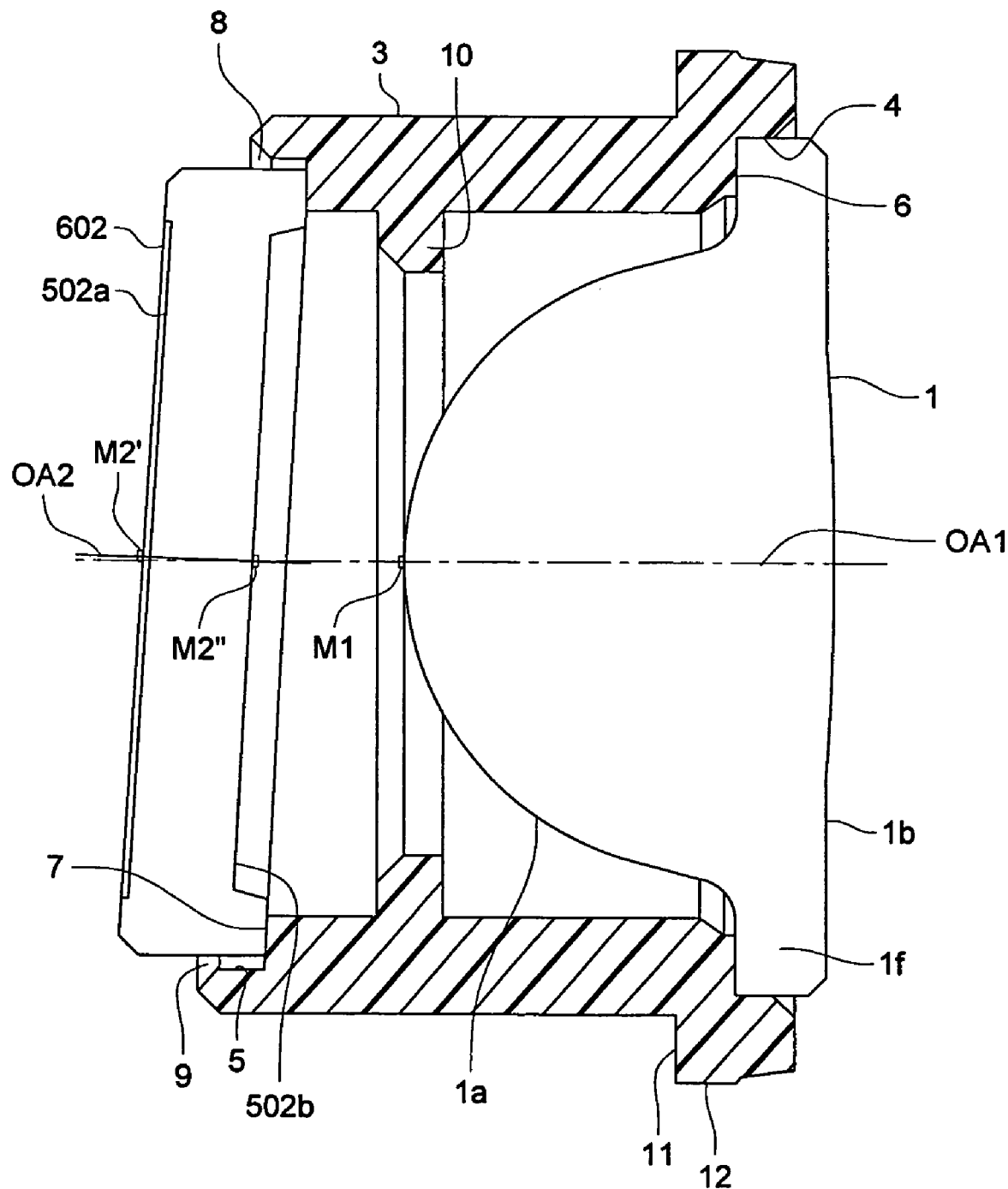
FIG. 15 is a side sectional view of the lens unit of the eighth embodiment.

FIG. 15 is a side sectional view of the objective lens unit 650 according to the eighth embodiment. In the case of this objective lens unit 650, in the diffraction lens 602, the marker M2' is not only formed at the center of the first surface 502*a*, but the marker M2" is also formed at the center of the second surface 502*b*.

Figure 16:
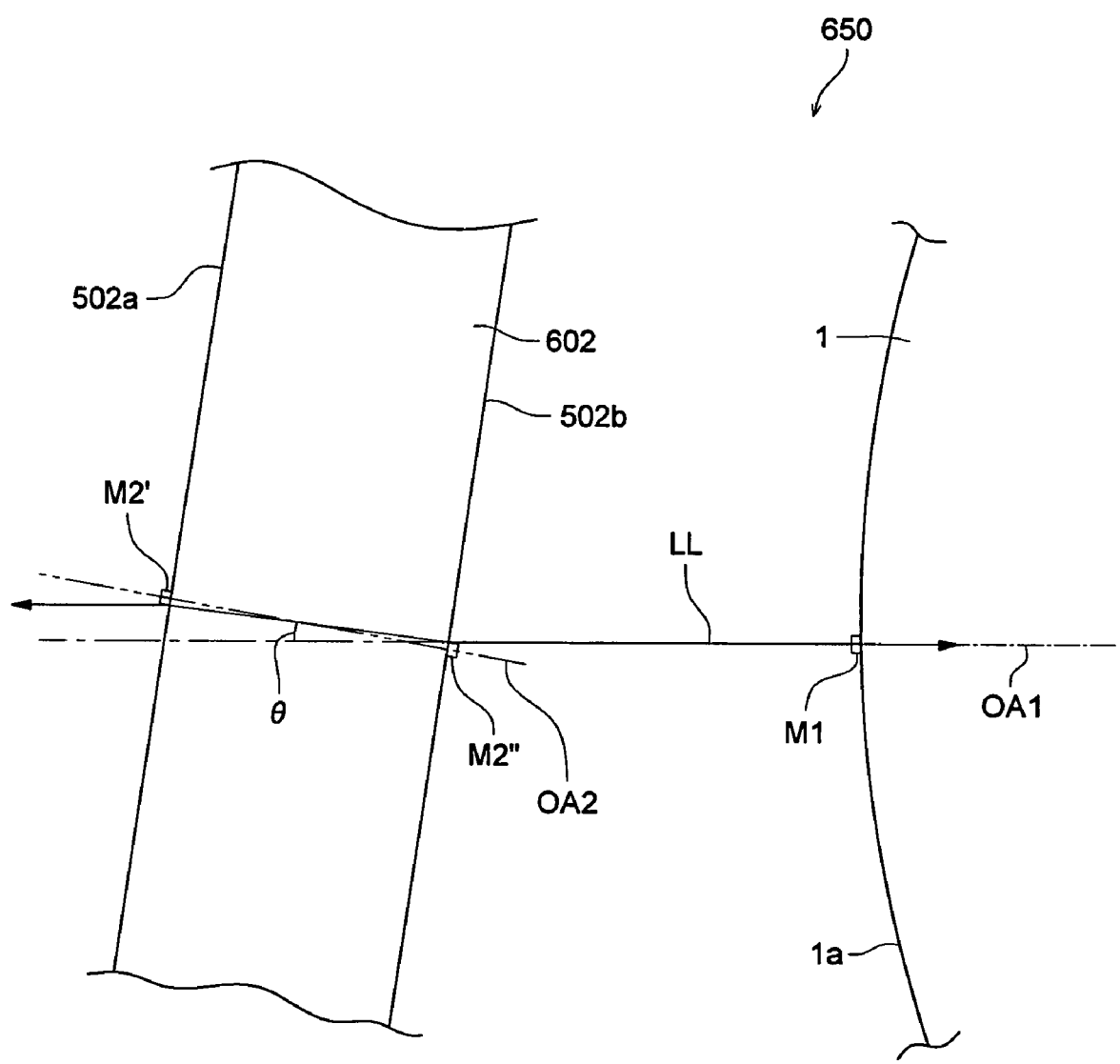
FIG. 16 is an enlarged view for explaining the positioning of the objective lens unit of the eighth embodiment.

FIG. 16 is an enlarged view for conceptually explaining the positioning of the diffraction lens 602 to the objective lens main body 1. As clearly be seen from the view, the inclination of the diffraction lens 502 is allowed, and the optical axis OA2 of the diffraction lens 602 is inclined by angle θ to the optical axis OA1 of the objective lens main body 1. In such a manner, when the diffraction lens 602 is inclined, at least one of the marker M2' which is a center of the first surface 502*a* and the marker M2" which is the center of the second surface 502*b*, is positively position-dislocated to the optical axis OA1 of the objective lens main body 1.

As described also in the seventh embodiment, the coma aberration generated when the marker M1' which is the center of the first surface 502*a* or the marker M2" which is the center of the second surface 502*b* is dislocated from the optical path LL whose optical axis OA1 is extended, is proportional to third-power of the NA value of the optical lens unit 650, the substrate thickness of the optical disk, and the inverse number of the wavelength of the laser light. From this, when the de-centering amount of the first surface 502*a* and the de-centering amount of the second surface 502*b* are appropriately adjusted, the coma aberration due to the de-centering of the first surface 502*a* and the coma aberration due to the de-centering of the second surface 502*b* can be almost equally balanced, and the coma aberration due to the de-centering of the first surface 502*a* and the coma aberration due to the de-centering of the second surface 502*b* can be set to a desired ratio.

Figure 17:
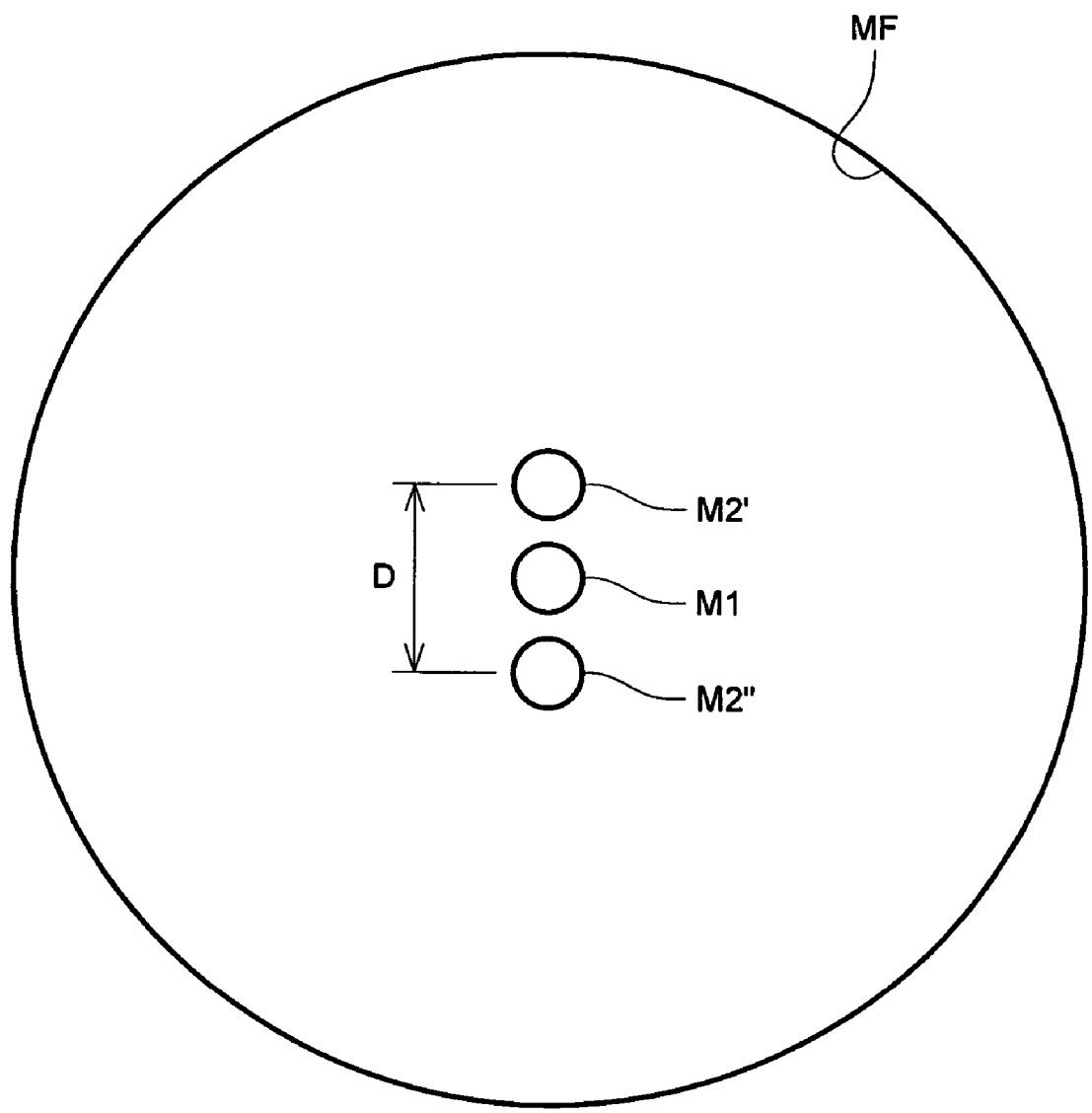
FIG. 17 shows a state in which the lens unit is observed from the light source side.

FIG. 17 shows a field of view MF of the microscope in which the lens unit 650 shown in FIG. 15 is observed from the light source side. While the objective lens main body 1 attached to the lens frame 3 of the lens unit 650 is observed on the optical axis OA1 from the left side in the view, the diffraction lens 602 is arranged on this side of the objective lens main body 1, and the diffraction lens 602 is moved in the second engagement section 5 of the lens frame 3 so that a marker M1 is positioned between both markers M2' and M2". For example, when the coma aberration due to due to the de-centering of the first surface 502*a* and the de-centering of the second surface 502*b* are wanted to be almost equally balanced, the diffraction lens 602 may be positioned so that the marker M1 is positioned at the position internally divided by the inverse number of the ratio of the contribution degree of the de-centering of the first surface 502*a* to the coma aberration and the contribution degree of the de-centering of the second surface 502*b* to the coma aberration. Herein, the first surface 502*a* is, for example, for DVD, and NA 0.60, the substrate thickness 0.6 mm, the wavelength 655 nm, and the second surface 502*b* is, for example, for CD, and NA 0.45, the substrate thickness 1.2 mm, the wavelength 780 nm. Accordingly, when the coma aberration generated by the position-dislocation of the second surface 502*b* for CD is 1, the coma aberration generated by the position-dislocation of the first surface 502*a* for DVD is about 2-6 times. From this, for the purpose to almost equally balance the coma aberration due to the de-centering of the first surface 502*a* and the coma aberration due to the de-centering of the second surface 502*b*, for example, when the coma aberration due to the position-dislocation of the first surface 502*a* for DVD is 2-times, it can be seen that the maker M1 may exist at the position of 0.33 D from the marker M2', and 0.66 D from the marker M2". In this manner, when the positions of both markers M2', M2" are adjusted on the basis of the marker M1, the generation balance of the coma aberration due to the inclination of both surfaces 502*a*, 502*b*, can be appropriately adjusted.

The Ninth Embodiment

Figure 19:
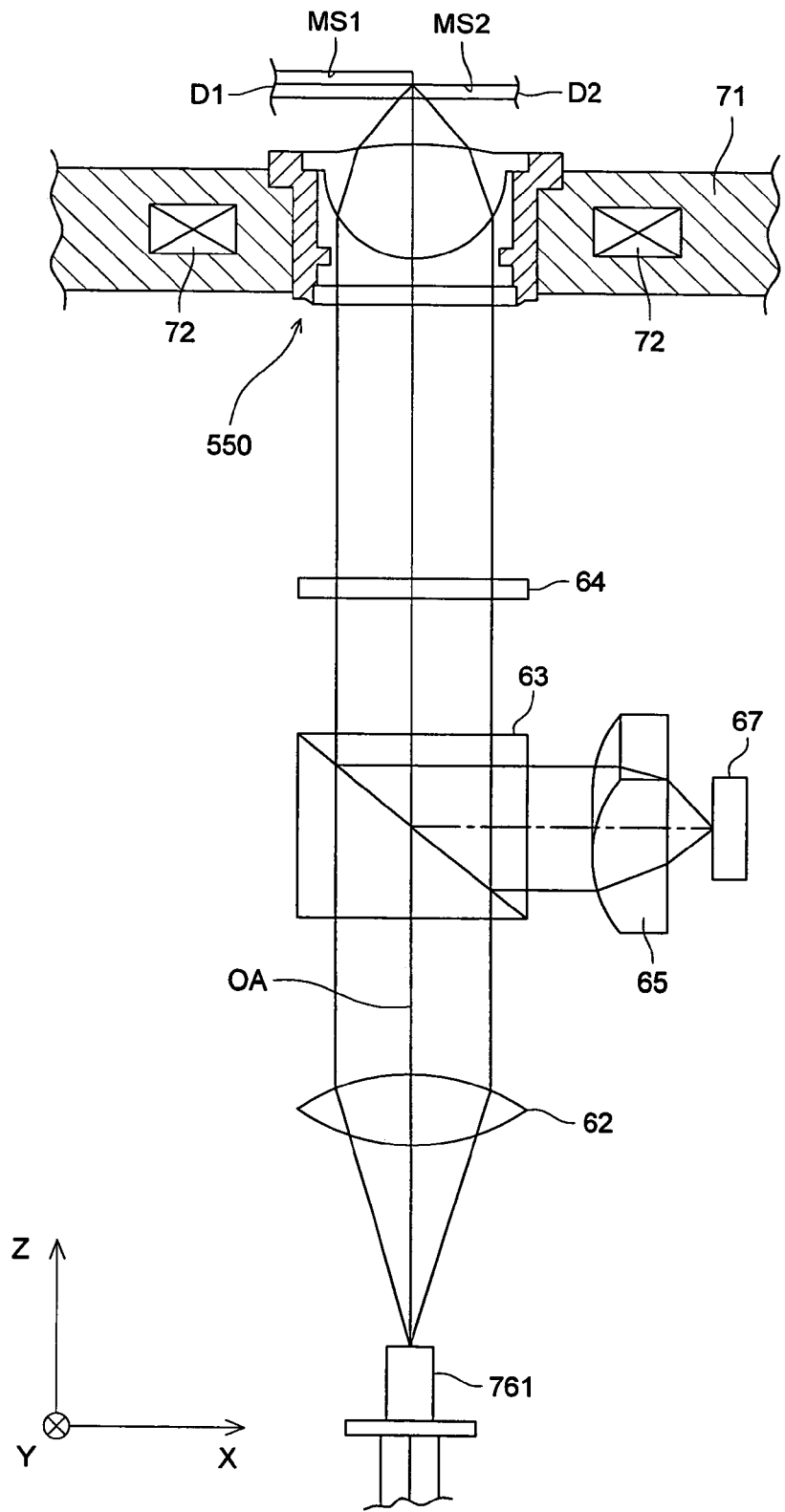
FIG. 19 is a view showing the optical pick-up apparatus of the ninth embodiment.

FIG. 19 is a view schematically showing the structure of the optical pick-up apparatus according to the ninth embodiment. For this optical pick-up apparatus, the lens unit 550 according to the seventh embodiment shown in FIG. 12 is used.

Figure 18:
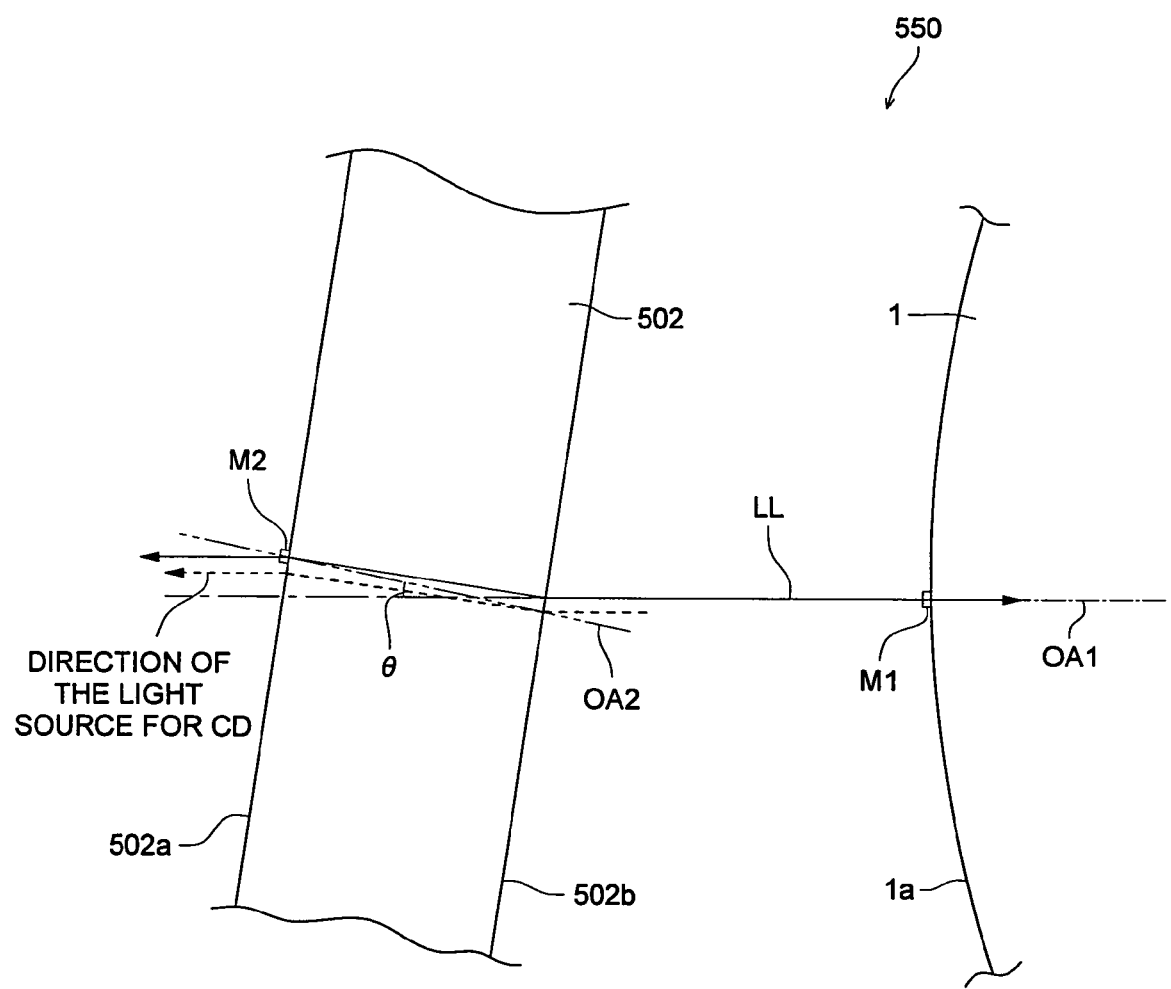
FIG. 18 is an enlarged view for explaining the positioning of the objective lens unit in the ninth embodiment.

FIG. 18 is an enlarged view for conceptually explaining the condition after the positioning of the diffraction lens 502 to the objective lens unit main body 1. As can clearly be seen from the view, the inclination of the diffraction lens 502 is allowed, and the optical axis OA2 of the diffraction lens 502 is inclined by θ to the optical axis OA1 of the objective lens main body 1. As described in the seventh embodiment, generally, the coma aberration generated when the center of the first surface 502*a* or the center of the second surface 502*b* is dislocated from the optical path LL whose optical axis OA1 is extended, is proportional to third-power of the NA value of the optical lens unit 550, the substrate thickness of the optical disc, and the inverse number of the wavelength of the laser light.

When explained by the concrete example, it means that, when the de-centering amount of the first surface 502*a* and the de-centering amount of the second surface 502*b* are equal, the contribution degree of the de-centering of the first surface 502*a* to the coma aberration is about 2-6 times of the contribution degree of the de-centering of the second surface 502*b* to the coma aberration, and it can be seen that it is meaningful for the purpose of the improvement of the performance of the whole, that the de-centering amount of the first surface 502*a* is reduced, rather than that the de-centering amount of the second surface 502*b* is reduced. Accordingly, the marker M2 is formed at the center of the first surface 502*a* and when this marker is arranged on the optical path LL, the coma aberration generated by the first surface 502*a* for DVD is made minimum, and the coma aberration generated by the second surface 502*b* for CD is allows. On the one hand, when the coma aberration generated by the de-centering of second surface 502*b* can be reduced by the other method, the coma aberration of the objective lens unit 550 can be very small. For such a purpose, it is made that, when the position of the light source of the wavelength 780 nm for CD is arranged at the position separated from the position of the light source for BD or DVD, the coma aberration generated by the de-centering of the second surface 502*b* is reduced.

FIG. 19 is a view schematically showing the structure of the optical pick-up apparatus of the present embodiment. This optical pick-up apparatus is an apparatus in which the objective lens unit 550 shown in FIGS. 12, 18 is assembled, and except for the light source, it has the same structure as the optical pick-up apparatus according to the sixth embodiment shown in FIG. 11.

FIG. 20 is a view for explaining the vertical sectional structure of 3-wavelength semiconductor laser 761 which is assembled in the optical pick-up apparatus shown in FIG. 19. As can clearly be seen from the view, the first and second laser elements 761*a*, 761*b* of 2-story structure are formed in the left side part of the semiconductor chip 61X, and the single third laser element 761*c* is formed in the right side part of the semiconductor laser 761. The first laser element 761*a* generates the laser light for the information reproduction for the fist optical disk BD (for example, the wavelength 405 nm for BD), the second laser element 761*b* generates the laser light for the information reproduction for the second optical disk DD (for example, the wavelength 655 nm for DVD), and the third laser element 761c generates the laser light for the information reproduction for the third optical disk DC (for example, the wavelength 780 nm for CD). As shown in the view, the first and the second laser elements 761a, 761b, are positioned along the optical axis OA and arranged, however, the third laser element 761c is arranged being separated by, the distance ΔX from the optical axis OA. As this result, at the time of the imaging of the third laser element 761c, the coma aberration is generated, however, such a come has the opposite direction to and the same largeness as the coma aberration generated by the de-centering of the second surface 502b described in FIG. 18. That is, the coma aberration of the condensing spot formed by the objective lens unit 550 becomes nearly zero for all of 405 nm for BD, 655 nm for DVD, 780 nm for CD, and the good aberration correction is conducted.

The Tenth Embodiment

Figure 21:
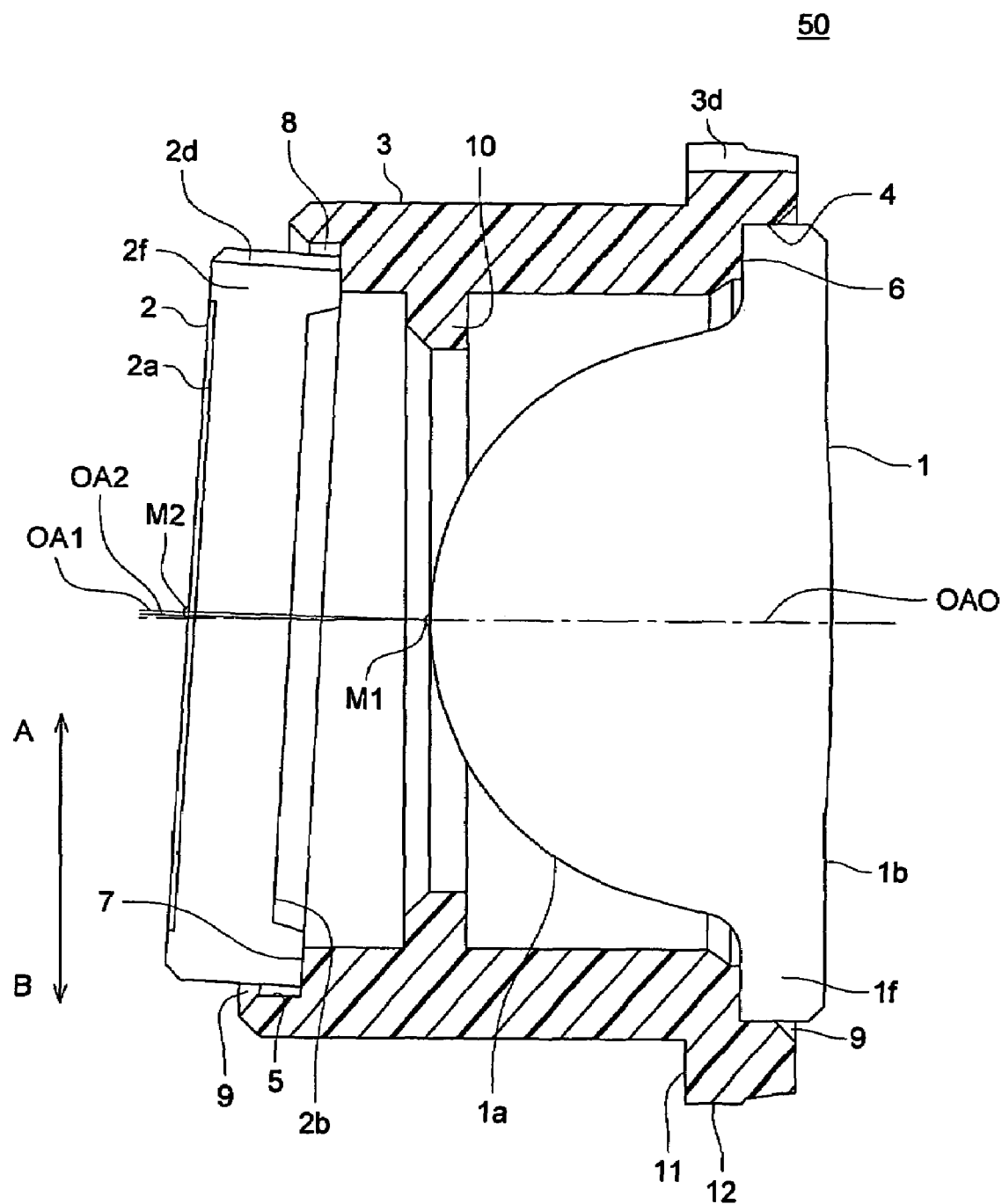
FIG. 21 is a side sectional view of the lens unit of the tenth embodiment.

FIG. 21 is a side sectional view of the objective lens unit 50 according to the tenth embodiment. In the case of this objective lens unit 50, it has the compatibility to 3 kinds of optical disks (for example, CD, DVD and BD) whose standards (recording density) are different from each other, and is structured so that the information can be recorded/reproduced in these optical disks. Further, this objective lens unit 50 has the objective lens main body 1 which is the objective optical element which condenses the laser light (using light) from the light source, not shown, and forms the condensing spot on the optical disk, not shown, the diffraction lens 2 which is the phase control element for forming the diffraction light, the cylindrical lens frame 3 which is a supporting member for integrating and fixing the objective lens main body 1 and the diffraction lens 2. Herein, the objective lens main body 1 is formed of, for example, material such as glass, and the diffraction lens 2 and lens frame 3 are formed of, for example, plastic or the material in which glass fine particles of several tens percent are added to the plastic.

The objective lens main body 1 is a both-convex lens of aspheric surface in which the first surface 1a on the diffraction lens 2 side is largely protruded, and the second surface 1b on the optical disk side (right side in the view) is formed comparatively flat, and the diffraction light corresponding to 3 different wavelengths passed the diffraction lens 2 or non-diffraction light is respectively condensed at a predetermined position of each optical disk. Hereupon, the objective lens main body 1 has, as the main optical axis, the inherent optical axis OA0 regulated by the first surface 1a and the second surface 1b.

The diffraction lens 2, when the phase structure is respectively provided on the first surface 2a which is the optical surface of the rear side to the objective lens main body 1 and the second surface 2b which is the optical surface of the front side to the objective lens main body 1, can form the diffraction light which converges or diverges in a desired degree to the using light of specific wavelength.

When specifically explained, the first surface 2a of the diffraction lens 2 has the diffraction property to the laser light of wavelength 655 for DVD, however, does not have the diffraction property to the laser light of wavelength 405 for BD, or the laser light of wavelength 780 for CD. On the one hand, the second surface 2b has the diffraction property to the laser light of wavelength 780 for CD, however, does not have the diffraction property to the laser light of wavelength 405 for BD, or the laser light of wavelength 655 for DVD. Hereupon, the objective lens main body 1 is designed by making the laser light of wavelength 405 nm for BD as the object.

When the laser light of wavelength 655 nm for DVD is incident on this objective lens unit 50 from the light source side (left side in the view), the laser light is appropriately condensed or diverged with a predetermined power by the diffraction effect by the first surface 2a of the diffraction lens 2, and condensed on the information recording surface for DVD (not shown) on the right side in the view through the objective lens main body 1. Further, when the laser light of wavelength 780 nm for CD is incident on this objective lens unit 50 from the light source side, the laser light is appropriately condensed or diverged with a predetermined power by the diffraction effect by the second surface 2b of the diffraction lens 2, and condensed on the information recording surface for CD (not shown) on the right side in the view through the objective lens main body 1. Hereupon, when the laser light of wavelength 405 nm for BD is incident on this objective lens unit 50 from the light source side, the laser light passes as it is without receiving the diffraction action by the diffraction lens 2, and is condensed on the information recording surface for BD (not shown) on the right side in the view through the objective lens main body 1. That is, in the case of the present embodiment, by the combination of the objective main body 1 and the diffraction lens 2, compatible imaging becomes possible with a desired accuracy for each of laser light for CD, DVD, and BD, and each laser light can be used as the information reading light or the information recording light of each optical disk.

Hereupon, as the positioning mark which is a reference for respectively positioning central positions through which respective optical axes OA0, OA1 pass, circular protruded markers M1, M2 are respectively formed in the objective lens main body 1 and diffraction lens 2.

FIGS. 22(a)-(f) are sectional views for explaining the concrete example of a multi-level type diffractive structure as the phase structure formed on the first surface 2a of the diffraction lens 2. This multi-level type diffractive structure has the structure in which patterns whose sectional shape including the optical axis OA1 is step-like, are arranged concentric circularly, and for each number of a predetermined level surface number (5-level surface in FIGS. 22(a)-(f)), the step is shifted by the height for number of steps (4 steps in FIGS. 22(a)-(f)), corresponding to the level surface numbers, and has the characteristic by which, when the laser light of wavelength 655 nm for DVD is incident, the diffraction light is generated, and when the laser light of wavelengths 405 nm, 780 nm are incident, the diffraction effect is not generated and the laser light is transmitted as it is. For such a multi-level type diffractive structure, because it is written on pages 230-231 of the technical digest of ISOM '03(INTERNATIONAL SYMPOSIUM ON OPTICAL MEMORY 2003), herein, detailed description is omitted. In the above description, FIGS. 22(a), (b) show an example of the multi-level type diffractive structure in which the inclination of each pattern is in the same direction on the basis of the optical axis OA1, FIGS. 22(c), (d) show an example of the multi-level type diffractive structure in whose outer periphery the phase reversal section is provided, and FIGS. 22(e), (f) show and example of the multi-level type diffractive structure in which the inclination of each pattern is reversed in the outside of the phase reversal section.

Figure 23:
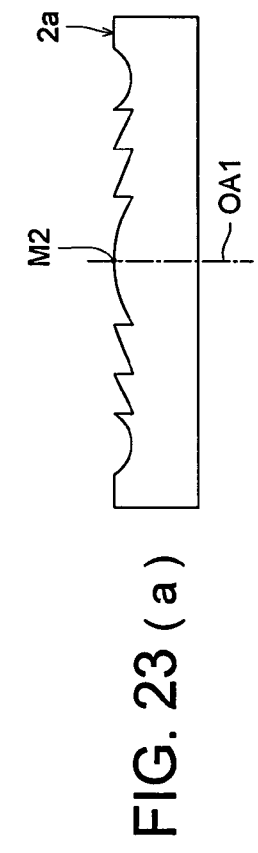
FIGS. 23(a) to 23(h) are sectional views for explaining concrete examples of the phase structure formed on a single surface of the diffraction lens.
Figure 23:
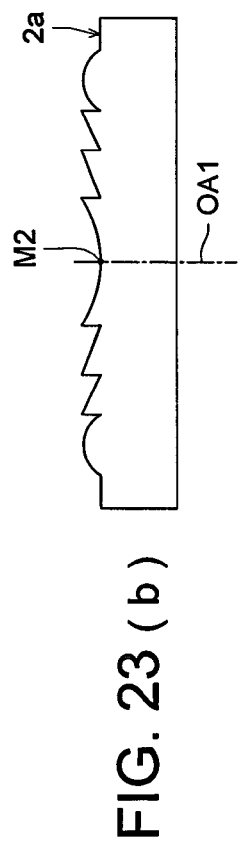
Figure 23:
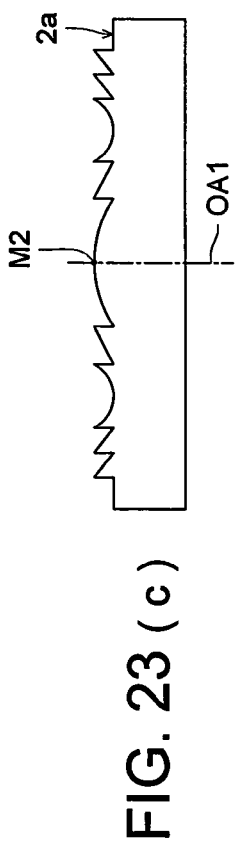
Figure 23:
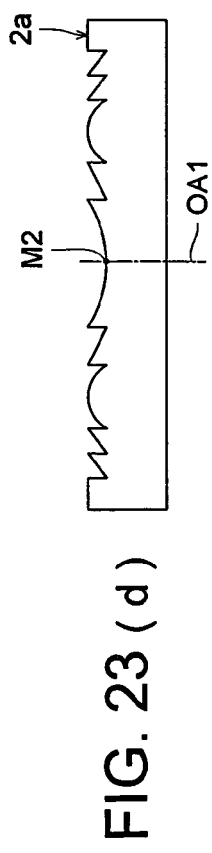

Hereupon, as the phase structure, the saw-toothed diffractive structure whose sectional shape including the optical axis OA1 is saw-toothed, as shown in FIGS. 22(g), (h) and 23(a)-(d), the step-like diffractive structure in which all step differences are in the same direction on the basis of the optical axis OA1, as shown in FIGS. 23(e), (f), or the optical path difference providing structure whose direction of the step difference is switched in the midway, as shown in FIGS. 23(g), (h) may also be formed on the first surface 2a of the diffraction lens 2. FIGS. 22(g), (h) show the example of the saw-toothed diffractive structure whose inclination of each saw-tooth is in the same direction on the basis of the optical axis OA1, FIGS. 23(a), (b) show the example of the saw-toothed diffractive structure in which the phase reversal section is provided in the outer periphery, and FIGS. 23(c), (d) show the example of the saw-toothed diffractive structure in which the inclination of each saw-tooth is reversed in the outside of the phase reversal section.

Figure 24:
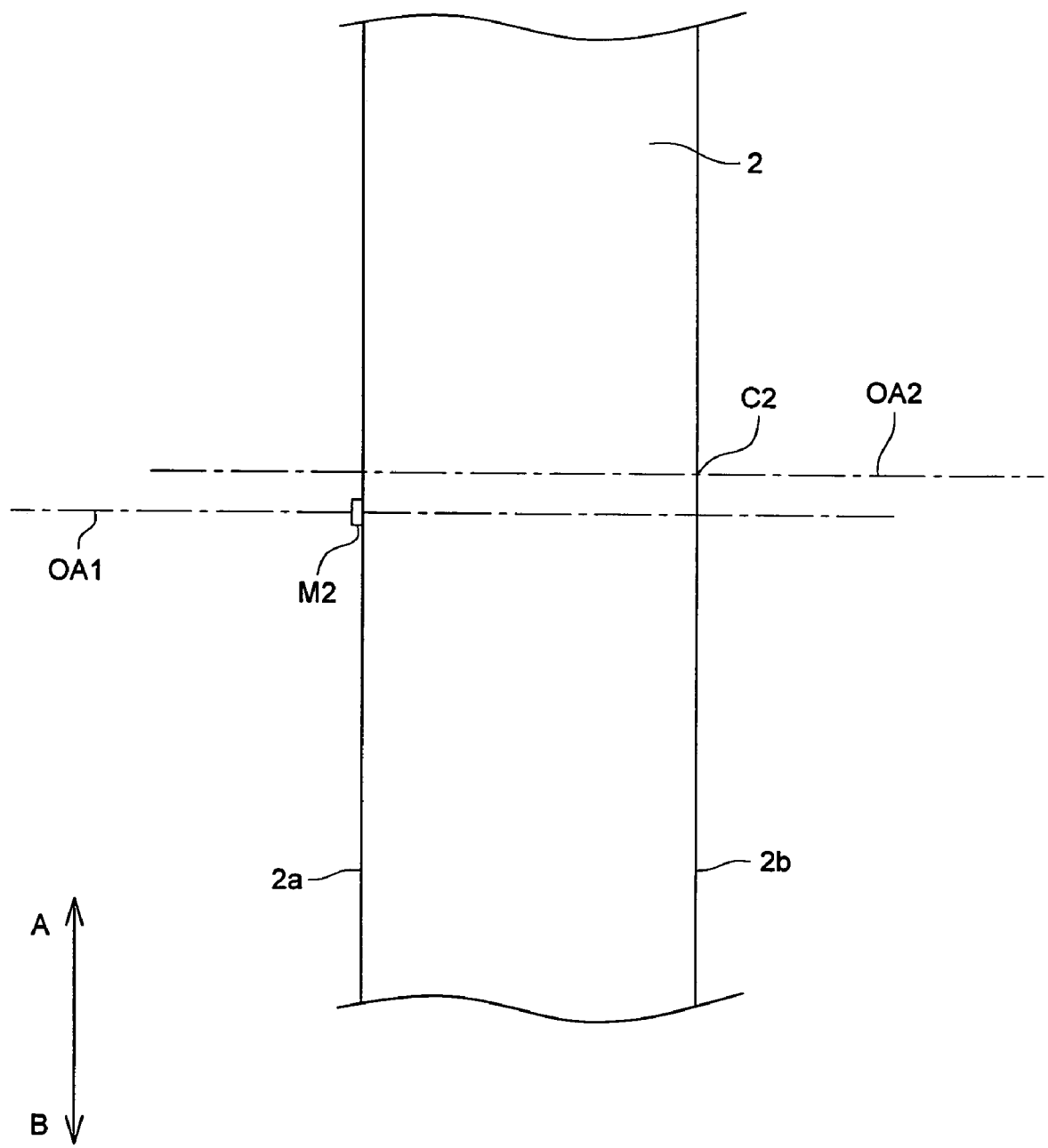
FIG. 24 is a view for explaining the position dislocation of both phase structural surfaces structuring the diffraction lens.

The above description is the explanation of the phase structure formed on the first surface 2a of the diffraction lens 2, and the same phase structure is formed also on the second surface 2b of the diffraction lens 2. However, the phase structure formed on the first surface 2a and the phase structure formed on the second surface 2b are different in the pattern or dimension, and the diffraction action for the laser light for CD or for the laser light for DVD is different. That is, the phase structure has the characteristic by which, when the laser light of wavelength 780 nm for CD is incident, the diffraction light is generated, and when the laser light of wavelengths 405 nm, 655 nm, are incident, the diffraction effect is not generated, and the laser light are passed as they are. Further, the phase structure formed on the first surface 2a of the diffraction lens 2 and the phase structure formed on the second surface 2b are mutually position-dislocated. FIG. 24 is a view for explaining the position-dislocation of each of surfaces 2a, 2b constituting the diffraction lens 2. The optical axis OA1 perpendicular to the whole of the first surface 2a is a first sub optical axis passing the central point of the phase structure formed on the first surface 2a of the diffraction lens 2, and the marker M2 is formed at the central point of this phase structure. Further, the optical axis OA2 perpendicular to the whole of the second surface 2b is a second sub optical axis passing the central point of the phase structure formed on the second surface 2b of the diffraction lens 2. In the case of the present embodiment, these optical axes OA1, OA2 are parallel to each other, and are separated by a predetermined interval. As this result, as will be described later, when the diffraction lens 2 is inclined in AB direction, even when the first surface 2a and the second surface 2b are relatively position-dislocated in the direction perpendicular to the optical axis OA0, such a relative position-dislocation is cancelled each other as the result, and the generation of the coma aberration can be suppressed.

When the manufacturing method of the above described diffraction lens 2 is briefly described, the diffraction lens 2 is manufactured, for example, by the molding, however, the phase structure such as the step structure to be formed on the mold surface of a pair of molding dies corresponding to the first surface 2a and the second surface 2b can be made a structure which is previously position-dislocated. Further, when, in a pair of molding dies corresponding to the first surface 2a and the second surface 2b, a cavity is formed in the condition that it is made relatively position-dislocated corresponding to the relative position dislocation amount of the optical axes OA1, OA2, the diffraction lens 2 as shown in FIG. 24 can be obtained. Furthermore, a transparent disc is prepared as the base material of the diffraction lens 2, and when, after UV hardening resin is coated in an appropriate amount on its both surfaces, it is embossed, the first surface 2a and the second surface 2b can be obtained. In this case, a pair of dies corresponding to the first surface 2a and the second surface 2b are pressed on the base material of the diffraction lens 2 under the condition that they are made relatively position-dislocated corresponding to the relative position-dislocation amount of the optical axes OA1, OA2, and in this condition, the UV light is irradiated, and the UV hardening resin is hardened. When a pair of dies are removed, the diffraction lens 2 shown in FIG. 24 can be obtained.

Returning to FIG. 21, the lens frame is provided with the first and the second engagement sections 4, 5 which are cylindrical and have step differences on both ends, ring-shaped first and second reference surfaces 6, 7, ring-shaped stop 10, ring-shaped third reference surface 11, and the third engagement section 12. The first and the second engagement sections 4, 5 are cylindrical inner surfaces respectively having step difference, and respectively fix flange sections 1f, 2f of the objective lens main body 1 and diffraction lens 2 in the direction perpendicular to the optical axis OA0. The first and the second reference surfaces 6, 7 are formed respectively being connected to the first and the second engagement section 4, 5, and when the objective lens main body 1 and the diffraction lens 2 are attached, they are reference for positioning the flange sections 1f, 2f in the optical axis OA0 direction. In the second engagement section 5, a play 8 is provided in the direction perpendicular to the optical axis. This play 8 can make, when the diffraction lens 2 is positioned, fine adjustment by which the center position is accorded with the objective lens main body 1. In the end portions of the first and the second engagement sections 4, 5, chamfering adhesive agent pool section 9 is formed. When this adhesive agent pool section 9 and flange sections 1f, 2f outer periphery are cooperated, a V groove is formed, and after the adhesion of both lenses 1, 2 or during the adhesion, it is prevented that the adhesive agent is swelled out in the periphery. The stop 10 arranged in the inner wall of the lens frame 3 between the first engagement section 4 and the second engagement section 5 cuts the unnecessary light when the objective lens unit 50 is used, or adjusts the light amount. The third reference surface 11 is a reference of attaching in the optical axis OA0 direction or for the inclination, and the third engagement section 12 is a reference in the direction perpendicular to the optical axis.

Hereupon, in the lens frame 3, the second reference surface 7 which positions the diffraction lens 2 in the optical axis OA0 direction, is, to the first reference surface 6 which positions the objective lens main body 1 in the optical axis OA0 direction, slightly inclined in AB direction. As this result, the first surface 2a and the second surface 2b is slightly inclined in AB direction to the objective lens main body 1. Such an inclination is necessary for easily preventing that, when the imaging characteristic of the objective lens unit 50 is measured, the interference image is disturbed or its contrast is lowered by the returning light from the diffraction lens 2. That is, when the diffraction lens 2 is slightly inclined, it can be prevented that the returning light from the first surface 2a or second surface 2b (the returning light from the diffraction pattern itself or its peripheral flat range) is incident on the image sensor of the interferometer, and because noises due to the returning light is hardly entered into the measured image, the measurement of the imaging characteristic of the objective lens unit 50 can be conducted with high accuracy. Of course, when the optical pick-up apparatus using such a lens unit is used, it can be prevented that the returning light from the diffraction lens 2 is incident on the light sensor, and the influence on the reproducing signal can also be prevented. Hereupon, although it is exaggeratedly expressed, the inclination of the diffraction lens 2 is normally smaller, and it is made, for example, about 3°. As described above, when the diffraction lens 2 is inclined, following this, the first surface 2a or the second surface 2b is inclined in the optical axis OA0, and shifted in the direction perpendicular to the optical axis OA0. Such an inclination or shifting does not particularly give the influence on the condensing characteristic of the laser light of wavelength 405 nm for BD for which the diffraction action is not received by the diffraction pattern of the multi-level type diffraction structure, but gives the influence on the condensing characteristic of each laser light of wavelength 780 nm for CD, or wavelength 655 nm for DVD for which the diffraction action is received by such a diffraction pattern, and there is a possibility that the aberration is generated at the time of the condensing. Therefore, in the objective lens unit 50 of the present embodiment, as described also in FIG. 4, the optical axis OA1 passing the central point of the first surface 2a of the diffraction lens 2 and the optical axis OA2 passing the central point of the second surface 2b are position-dislocated in parallel. As described above, it is made so that, when both surfaces 2a, 2b are intentionally position-dislocated, and the consideration is made for the centering of the diffraction lens 2 to the objective lens main body 1, even when the diffraction lens 2 is inclined to the optical axis OA0 of the objective lens main body 1, the imaging accuracy more than predetermined one is attained.

In the lens frame 3, a cut-out 3d which is an azimuth mark showing AB direction in which the second reference surface 7 is inclined to the first reference surface 6 is formed. Further, also in the diffraction lens 2, the cut-out 2d which is an azimuth mark showing AB direction in which this diffraction lens 2 is to be inclined, is formed. By using these cut-outs 2d, 3d, the inclination direction of the diffraction lens 2 can be set to the intentional direction, and the influence of the inclination to the optical characteristic of the diffraction lens 2 can be appropriately controlled.

Hereupon, a means for displaying the inclination direction of the diffraction lens 2 is not limited to cut-outs 2d, 3d, but each kind of mark including the steric shape, coloring can be used. Further, instead of cut-outs 2d, 3d, the sheet-like mark can also be adhered to the diffraction lens 2 or lens frame 3.

A manufacturing process of the objective lens unit 50 in the present embodiment will be described below. Initially, the objective lens main body 1 is attached to the lens frame 3. The flange surface of the objective lens main body 1 is brought into contact with the first reference surface 6, and the adhesive agent is injected into the adhesive agent pool section 9. Hereby, the objective lens main body 1 is fixed to a predetermined position. In this case, because superfluous adhesive agent stays in the adhesive agent pool section 9, it can be prevented that the adhesive agent is swelled in the periphery during adhesion or after adhesion.

Next, the diffraction lens 2 is attached to the other end side opposed to the objective lens main body 1 attached to the lens frame 3. Under the condition that the azimuth of cut-outs 2d, 3d are accorded, the flange surface of the diffraction lens 2 is brought into contact with the second reference surface 7, and positioned to the objective lens main body 1. In this case, the inner diameter of the second engagement section 5 is designed slightly larger than the outer diameter of the diffraction lens 2, and the difference is a play 8. Hereby, the diffraction lens 2 can move in the direction perpendicular to the optical axis, and while the opposing objective lens main body 1 is observed, relative positioning in the direction perpendicular to the optical axis can be conducted.

After the diffraction lens 2 is positioned, the adhesive agent is injected into the adhesive agent pool section 9. Hereby, the diffraction lens 2 is fixed under the condition that it is positioned. In this case, because the superfluous adhesive agent stays in the adhesive agent pool section 9, it is prevented that the adhesive agent is swelled out in the periphery during adhesion or after adhesion. Further, the stop 10 acts as the sagging prevention means when the adhesive agent is entered into the lens frame 3.

From the above description, the objective lens unit 50 is manufactured. As described above, the objective lens unit 50 is 3-part composition in which, in addition to the objective lens main body 1 and the diffraction lens 2, the lens frame 3 is further used. Hereby, the relative positioning in the direction perpendicular to the optical axis of the objective lens main body 1 and the diffraction lens 2 can previously be conducted with high accuracy.

Hereupon, in the present invention, relating to the order of attaching, the objective lens main body 1 is before, and the diffraction lens 2 is after. This is for the convenience of the design that the observation from a side of the diffraction lens 2 whose refractive power is smaller, can be easily conducted at the time of positioning. However, when the positioning is conducted, for example, making the objective lens main body 1 back side, the order of attaching may also be changed. When the order of attaching is changed, the play is provided on the first engagement section 4 side. Further, as a fixing means other than this, for example, also by the laser welding, both lenses 1, 2 can be fixed to the lens frame 3. Further, not only on the diffraction lens 2 side, the play may also be in both of the diffraction lens 2 and the objective lens main body 1.

Figure 25:
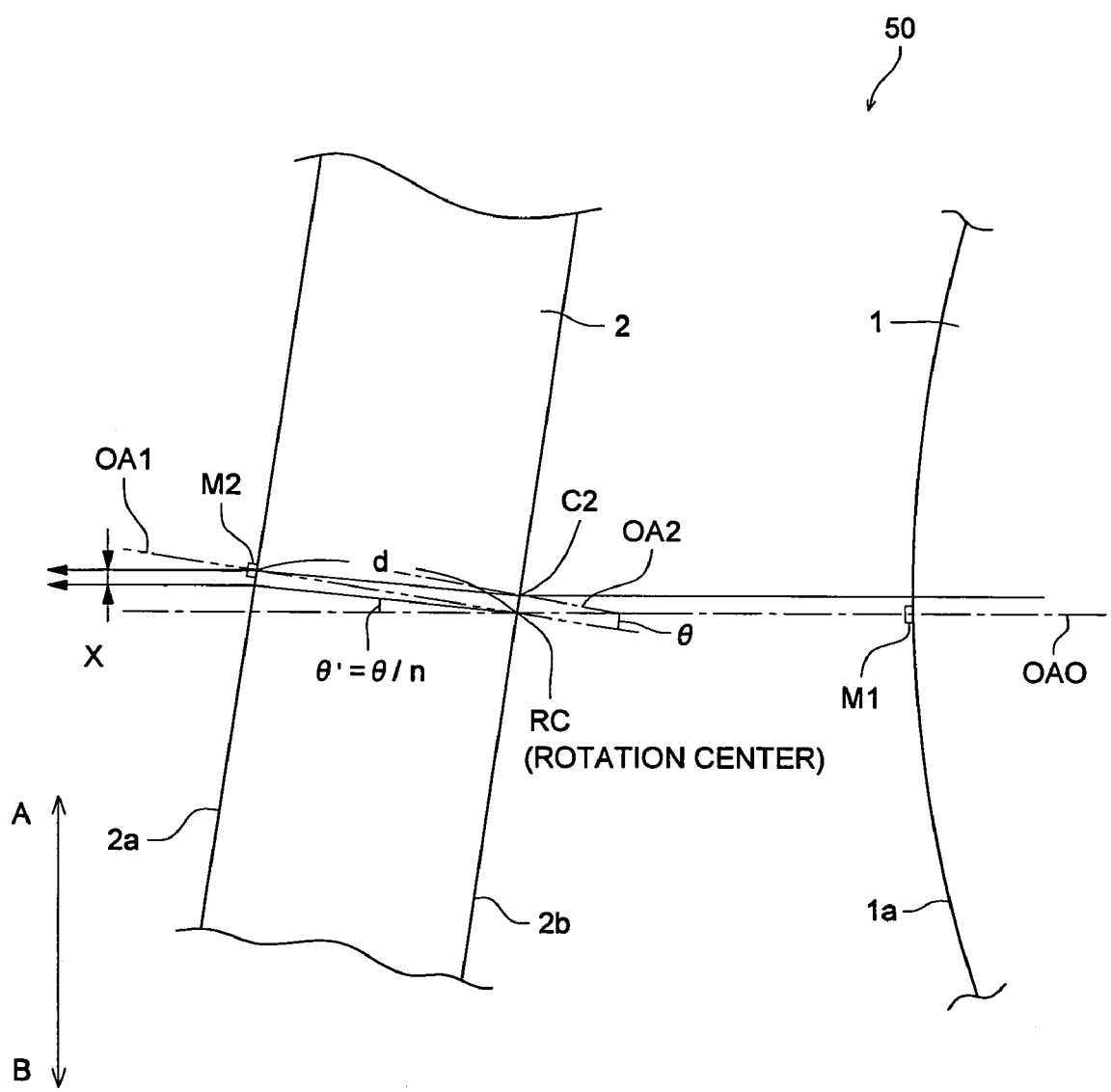
FIG. 25 is an enlarged view for explaining the positioning of the objective lens unit of FIG. 21.
Figure 26:
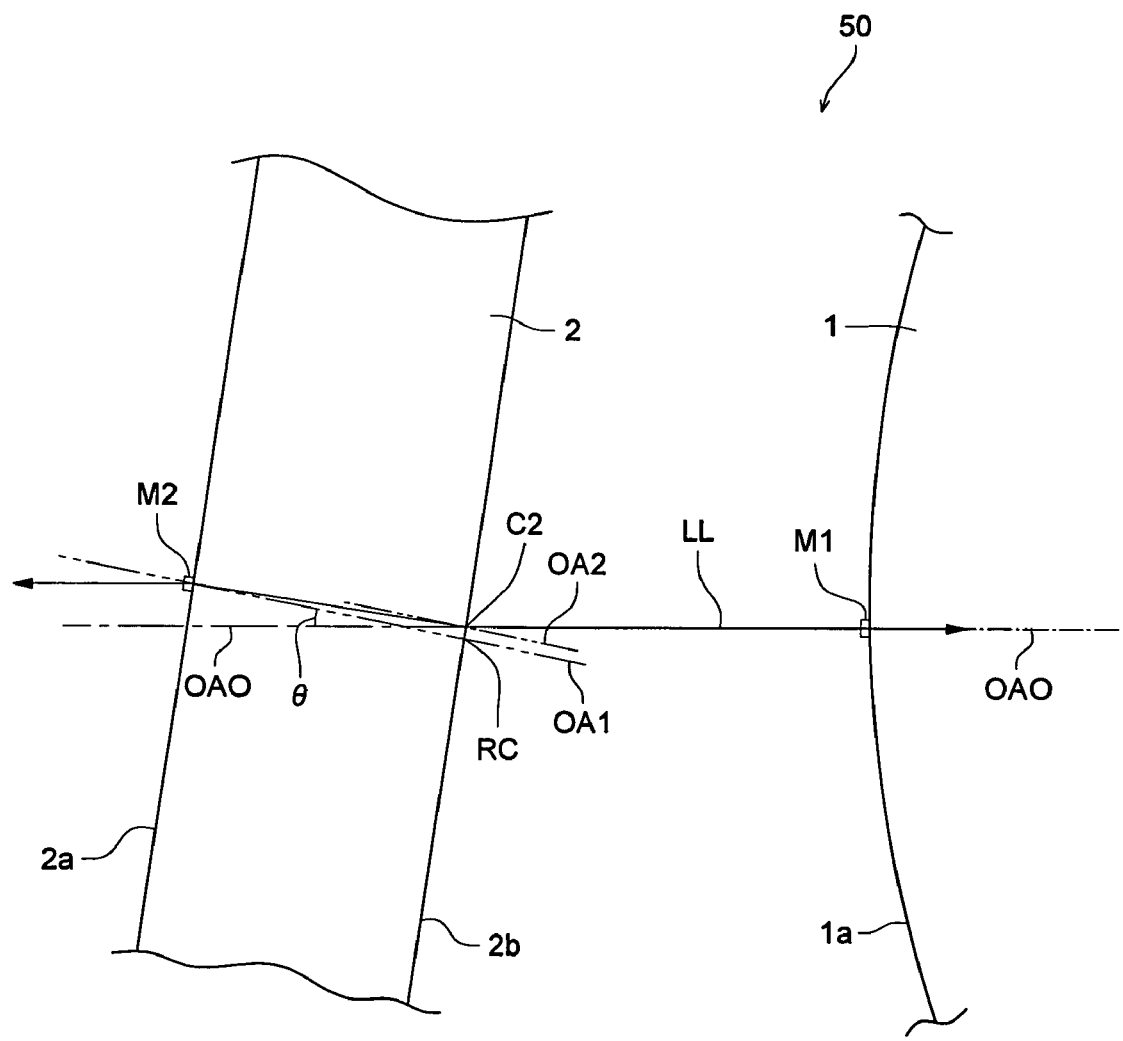
FIG. 26 is an enlarged view for explaining the positioning of the objective lens unit of FIG. 21.

FIGS. 25 and 26 are enlarged views for conceptually explaining the condition before and after the positioning of the diffraction lens 2 to the objective lens main body 1. As shown in FIG. 5, in the condition before the positioning, it is assumed that the diffraction lens 2 is forcibly inclined in AB direction, and the optical axis OA1 inherent to the first surface 2a of the diffraction lens 2 is inclined by angle θ to the optical axis OA0 of the objective lens main body 1 around the rotation center RC which is the intersection of the second surface 2b and the optical axis OA1. In this case, for the purpose that the imaging characteristic of the objective lens unit 50 is not deteriorated even when the diffraction lens 2 is inclined, as shown in FIG. 26, it is desirable that, for example, the positioning is conducted so that the laser light LL incident in parallel to the optical axis OA0 of the objective lens main body 1 from the light source side, passes the marker M2 corresponding to the center (intersection of the first surface 2a and the optical axis OA1 of the concerned first surface 2a) of the first surface 2a of the diffraction lens 2, passes the central point (intersection of the second surface 2b and the optical axis OA2 of the concerned second surface 2b) of the second surface 2b, further, passes the marker M1 corresponding to the center of the objective lens main body 1, and advances along the optical axis OA0. In this manner, when, by using the markers M1, M2, the central point of the objective lens main body 1 and the central point of each of surface 2a, 2b are accorded with each other in the optical axis OA0 direction, irrespective of a value of the inclination angle θ of the diffraction lens 2, the coma aberration generated as at least the objective lens unit 50 can be reduced.

As shown in FIG. 25, in the condition before the positioning, the position of both markers M1, M2 is shifted by the distance X in the direction perpendicular to the main optical axis OA0. This distance X is given by the following equation (1) from the thickness d of the diffraction lens 2, inclination angle θ, and refractive index n of the diffraction lens 2, $$X = d \cdot (\sin\theta - \sin(\theta/n)) \quad (1)$$

Before the positioning, because the coma aberration for the wavelength 655 nm for DVD is generated due to this shift amount X, when the marker M1 of the objective lens main body 1 is shifted by the distance X in the direction perpendicular to the optical axis to the marker M2 of the diffraction lens 2 by the positioning, as will be described later, the generation of the coma aberration for the wavelength 655 nm for DVD is practically suppressed. Such a positioning can be comparatively simply attained, and specifically, while the objective lens main body 1 attached to the lens frame 3 is observed on the optical axis OA0 from left side in the view, the diffraction lens 2 is arranged on this side of the objective lens main body 1, and the diffraction lens 2 is moved in the second engagement section 5 of the lens frame 3 so that both markers M1, M2 are accorded with each other. Hereby, the condition as shown in FIG. 26 is attained, and the positioning of the objective lens main body 1 and the diffraction lens 2 is completed. Hereupon, because the optical axis OA0 direction of the objective lens main body 1 can be comparatively simply determined, the objective lens main body 1 and the diffraction lens 2 are observed from the optical axis OA0 direction determined in this manner by the microscope. When observation, the positioning may be conducted so that both markers M1, M2 are accorded with each other in the image plane.

In the manner as described above, when the marker M1 of the objective lens main body 1 is positioned to the marker M2 of the diffraction lens 2 in the direction perpendicular to the optical axis, and made to the condition of FIG. 26, not only the generation of the coma aberration for the wavelength 655 nm for DVD, the generation of the coma aberration for the wavelength 780 nm for CD can be practically suppressed. When specifically described, by the position shifting of the optical axes Oa1, OA2 as described in FIG. 24, the marker M2 which is the central point of the first surface 2a and the central point C2 of the second surface 2b are optically positioned. That is, on the optical path passing through the central point which is extending by passing the optical axis OA0 of the objective lens main body 1, not only the maker M2 which is the central point of the first surface 2a of the diffraction lens 2, but the central point C2 of the second surface 2b of the diffraction lens 2 can be arranged. In order to attain such a positioning, the first surface 2a and the second surface 2b of the diffraction lens 2 previously have the position-dislocation in the AB direction. Such an amount of the position-dislocation cancels each other the influence of the inclination of the diffraction lens 2, and accords with the shift amount X given by the above described equation (1). That is, the optical position dislocation in the optical axis OA0 direction generated by the inclination of the diffraction lens 2 is in accord with the shift amount X, and when it is made a structure in which the central points of each of surfaces 2a, 2b of the diffraction lens 2 are inversely shifted in AB direction so that such a shift amount X is cancelled each other, the positioning of the first and the second surfaces 2a, 2b, that is, diffraction lens 2 in the direction perpendicular to the optical axis to the objective lens main body 1 can be attained. Hereby, the imaging characteristic of the objective lens unit 50 can be made a lens unit in which the coma aberration is small and which has the high accuracy.

Figure 27:
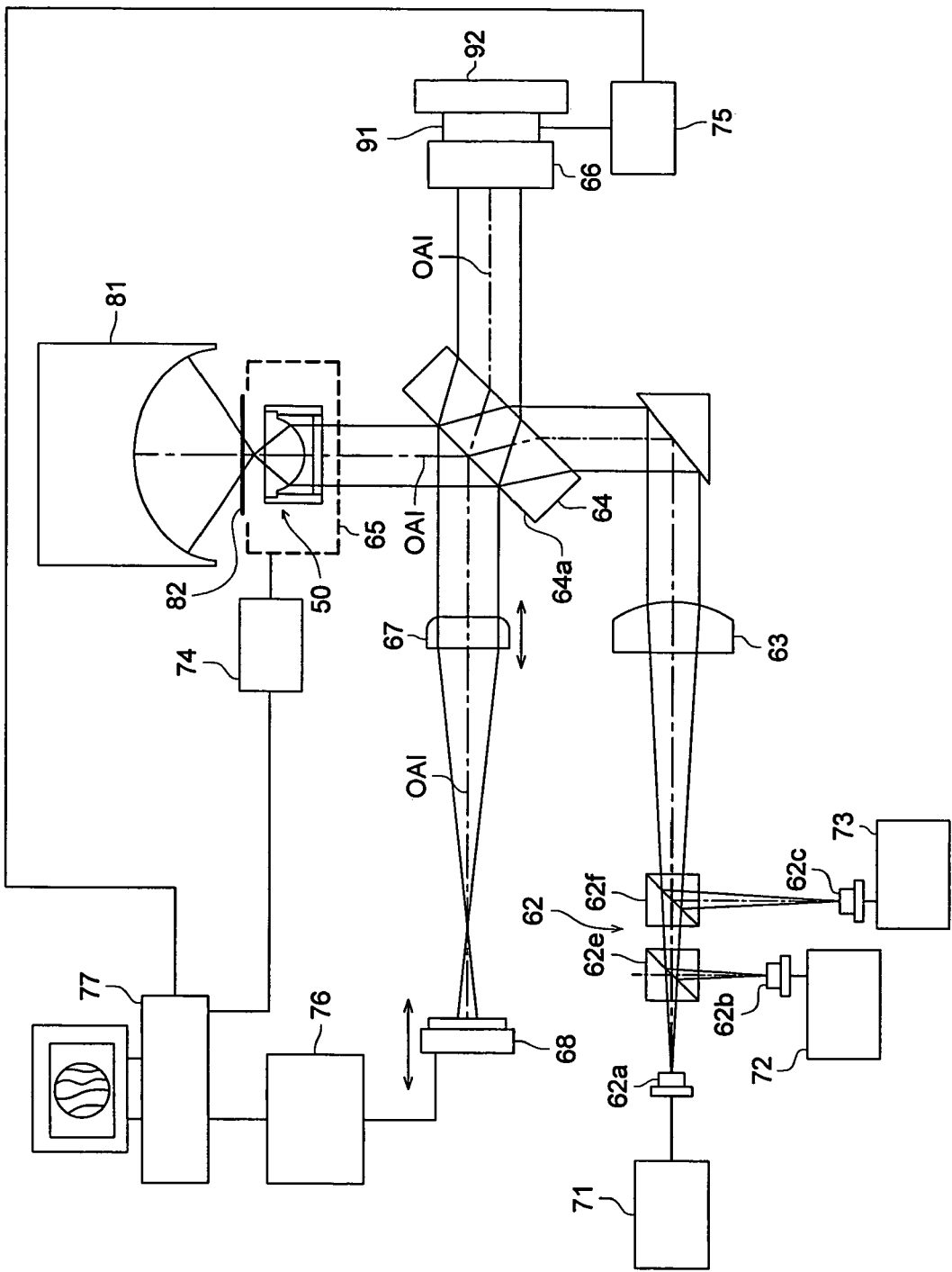
FIG. 27 is a view for explaining an apparatus for measuring the optical characteristic of the objective lens unit of FIG. 21.

FIG. 27 shows an interferometer apparatus for measuring the optical characteristic (specifically, the wave-front aberration) of the objective lens unit 50 shown in FIG. 21. This interferometer apparatus is composed of the Twiman Green type interferometer, and is provided with, as the optical system, the light source apparatus 62, collimator lens 63, beam splitter 64, stage for inspected object 65, reference flat surface mirror 66, image pick-up lens 67, and CCD sensor 68. Further, this interferometer apparatus is provided with, as the drive control system, laser drivers 71, 72, 73, stage drive apparatus 74, mirror scanning circuit 75, image processing apparatus 76 and computer 77 by which these operations are collectively controlled.

The light source apparatus 62 is provided with 3 semiconductor lasers 62a, 62b, 62c, and 2 beam splitters 62e, 62f. The wavelengths of the inspection light emitted from these semiconductor lasers 62a, 62b, 62c can be made, for example, 780 nm, 655 nm, and 405 nm, and in this case, the wave-front aberration of the objective lens unit 50 respectively for laser light for CD, laser light doe DVD, and laser light for BD can be measured.

The beam splitter 62e houses a band-pass filter, and when it transmits the inspection light from the first semiconductor laser 62a, and reflects the inspection light from the second semiconductor laser 72b, the inspection light from both semiconductor lasers 62a, 62b having different wavelengths are guided to the same optical path. Further, the beam splitter 62f houses a band-pass filter, and when it transmits the inspection light through the beam splitter 62e, and reflects the inspection light from the third semiconductor laser 62c, the inspection light from all semiconductor lasers 62a, 62b, 62c having different wavelengths are guided to the same optical path.

The collimator lens 63 makes each inspection light emitted from the light source 62 into parallel light flux. Hereupon, in this case, because the wavelength difference of the inspection light from each of semiconductor lasers 62a, 62b, 62c is large, as the collimator lens 63, an achromatic lens is used, or the collimator lens 63 is made an exchange for a lens corresponding for each of wavelengths.

The beam splitter 64 is a parallel plate-like transparent plate, and for example, a semi-transparent mirror film is formed on the beam divided surface 64a. The beam splitter 64 reflects a part of the inspection light incident on this on the beam divided surface 64a, and makes it a reference light, and transmits the remaining inspection light and makes it an inspected light.

The stage for the inspected object 65 can be driven by a manual mechanism, not shown, or a stage drive apparatus 74, and the objective lens unit 50 which is the inspected object, is 3-dimensionally moved and held at an appropriate place. Hereupon, when the inspected object is the objective lens unit 50 as shown in the view and its imaging characteristic is measured, a reference concave surface mirror 81 is arranged on the back of the objective lens unit 50, and the inspected light through the objective lens unit 50 is reflected, and through the objective lens unit 50 again, it is made an about parallel light flux and is returned to the beam splitter 64, and made to interfere with the reference light. Further, because the objective lens unit 50 is designed so as to condense through a predetermined parallel plane substrate, a cover plate 82 is arranged between the reference concave surface mirror 81 and the objective lens unit 50.

The reference plane mirror 66 is fixed to the holding apparatus 92 through a piezo-electric element 91. The piezo-electric element 91 is, as a phase sending mechanism, expanded and contracted corresponding to the control voltage from the mirror scanning circuit 75, and the reference mirror can be accurately reciprocated in the wavelength order in the direction of optical axis OA1.

The image pick-up lens 67 condenses the inspected light from the objective lens unit 50 compounded through the beam splitter 64 and the reference light from the reference plane mirror 66, as the composition light.

Further, on the CCD sensor 68, the composition light condensed once by the image pick-up lens 67 is emitted as the interference fringe. The pattern of this interference fringe is outputted as the electric signal to the image processing apparatus 76. This electric signal is outputted to the computer 77 as an image signal corresponding to the emitted interference fringe pattern.

The computer 77 can control the movement of the interference fringe emitted on the CCD sensor 68, and can conduct the position control of the interference fringe, when it controls the mirror scanning circuit 75 and moves the reference plane mirror 66 in the optical axis direction. Further, the computer 77 analyzes the movement of the interference fringe detected by the CCD sensor 68 and can measure the wave-front aberration of the inspected light from the objective lens unit 50.

The operation of the interference measuring apparatus shown in FIG. 27 will be described below. Initially, the objective lens unit 50 which is the inspected object, is set on the stage for the inspected object 65. Next, for example, the first laser driver 71 is operated, and the laser light for CD is emitted as the inspection light from the first semiconductor laser 62a. Next, the control signal is outputted from the computer 77 to the mirror scanning circuit 75 and the piezo-electric element 91 is changed. Hereby, the scanning to phase-send the reference plane mirror 66 becomes possible, the high accurate wave-front measuring for the wavelength for CD becomes possible. Next, the second laser driver 72 is operated, and the laser light for DVD is emitted as the inspection light from the second semiconductor laser 62b. In the same manner in the following, the wave-front change for the wavelength for DVD by the objective lens unit 50 is measured by the scanning to phase-send the reference plane mirror 66. Next, the third laser driver 73 is operated, and the laser light for BD is emitted as the inspection light from the third semiconductor laser 62c. In the same manner in the following, the wave-front change for the wavelength for BD by the objective lens unit 50 is measured by the scanning to phase-send the reference plane mirror 66.

By above described interference measuring apparatus, the wave-front aberration for the wavelength for CD, wavelength for DVD and wavelength for BD, that is, the optical characteristic of the objective lens unit 50 can be measured. In this case, because the diffraction lens 2 is inclined by a minute angle to the optical axis of the objective lens main body 1 which composes the objective lens unit 50, it can be prevented that the returning light from the diffraction lens 2 is incident on the CCD sensor 68 via the beam splitter 64 or image pick-up lens 67. That is, because noises due to the returning light hardly enters into the interference pattern photographed by the CCD sensor 68, the wave-front measuring of the objective lens unit 50 can be made into the high accuracy.

Hereupon, in the objective lens unit 50 as in the present embodiment, when the diffraction lens unit 2 is moved in the direction perpendicular to the optical axis by 3 μm, that is, the optical axes OA1, OA2 of the diffraction lens 2 is shifted in parallel to the optical axis OA0 by 3 μm, the coma aberration of about 5 mλRMS or the more on the basis of the wavelength λ, is generated. In order to suppress such an aberration to the utmost, it is not only necessary that the positioning of the diffraction lens 2 is made into the high accuracy to less than several microns, but is necessary that the coma aberration of the first surface 2a and the second surface 2b generated due to the inclination angle of the diffraction lens 2, that is, the optical axes OA1, OA2 are both reduced. Specifically, it is desirable to suppress to the coma aberration of 5-50 mλRMS. In the present embodiment, the optical axes OA1, OA2 of both surfaces 2a, 2b are made independent, and by the interval adjustment of them, the coma aberration of the first surface 2a and the second surface 2b can be both reduced in the event. As this result, in the imaging characteristic of the objective lens unit 50, the generation of the coma aberration can be effectively suppressed, and the objective lens unit 50 which satisfies the required specification can be effectively manufactured.

The Eleventh Embodiment

The objective lens unit of the eleventh embodiment will be described below. The objective lens unit of the eleventh embodiment is a modified lens unit of the objective lens unit 50 of the first embodiment shown in FIG. 21, and the part which is not particularly described, is a common one to the tenth embodiment.

Figure 28:
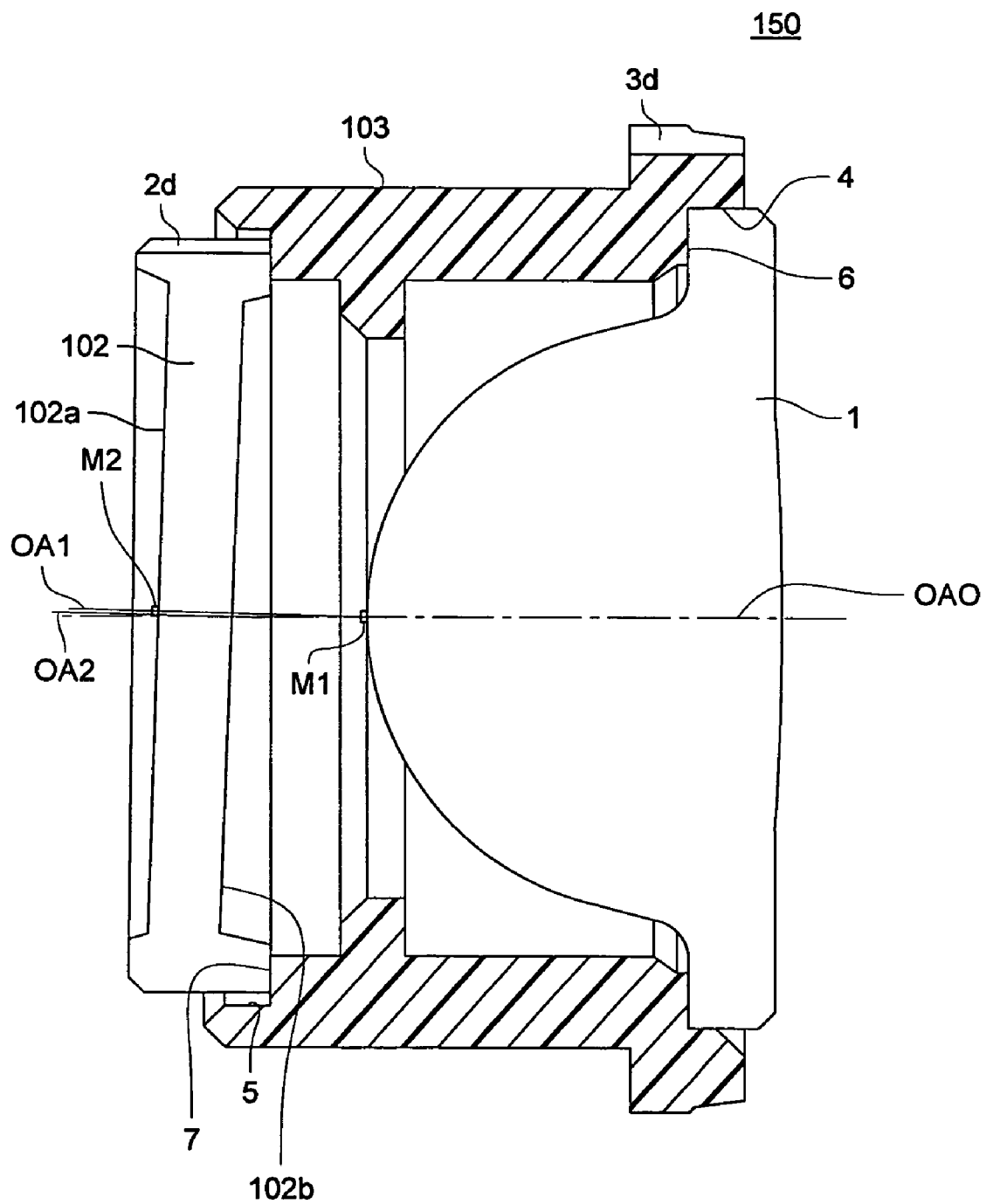
FIG. 28 is a side sectional view of the lens unit of the eleventh embodiment.

FIG. 28 is a side sectional view of the objective lens unit 50 according to the eleventh embodiment. Also in the case of this objective lens unit 50, a pair of proximate optical axes OA1, OA2 provided in the diffraction lens 102, has a minute inclination which is not 0, to the optical axis OA0 of the objective lens main body 1. However, such an inclination is not an inclination generated due to the shape of the lens frame 103, but an inclination generated due to the flange shape of the diffraction lens 102 itself. In this manner, when the first surface 102a and the second surface 102b of the diffraction lens 102 are inclined, particularly the influence is not given to the condensing for the laser light of wavelength 405 nm for BD, but the influence is given to the condensing for the laser light of the wavelength 780 nm for CD, and the wavelength 655 nm for DVD, and there is a possibility that the aberration is generated at the time of condensing. Such an aberration is, in the same manner as the case of the first embodiment shown in FIG. 26, by the centering by using the makers M1, M2, cancelled, and although the diffraction lens 102 is inclined to the optical axis OA0 of the objective lens main body 1 and the generation of the returning light can be prevented, the imaging accuracy more than predetermined one can be attained.

The Twelfth Embodiment

Figure 29:
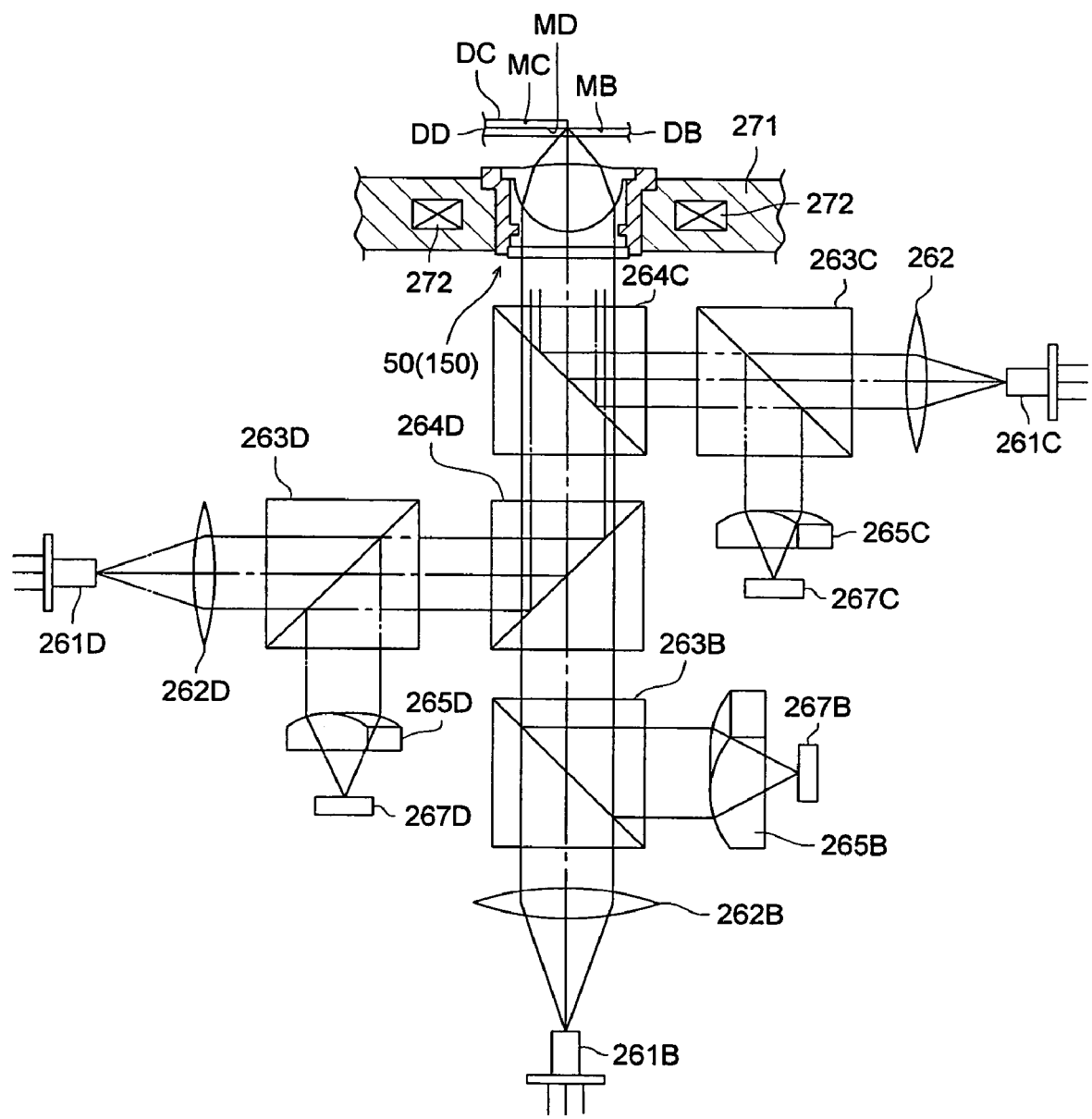
FIG. 29 is a view showing the optical pick-up apparatus of the twelfth embodiment.

FIG. 29 is a view schematically showing the structure of the optical pick-up apparatus in which the objective lens unit 50 shown In FIG. 21, or the objective lens unit 150 shown In FIG. 28, is assembled.

In this optical pick-up apparatus, the laser light from each of semiconductor lasers 261B, 261D, 261C is, by using the objective lens units 50, 150, irradiated on the optical disks DB, DD, DC which are optical information recording media, and the reflection light from each of optical disks DB, DD, DC are, through the common objective lens units 50, 150, finally guided to each of photo detectors 267B, 267D, 267C.

Herein, the first semiconductor laser 261B generates the laser light for information reproduction of the first optical disk DB (for example, the wavelength 405 nm for BD), the laser light is condensed by the objective lens units, 50, 150, and the spot corresponding to NA 0.85 is formed on the information recording surface. The second semiconductor laser 261D generates the laser light for information reproduction of the second optical disk DD(for example, the wavelength 655 nm for DVD), after that the laser light is condensed by the objective lens units, 50, 150, and the spot corresponding to NA 0.65 is formed on the information recording surface. The third semiconductor laser 261C generates the laser light for information reproduction of the third optical disk DC (for example, the wavelength 780 nm for CD), after that the laser light is condensed by the objective lens units, 50, 150, and the spot corresponding to NA 0.51 is formed on the information recording surface. Further, the first photo detector 267B detects the information recorded in the first optical disk DB, as the optical signal (for example, the wavelength 405 nm for BD), the second photo detector 267D detects the information recorded in the second optical disk DD, as the optical signal( for example, the wavelength 655 nm for DVD), and the third photo detector 267C detects the information recorded in the third optical disk DC, as the optical signal(for example, the wavelength 780 nm for CD).

Initially, when the first optical disk DB is reproduced, the laser light of, for example, the wavelength 405 nm is emitted from the first semiconductor laser 261B, the emitted light flux becomes the parallel light flux by the collimator lens 262B. This light flux is, after transmits the polarizing beam splitters 263B, 264D, 264C, condensed on the information recording surface MB of the first optical disk DB by the objective lens units 50, 150.

The light flux modulated by the information pit and reflected on the information recording surface MB, transmits again the objective lens units 50, 150, and is incident on the polarizing beam splitter 263B, reflected herein and the astigmatism is given by the cylindrical lens 265B, and the flux is incident on the first photo detector 267B, and by using its output signal, the reading signal of the information recorded in the first optical disk DB is obtained.

Further, the light amount change by the shape change, position change of the spot on the first photo detector 267B is detected, and the focus detection or track detection is conducted. According to this detection, the 2-dimensional actuator 272 assembled in the holder 271 holding the objective lens units 50, 150, moves the objective lens units 50. 150 in the optical axis direction so that the light flux from the first semiconductor laser 261B is imaged on the information recording surface MB of the first optical disk DB, and moves the objective lens units 50, 150 in the direction perpendicular to the optical axis so that the light flux from the first semiconductor laser 261B is imaged on a predetermined track.

Next, when the second optical disk DD is reproduced, the laser light of, for example, wavelength 655 nm is emitted from the second semiconductor laser 261D, and the emitted light flux becomes the parallel light flux by the collimator lens 262D. This light flux transmits the polarizing beam splitter 263D, reflected by the polarizing beam splitter 264D, after it transmits the polarizing beam splitter 264C after that, the flux is condensed on the information recording surface MD of the second optical disk DD by the objective lens units 50, 150.

The light flux modulated by the information pit and reflected on the information recording surface MD, transmits again the objective lens units 50, 150, reflected by the polarizing beam splitter 264D, and is incident on the polarizing beam splitter 263D, reflected herein and the astigmatism is given by the cylindrical lens 265D, and the flux is incident on the second photo detector 267D, and by using its output signal, the reading signal of the information recorded in the second optical disk DD is obtained.

Further, in the same manner as in the case of first optical disk DB, the light amount change by the shape change, position change of the spot on the second photo detector 267D is detected, and focus detection or track detection is conducted, and by the 2-dimensional actuator 272 which is assembled in the holder holding the objective lens units 50, 150, the objective lens units 50, 150 are moved for focusing and tracking.

Next, when the third optical disk DC is reproduced, the laser light of, for example, wavelength 780 nm is emitted from the third semiconductor laser 261C, the emitted light flux becomes the parallel light flux by the collimator lens 262C, this light flux transmits the polarizing beam splitter 263C, and after reflected by the polarizing beam splitter 264C, the flux is condensed on the information recording surface MC of the third optical disk DC by the objective lens units 50, 150.

The light flux modulated by the information pit and reflected on the information recording surface MC, transmits again the objective lens units 50, 150, reflected by the polarizing beam splitter 264C, and is incident on the polarizing beam splitter 263C, reflected herein and the astigmatism is given by the cylindrical lens 265C, and the flux is incident on the third photo detector 267C, and by using its output signal, the reading signal of the information recorded in the third optical disk DC is obtained.

Further, in the same manner as in the case of first and second optical disks DB, DD, the light amount change by the shape change, position change of the spot on the third photo detector 267C is detected, and the focus detection or track detection is conducted, and by the 2-dimensional actuator 272 which is assembled in the holder holding the objective lens units 50, 150, the objective lens units 50, 150 are moved for the focusing and tracking.

In the foregoing, the present invention is described according to embodiments, however, the present invention is not limited to the above-described embodiments, but various modifications are possible. For example, in the first-ninth embodiments, for the shape including the concave and convex or profile of markers M1, M2 for positioning, it is not limited to ones exemplified in embodiments, but, when it is a means which can visually observe through the measuring device, various shapes can be used by considering also the usability.

Further, in above embodiments, the objective lens units 50-350, 550, 650, 750, composed of 2 optical elements, are described, however, also in the case of the objective lens unit composed of 3 or more optical elements, for example, adjoining any two optical elements can be positioned by the positioning markers which are the same as the above embodiments. Also in this case, the assembling of the objective lens unit becomes easy, and the optical performance is also improved.

Further, in the above embodiments, the objective lens main body 1, the diffraction lens 2, 102, 502, 602 and the lens frame 3 are respectively separated bodies, however, the objective lens main body 1 and the lens frame 3 are integrated and the objective lens main body 1 having a cylindrical flange can be formed, and the diffraction lens 2, 102, 502, 602 and the lens frame 3 are integrated and the diffraction lens 2, 102, 502, 602 having the cylindrical flange can be formed, and in any case, the coma aberration can be erased by the positioning described in FIGS. 6, 7.

Further, in the above seventh and eighth embodiments, in order to specify the inclination direction of the diffraction lenses 502, 602 of the objective lens units 550, 650, an inclination mark can be provided in the lens frame 3 (refer to the cut-out 303d in FIG. 9).

Further, in the above embodiments, the objective lens units 50, 150, 250, 350, 550, 650 for compatible use including BD as an object, are described, however, it is of course that the present invention can also be applied for the objective lens unit for compatible use, for example, including HD instead of BD as an object. Specifically described, for the objective lens unit 50, 150, 250, 350, in the 1-5 embodiments, the unit which is made to have the compatibility, for example, for the DVD and Hd can be formed, and for the objective lens units 550, 650 in the 7-9 embodiments, the unit which is made to have the compatibility, for example, for CD, DVD and HD can be formed.

Further, in the tenth and eleventh embodiments, the marker M2 for the positioning is provided only on the first surfaces 2a, 102a of the diffraction lenses 2, 102, however, the marker M2 for the positioning may also be provided only on the second surfaces 2b, 102b of the diffraction lenses 2, 102. Also in this case, when the inclination amount of the diffraction lenses 2, 102 to the objective lens main body 1 is controlled, the first surfaces 2a, 102a can be optically positioned simultaneously with the second surfaces 2b, 102b. Hereupon, the markers for the positioning can also be provided on both surfaces 2a, 2b, 102a, 102b of the diffraction lenses 2, 102. In this case, the optical positioning of the first surfaces 2a, 102a and the second surfaces 2b, 102b can be visually confirmed.

Further, in the above embodiments, the marker M1 is provided on the first surface 1a of the objective lens main body 1, however, the marker M1 may also be provided on the second surface 1b of the objective lens main body 1.

Hereupon, for the shape including the concave and convex or profile of the markers M1, M2 for the positioning, it is not limited to the shape exemplified in the embodiments, but when it is one which can be visually observed through the measuring device, various shapes can be used by considering also the usability.

Further, in above embodiments, the objective lens units 50, 150, composed of 2 optical elements, are described, however, also in the case of the objective lens unit composed of 3 or more optical elements, for example, adjoining any two optical elements can be positioned by the positioning markers which are the same as the above embodiments. Also in this case, the returning light from the phase control element such as the diffraction lens 2 can be prevented, and the assembling of the objective lens unit becomes easy, and the optical performance is also improved.

Further, in the above embodiments, the objective lens main body 1, the diffraction lenses 2, 102, and the lens frames 3, 103 are respectively separated bodies, however, the objective lens main body 1 and the lens frames 3, 103 are integrated and the objective lens main body 1 having a cylindrical flange section can be formed, or the diffraction lenses 2, 102 and the lens frames 3, 103 are integrated and the diffraction lens 2, 102 having the cylindrical flange section can be formed, and in any case, the coma aberration can be erased by the positioning described in FIGS. 5, 6.

Further, in the above embodiments, the objective lens units 50, 150, for compatible use including BD as an object, are described, however, it is of course that the present invention can also be applied for the objective lens unit for compatible use, for example, including HD instead of BD as an object. Specifically described, for the objective lens units 50, 150 in the first and second embodiments, it is the unit which is made to have the compatibility, for BD, DVD and CD, however, the unit which is made to have the compatibility, for example, for CD, DVD and HD can be formed.

Hereupon, in the recording or reproducing of the optical information recording medium for which the present invention is used, ordinarily, the focus-servo by which the beam is focused on the signal recording layer of the optical disk is conducted, however, in that case, there is a possibility that the objective lens to focus and the optical information recording medium are collided and the optical information recording medium or the objective lens is damaged. Particularly, for the recent optical information recording medium, such as BD, or HD, DVD, making into mass-storage and high density are advanced, and the working distance (WD) between the objective lens and the medium surface also becomes narrow, and such a possibility of collision is increased. Accordingly, on the opposed surface to the optical disk of the lens frame of the lens unit according to the present invention, a material having a good sliding property, for example, the coating layer whose main component is fluorine series resin is coated, or the structure having the elastic material such as silicon resin, rubber on a protruded portion to the medium side rather from the surface on the optical information recording medium side may also be applied. Hereby, even when WD becomes short, and the frequency of the collision of the objective lens with the optical information recording medium is heightened, the damage of the objective lens or the optical information recording medium, or both of them can be prevented by such a structure.

What is claimed is:

1. A lens unit for use in an optical pickup apparatus comprising:
    an objective lens having an inherent first optical axis arranged on an optical information recording medium side, and a phase control element having an inherent second optical axis and two opposed optical surfaces arranged on a light source; and
    a supporting member holding the phase control element to the objective lens under a first condition that the second optical axis of the phase control element is inclined by a certain angle to the first optical axis of the objective lens, and under a second condition that a central point of either of the two opposed optical surfaces of the phase control element is on a central prolonged optical path which is extended to pass through the first optical axis of the objective lens.

2. A lens unit of claim 1, wherein the phase control element gives a compatibility for at least two using light fluxes having different wavelengths from each other, and a numerical aperture of the phase control element is more than 0.6 in use of the using light flux which has a longer wavelength in the at least two using light fluxes.

3. A lens unit of claim 1, wherein the phase control element gives a compatibility for at least two using light fluxes having different wavelengths from each other, and has a feature to cause coma aberration of more than 5 mλRMS if the second optical axis of the phase control element shifts 3 μm in parallel with the first optical axis of the objective lens when the light flux having a longer wavelength of the at least two using light fluxes is used.

4. A lens unit of claim 1, wherein the phase control element is a plane-like member, has a phase structure in a central region around the second optical axis in at least one of the two opposed optical surfaces, and has a flat surface in a peripheral region which is around the central region.

5. A lens unit of claim 4, wherein when the light flux having a longer wavelength in at least two using light fluxes is used, the light flux is made incident on the central region of the phase control element.

6. A lens unit of claim 5, wherein positioning marks are formed on at least one of two central points of the phase control element, and on at least one of two central points of two opposed optical surfaces included in the objective lens.

7. A lens unit of claim 6, wherein the objective lens has the positioning mark at the central point of the optical surface on the phase control element side.

8. A lens unit of claim 6, wherein the phase control element has the positioning mark at the central point of the optical surface and a phase structure formed on the two opposed optical surfaces.

9. A lens unit of claim 8, wherein the phase structure formed in the phase control element has at least one of a diffractive structure and a path difference providing structure.

10. A lens unit of claim 9, wherein the phase structure of the phase control element provides a phase difference to the light flux having a shorter wavelength in the at least two using light fluxes.

11. A lens unit of claim 1, wherein positioning marks are formed on at least one of two central points of the phase control element, and on at least one of two central points of two opposed optical surfaces included in the objective lens.

12. A lens unit of claim 1, wherein the lens unit used for at least two using light fluxes having different wavelengths from each other and one of the two opposed optical surfaces of the phase control element has a first phase structure which acts on the first wavelength light flux, which is one of the at least two using light fluxes, and the other of the two opposed optical surfaces of the phase control element has a second phase structure which acts on the second wavelength light flux, which is the other one of the at least two using light fluxes.

13. A lens unit of claim 12, wherein the phase control element is held by the supporting member under a condition that it is positioned to the objective lens on the basis of the phase structure in which an influence of the coma aberration caused by a de-centering is larger in the first and the second phase structures.

14. A lens unit of claim 13, wherein the objective lens has a positioning mark at the central point of an optical surface on the phase control element side, and wherein the phase control element has a positioning mark at the central point of an optical surface on which the structure in which an influence of the coma aberration caused by a de-centering is larger in the first and the second phase structures.

15. An optical pickup apparatus in which reproducing and/or recording information is conducted for an optical information recording medium, comprising:
a lens unit of claim 1;
a first light source capable of emitting a first wavelength light flux arranged on the central prolonged optical path; and
a second light source capable of emitting a second wavelength light flux arranged separate from the central prolonged optical path so that the coma aberration of the lens unit for the second wavelength light flux is reduced.

16. An optical pickup apparatus of claim 15, wherein the first phase structure has the larger influence of the coma aberration by the de-centering than the second phase structure.

17. An optical pickup apparatus of claim 15, wherein the objective lens has the positioning mark at the central point of an optical surface on the phase control element side, and wherein the phase control element has a positioning mark at the central point of an optical surface on which the structure in which an influence of the coma aberration caused by a de-centering is larger in the first and the second phase structures.

18. A lens unit for use in an optical pickup apparatus, comprising:
an objective lens for condensing a light flux emitted from a light source on an information recording surface of an optical information recording medium;
a phase control element having an optical surface comprising a phase structure arranged on the light source side to the objective lens; and
a supporting member for holding the phase control element,
wherein the phase control element is held under a first condition that an optical axis of the phase control element is inclined by a certain angle to an optical axis of the objective lens, and under a second condition that an intersection at which the optical axis of the phase control element crosses the optical surface accords with a central prolonged optical path which is passing through the optical axis of the objective lens.

19. A lens unit of claim 18, wherein the lens unit includes at least two using light fluxes having different wavelengths form each other, and one of two opposed optical surfaces of the phase control element has a first phase structure which acts on a first wavelength light flux which is one of the at least two using light fluxes, and the other of the two opposed optical surfaces of the phase control element has a second phase structure which acts on a second wavelength light flux which is the other one of the at least two using light fluxes.

20. A lens unit of claim 19, wherein the phase control element is held under a third condition that a first intersection at which an optical axis of the first optical surface crosses the first optical surface and a second intersection at which an optical axis of the second optical surface crosses the second optical surface accords with the central prolonged optical path which is passing through the optical axis of the objective lens.

21. A lens unit of claim 18, wherein the supporting member is integrated with the phase control element or the objective lens.

22. An optical pickup apparatus for conducting recording and/or reproducing information for each information recording surface of a first optical information recording medium equipped with a protective substrate having a thickness t1 and a second optical information recording medium equipped with a protective substrate having a thickness t2 (t1≦t2), with a light flux emitted from a light source, comprising:
a first light source for emitting a first light flux having a wavelength of λ1;
a second light source for emitting a second light flux having a wavelength of λ2 (λ1<λ2);
an objective lens condensing each of the first and the second light fluxes on each of the information recording surfaces of the first and the second information recording mediums; and
a phase control element having an optical surface comprising a phase structure arranged on the light source side to the objective lens,
wherein the objective lens and the phase control element are held under a first condition that an optical axis of the phase control element is inclined by a certain angle to an optical axis of the objective lens, and under a second condition that an intersection at which the optical axis of the phase control element crosses the optical surface accords with a central prolonged optical path which is extended passing through the optical axis of the objective lens.

23. An optical pickup apparatus of claim 22, wherein a supporting member holds the objective lens and the phase control element, and thereby, the objective lens and the phase control element are utilized.

* * * * *